US010395385B2

(12) United States Patent
Zhou et al.

(10) Patent No.: US 10,395,385 B2
(45) Date of Patent: Aug. 27, 2019

(54) USING OBJECT RE-IDENTIFICATION IN VIDEO SURVEILLANCE

(71) Applicant: QUALCOMM Incorporated, San Diego, CA (US)

(72) Inventors: Yang Zhou, San Diego, CA (US); Ying Chen, San Diego, CA (US); Yingyong Qi, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 15/635,059

(22) Filed: Jun. 27, 2017

(65) Prior Publication Data

US 2018/0374233 A1 Dec. 27, 2018

(51) Int. Cl.
*G06T 7/70* (2017.01)
*G06K 9/46* (2006.01)
(Continued)

(52) U.S. Cl.
CPC .............. *G06T 7/70* (2017.01); *G06K 9/4604* (2013.01); *G06K 9/6201* (2013.01); *G06T 7/248* (2017.01);
(Continued)

(58) Field of Classification Search
IPC .............. G06T 7/70,7/248, 7/251, 2207/10016, 2207/30241, 2207/30196,
(Continued)

(56) References Cited

U.S. PATENT DOCUMENTS

2006/0268111 A1 11/2006 Zhang et al.
2007/0127774 A1* 6/2007 Zhang ................ G06K 9/00771
382/103
(Continued)

FOREIGN PATENT DOCUMENTS

EP 3065082 A1 9/2016

OTHER PUBLICATIONS

International Search Report and Written Opinion—PCT/US2018/030875—ISA/EPO—Sep. 18, 2018.
(Continued)

*Primary Examiner* — Tsung Yin Tsai
(74) *Attorney, Agent, or Firm* — Polsinelli LLP

(57) ABSTRACT

In various implementations, object tracking in a video content analysis system can be augmented with an image-based object re-identification system (e.g., for person re-identification or re-identification of other objects) to improve object tracking results for objects moving in a scene. The object re-identification system can use image recognition principles, which can be enhanced by considering data provided by object trackers that can be output by an object traffic system. In a testing stage, the object re-identification system can selectively test object trackers against object models. For most input video frames, not all object trackers need be tested against all object models. Additionally, different types of object trackers can be tested differently, so that a context provided by each object tracker can be considered. In a training stage, object models can also be selectively updated.

30 Claims, 40 Drawing Sheets

(51) Int. Cl.
*G06K 9/62* (2006.01)
*G06T 7/246* (2017.01)

(52) U.S. Cl.
CPC .... *G06T 7/251* (2017.01); *G06T 2207/10016* (2013.01); *G06T 2207/20081* (2013.01); *G06T 2207/30196* (2013.01); *G06T 2207/30232* (2013.01); *G06T 2207/30241* (2013.01)

(58) Field of Classification Search
IPC ........................ 2207/20081, 2207/30232; G06K 9/6201, 9/4604
See application file for complete search history.

(56) References Cited

U.S. PATENT DOCUMENTS

| | | | | |
|---|---|---|---|---|
| 2008/0170751 | A1* | 7/2008 | Lei | G06T 7/215 |
| | | | | 382/103 |
| 2008/0181453 | A1* | 7/2008 | Xu | G06T 7/215 |
| | | | | 382/103 |
| 2010/0316257 | A1* | 12/2010 | Xu | G06K 9/00771 |
| | | | | 382/103 |
| 2014/0184803 | A1 | 7/2014 | Chu et al. | |
| 2016/0092736 | A1 | 3/2016 | Mai et al. | |
| 2017/0083748 | A1 | 3/2017 | Zhou et al. | |
| 2017/0091562 | A1 | 3/2017 | Kusens | |
| 2018/0047173 | A1* | 2/2018 | Wang | G06T 7/136 |

OTHER PUBLICATIONS

Jodoin J-P., et al., "Urban Tracker: Multiple Object Tracking in Urban Mixed Traffic", IEEE Winter Conference on Applications of Computer Vision, Mar. 24, 2014, pp. 885-892, XP032609920, [retrieved on Jun. 16, 2014].

Lei B., et al., "Real-Time Outdoor Video Surveillance With Robust Foreground Extraction and Object Tracking via Multi-State Transition Management", Pattern Recognition Letters, Nov. 1, 2006, vol. 27. No. 15, XP027922601, ISSN: 0167-8655, pp. 1816-1825.

Vezzani R., et al., "People Re-identification in Surveillance and Forensics: a Survey", ACM Computing Surveys, vol. 1, No. 1, Jan. 2013, pp. 1-36.

* cited by examiner

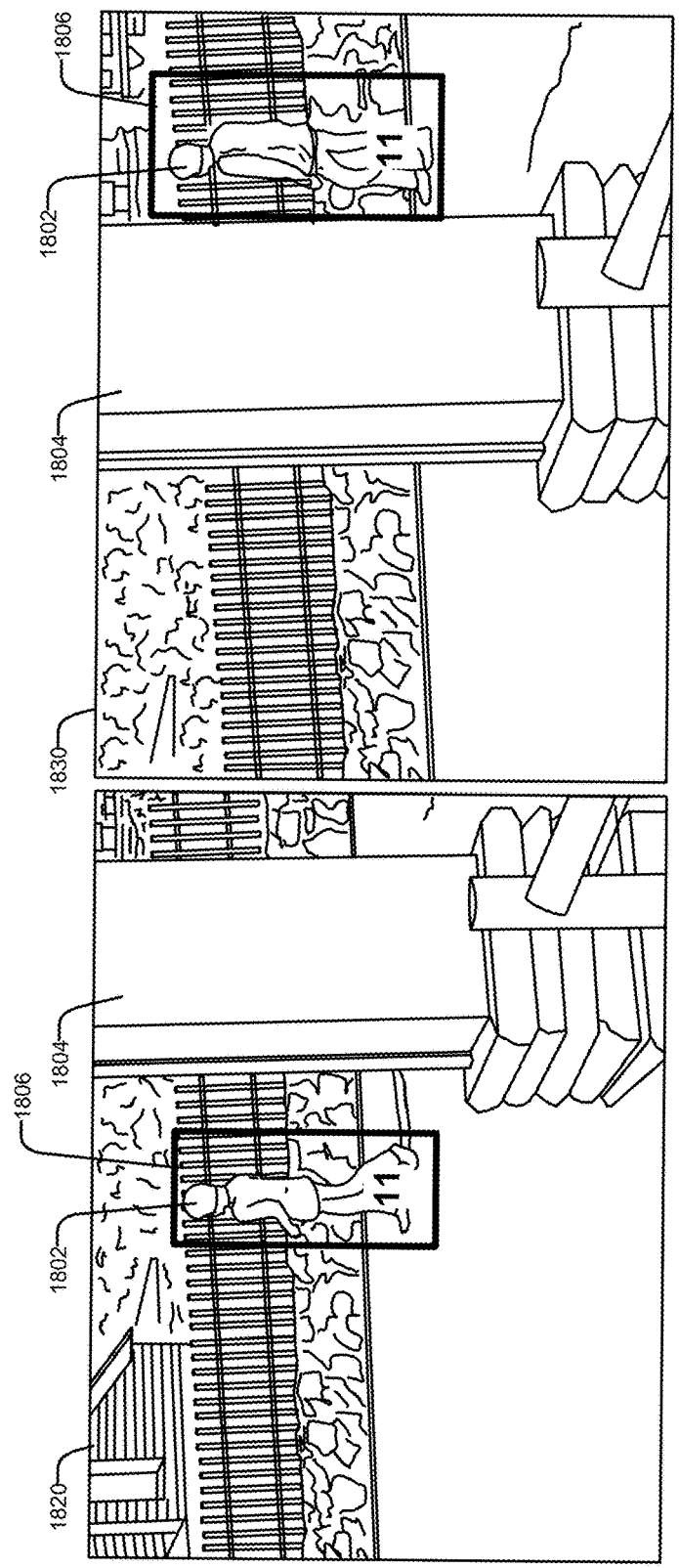

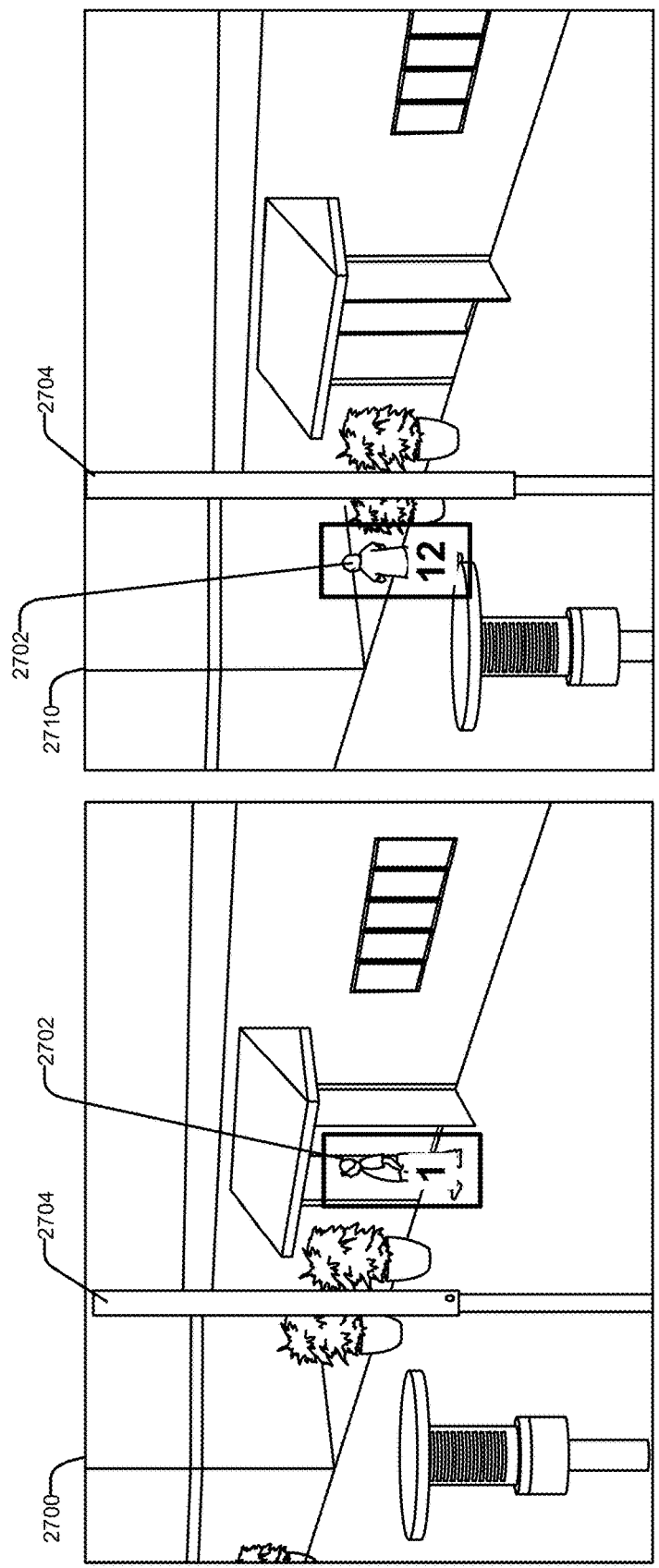

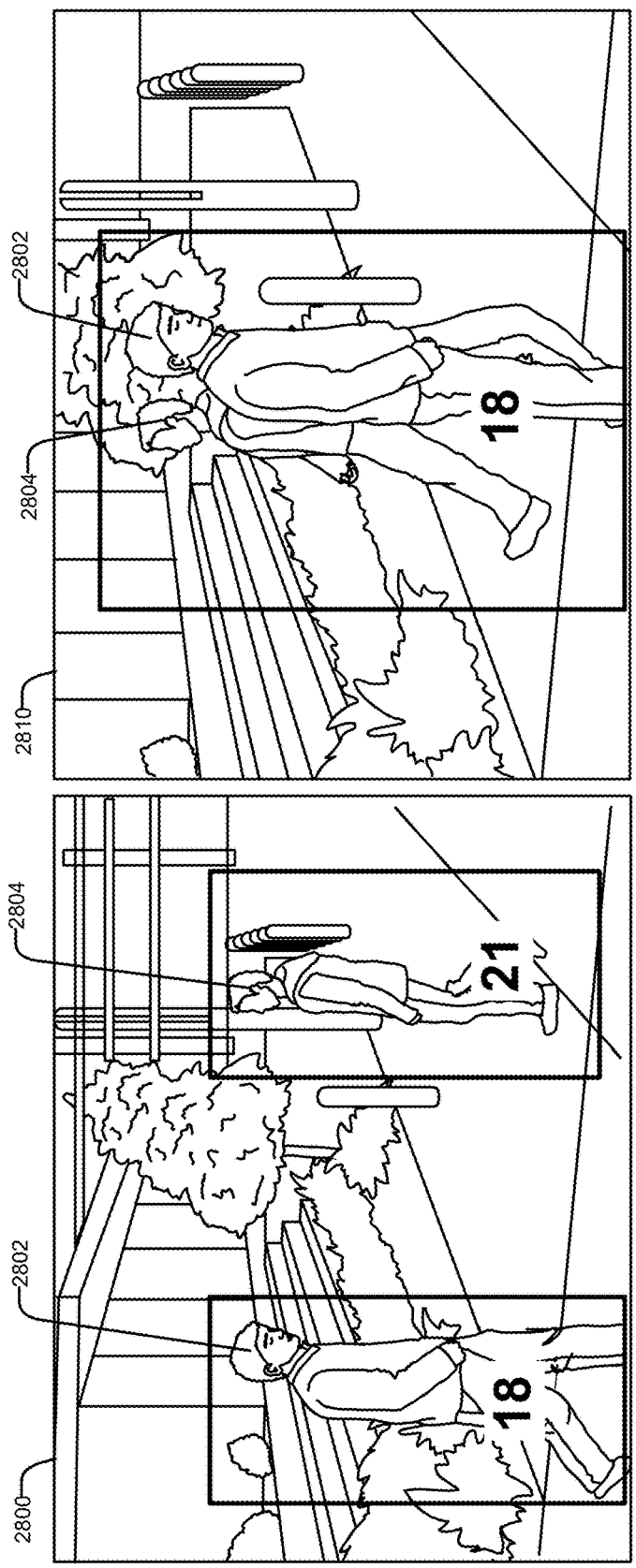

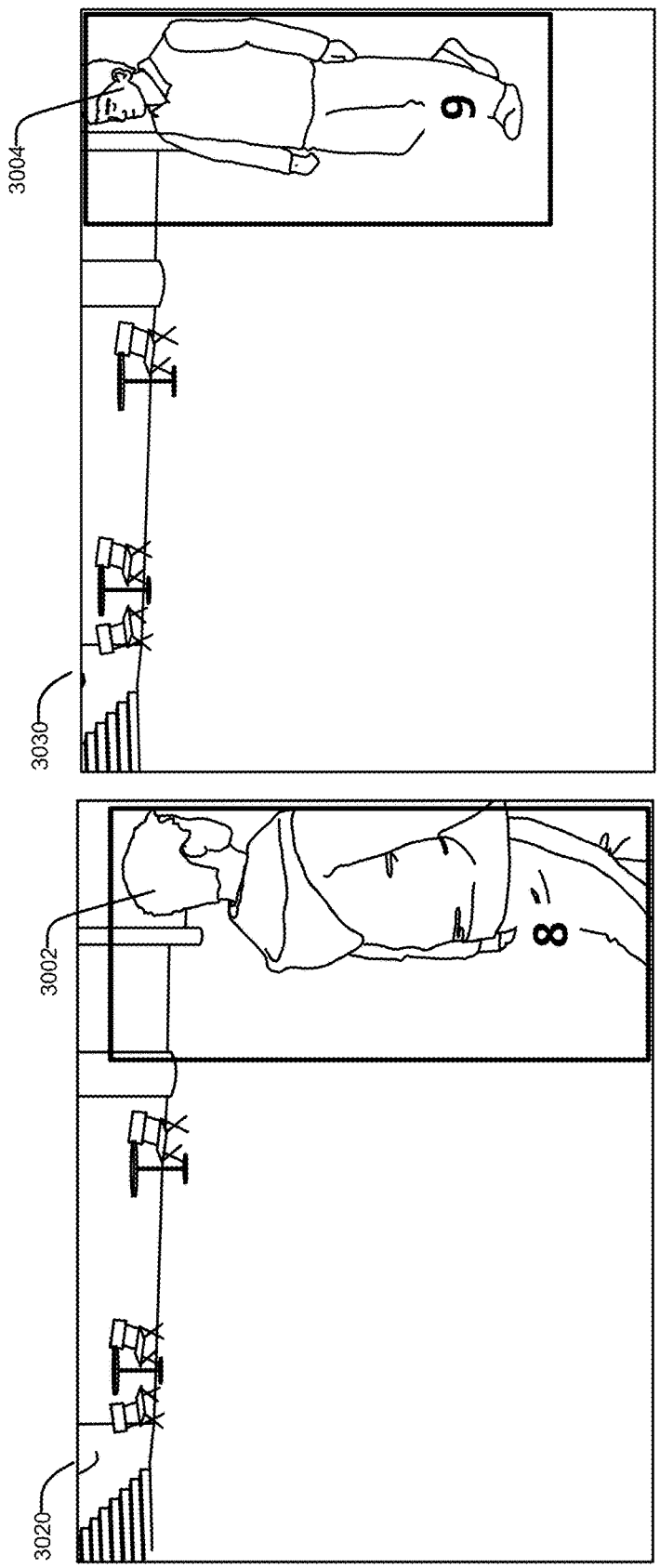

3300

DETERMINING AN OBJECT TRACKER FOR A CURRENT VIDEO FRAME, WHEREIN THE OBJECT TRACKER IS ASSOCIATED WITH A BLOB, THE BLOB INCLUDING PIXELS FROM AT LEAST A PORTION OF A FOREGROUND OBJECT IN THE CURRENT VIDEO FRAME, AND WHEREIN THE OBJECT TRACKER INCLUDES A TRACKER STATUS AND IS ASSOCIATED WITH A TRACKER LABEL
3302

DETERMINING TO USE THE BLOB ASSOCIATED WITH THE OBJECT TRACKER AS AN INPUT SAMPLE FOR OBJECT RE-IDENTIFICATION BASED ON THE TRACKER STATUS
3304

EXTRACTING ONE OR MORE FEATURES FROM THE BLOB ASSOCIATED WITH THE OBJECT TRACKER
3306

DETERMINING WHETHER THE OBJECT TRACKER CORRESPONDS TO A PERSON MODEL FROM A PLURALITY OF PERSON MODELS BY COMPARING THE ONE OR MORE FEATURES EXTRACTED FROM THE BLOB TO ONE OR MORE FEATURES INCLUDED IN THE PERSON MODEL, THE PERSON MODEL INCLUDING A MODEL LABEL, WHEREIN THE ONE OR MORE FEATURES INCLUDED IN THE PERSON MODEL ARE EXTRACTED FROM ONE OR MORE PREVIOUS BLOBS
3308

DETERMINING WHETHER THE TRACKER LABEL MATCHES THE MODEL LABEL WHEN THE OBJECT TRACKER CORRESPONDS TO THE PERSON MODEL
3310

MODIFYING THE OBJECT TRACKER WHEN THE TRACKER LABEL DOES NOT MATCH THE MODEL LABEL, WHEREIN MODIFYING INCLUDES CHANGING THE TRACKER LABEL TO THE MODEL LABEL
3312

OUTPUTTING THE MODIFIED OBJECT TRACKER, WHEREIN THE MODIFIED OBJECT TRACKER IS USED TO TRACK THE BLOB IN THE CURRENT VIDEO FRAME
3314

FIG. 33

USING OBJECT RE-IDENTIFICATION IN VIDEO SURVEILLANCE

FIELD

The present disclosure generally relates to video analytics, and more specifically to techniques and systems performing object re-identification in video surveillance.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for performing re-identification of persons or other objects for video surveillance purposes. For example, a person moving within a scene being captured by a video surveillance camera can be identified by a video analytics system as a moving object in the scene.

In some examples, using video analytics, background subtraction is applied to one or more frames of captured video and a foreground-background binary mask (referred to herein as a foreground mask) is generated for each frame. In some cases, morphology operations can be applied to a foreground mask of a frame to reduce noise present in the foreground mask. Connected component analysis can be performed (after background subtraction or after morphology operations) to generate connected components from the foreground mask. Blobs may then be identified for the current frame based on the connected components. The blobs can be provided, for example, for blob processing, object tracking, and other video analytics functions.

A blob that represents an object (e.g., a person or other object) may become momentarily obscured, or may be within close proximity of another moving object for several video frames and thus be indistinguishable from the other object, or may otherwise not be independently trackable across one or more frames. When the object becomes lost to the tracking system and the object is later found, the tracking system may begin tracking the object as a new or different object, rather than associating the object with a previous object tracker. Adding object re-identification to a video analytics system can improve object tracking by re-associating the blob for an object with a previous object tracker for the object.

According to at least one example, a method for object re-identification is provided that includes determining an object tracker for a current video frame, where the object tracker is associated with a blob. The blob can include pixels from at least a portion of a foreground object in the current video frame. The object tracker can include a tracker status and can be associated with a tracker label. The method further includes determining to use the blob associated with the object tracker as an input sample for object re-identification based on the tracker status. The method further includes extracting one or more features from the blob associated with the object tracker. The method further includes determining whether the blob corresponds to an object model from a plurality of object models by comparing the one or more features extracted from the blob to one or more features included in the object model, the object model including a model label. The one or more features included in the object model are extracted from one or more previous blobs. The method further includes determining whether the tracker label matches the model label when the object tracker corresponds to the object model. The method further includes modifying the object tracker when the tracker label does not match the model label, where modifying includes changing the tracker label to the model label. The method further includes outputting the modified object tracker, where the modified object tracker is used to track the blob in the current video frame.

In another example, an apparatus is provided that includes a memory configured to store video data and a processor. The processor is configured to and can determine an object tracker for a current video frame, where the object tracker is associated with a blob. The blob can include pixels from at least a portion of a foreground object in the current video frame. The object tracker can include a tracker status and can be associated with a tracker label. The processor is configured to and can determine to use the blob associated with the object tracker as an input sample for object re-identification based on the tracker status. The processor is configured to and can extract one or more features from the blob associated with the object tracker. The processor is configured to and can determine whether the blob corresponds to an object model from a plurality of object models by compare the one or more features extracted from the blob to one or more features included in the object model, the object model include a model label. The one or more features included in the object model are extracted from one or more previous blobs. The processor is configured to and can determine whether the tracker label matches the model label when the object tracker corresponds to the object model. The processor is configured to and can modify the object tracker when the tracker label does not match the model label, where modify includes change the tracker label to the model label. The processor is configured to and can output the modified object tracker, where the modified object tracker is used to track the blob in the current video frame.

In another example, a computer readable medium is provided having stored thereon instructions that when executed by a processor perform a method that includes: determining an object tracker for a current video frame, where the object tracker is associated with a blob. The blob can include pixels from at least a portion of a foreground object in the current video frame. The object tracker can include a tracker status and can be associated with a tracker label. The method further includes determining to use the blob associated with the object tracker as an input sample for object re-identification based on the tracker status. The method further includes extracting one or more features from the blob associated with the object tracker. The method further includes determining whether the blob corresponds to an object model from a plurality of object models by comparing the one or more features extracted from the blob to one or more features included in the object model, the object model including a model label. The one or more features included in the object model are extracted from one or more previous blobs. The method further includes determining whether the tracker label matches the model label when the object tracker corresponds to the object model. The method further includes modifying the object tracker when the tracker label does not match the model label, where modifying includes changing the tracker label to the model label. The method further includes outputting the modified object tracker, where the modified object tracker is used to track the blob in the current video frame.

In another example, an apparatus is provided that includes means for determining an object tracker for a current video frame, where the object tracker is associated with a blob. The blob can include pixels from at least a portion of a foreground object in the current video frame. The object tracker can include a tracker status and can be associated with a tracker label. The apparatus further includes a means for determining to use the blob associated with the object tracker as an input sample for object re-identification based on the tracker status. The apparatus further includes a means for extracting one or more features from the blob associated with the object tracker. The apparatus further includes a means for determining whether the blob corresponds to an object model from a plurality of object models by comparing the one or more features extracted from the blob to one or more features included in the object model, the object model including a model label. The one or more features included in the object model are extracted from one or more previous blobs. The apparatus further includes a means for determining whether the tracker label matches the model label when the object tracker corresponds to the object model. The apparatus further includes a means for modifying the object tracker when the tracker label does not match the model label, where modifying includes changing the tracker label to the model label. The apparatus further includes a means for outputting the modified object tracker, where the modified object tracker is used to track the blob in the current video frame.

In some aspects, determining to use the object tracker is based on the tracker status having changed from a previous tracker status. In some aspects, determining to use the object tracker is based on the object tracker being a new object tracker. In some aspects, determining to use the object tracker is based on a bounding box associated with the object tracker having a pre-determined size.

In some aspects, the methods, apparatuses, and computer readable medium described above further comprise selecting the object model from the plurality of object models. When the tracker status is a recover status, the object model can be selected based on the tracker label matching the model label.

In some aspects, the methods, apparatuses, and computer readable medium described above further comprise selecting the object model from the plurality of object models. When the tracker status is a split status, the object tracker is associated with a group of split trackers, where each split tracker from the group of split trackers is associated with a tracker label. In these aspects, the object model can be selected based on the model label matching a tracker label from among the tracker labels associated with the group of split trackers.

In some aspects, the methods, apparatuses, and computer readable medium described above further comprise selecting the object model from the plurality of object models. When the tracker status is a new status, one or more object models from the plurality of object models are selected.

In some aspects, the methods, apparatuses, and computer readable medium described above further comprise selecting the object model from the plurality of object models, where the object model is selected from one or more object models from the plurality of object models that have not been matched to an object tracker from the current video frame.

In some aspects, the object model includes a model state, where, when the model state is a first state, the object model is updated using the object tracker, and where, when the model state is a second state, the object model is not updated.

In some aspects, the methods, apparatuses, and computer readable medium described above further comprise identifying a particular object model from the plurality of object models. The particular object model can be selected based on having not matched any previous object tracker for an interval of previous video frames. These aspects can further include changing a model state for the particular object model to a dead state.

In some aspects, the methods, apparatuses, and computer readable medium described above further comprise updating the object model to include the one or more features extracted from the blob when the one or more features extracted from the blob correspond to the one or more features included in the object model.

In some aspects, the methods, apparatuses, and computer readable medium described above further comprise determining, for a second object tracker from the current video frame, that the second object tracker does not correspond to any object model from the plurality of object models. These aspects further include generating a new object model, wherein the new object model includes data from the second object tracker.

In some aspects, features include numeric values representing an appearance of a blob.

In some aspects, the methods, apparatuses, and computer readable medium described above further comprise normalizing a bounding box associated with the blob, where normalizing includes changing the bounding box to a predetermined format. These aspects can further include using the normalized bounding box for the object tracker.

In some aspects, for a previous video frame, the tracker status was a recover status, and no corresponding object model was identified for the previous video frame.

In some aspects, when the tracker status is a recover status and the object tracker overlaps with another tracker, the object tracker and the other tracker are assigned to a split group.

In some aspects, when the object tracker is a member of a split group and the split group includes a second object tracker, then when the object tracker corresponds to the object model, a bounding box of the object tracker is exchanged with a bounding box of the second object tracker.

In some aspects, comparing the one or more features extracted from the blob to the one or more features included in the object model includes using a threshold, and wherein the threshold is adjusted based on the tracker status.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 18C and FIG. 18D illustrate an example where the object tracking results illustrated in FIG. 18A and FIG. 18B are supplied to a person re-identification engine prior to be output.

FIG. 27A and FIG. 27B illustrate an example where specific testing for recover trackers can improve person re-identification results.

FIG. 28A and FIG. 28B illustrate an example of a merge scenario.

FIG. 30C and FIG. 30D illustrate an example where person re-identification has been applied to correctly identify the second person 3004 as a different person.

FIG. 33 illustrates an example of a process for person re-identification.

DETAILED DESCRIPTION

Figure 1:
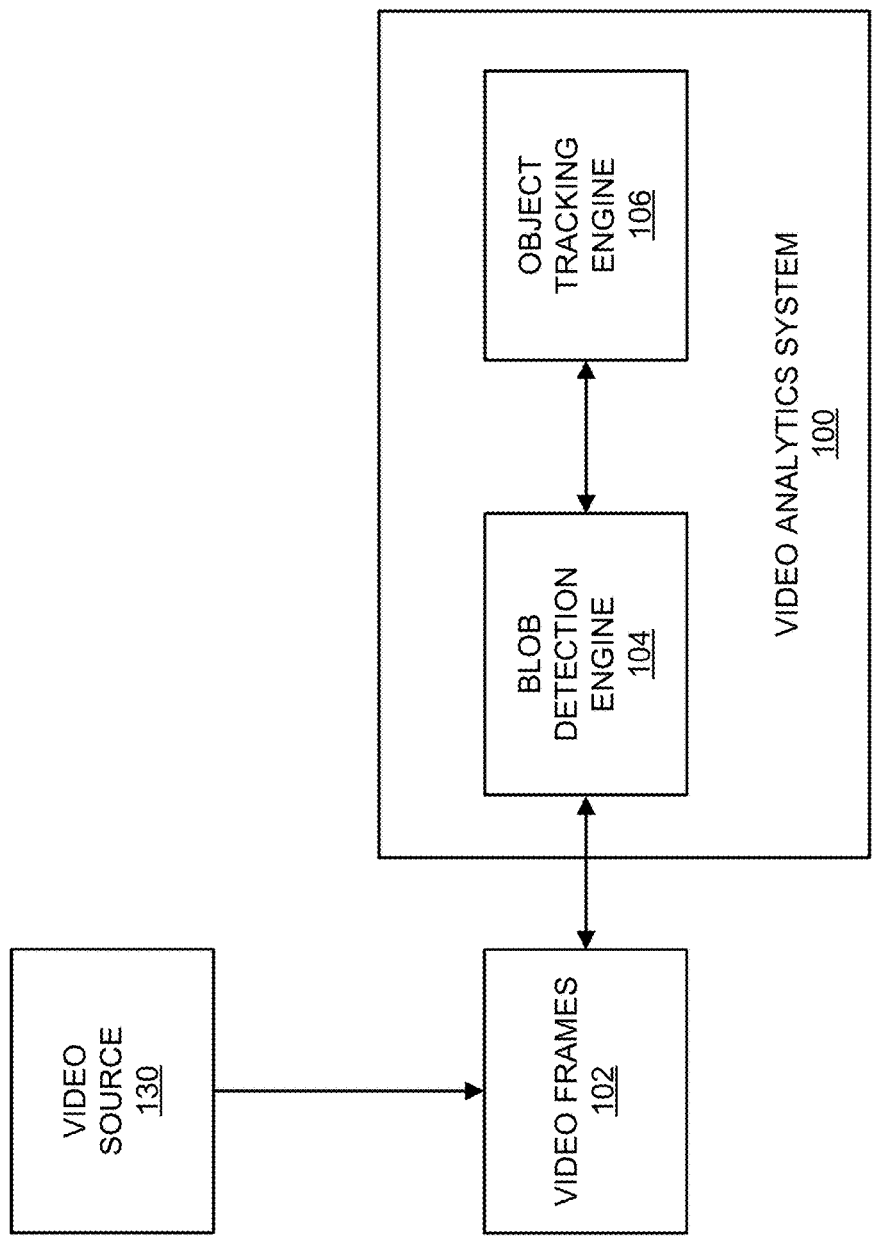
FIG. 1 is a block diagram illustrating an example of a system including a video source and a video analytics system.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and can send an alert or alarm to a central control room to alert a user of the event of interest.

Object re-identification is a process for identifying a previously known or identified object. For instance, person re-identification can be performed to identify a previously known or identified person. In one illustrative example, a person re-identification system can use one or more images of a person, where the person in the images is known, to train a model of the person. The images provided for training the model may be referred to as training images or training samples. The model can include numerical values that represent the appearance of the person, such as color values, texture values, light values, gradient values, and so on. The model can be used on test images or samples, where the person in the test images is not known. When the appearance of the person in a test image corresponds to the model, the person has be re-identified; that is, the identity of the person in the test image has been established as being the identity of the person in the model.

Object re-identification that uses image recognition can be effective because training images can be obtained in a controlled environment, where the person or other object being photographed or filmed is standing still or not moving too much, is visible from head to foot, and is presenting his face to the camera. Training images may also be of good quality, having a high resolution and good lighting. Testing samples might also be obtained in a controlled environment, and thus may be of similarly high quality.

In video surveillance, however, it may be that neither training images nor testing samples can be obtained in a controlled environment. For example, people entering a scene being viewed by a surveillance camera may not be known in advance. Hence, training images may need to be obtained from the video stream. In the frames from the video stream, people may be facing any direction, may be partially obscured, may be in very bright light or in shadow, and/or the camera resolution may be low. Training samples may thus be far from ideal.

In video surveillance, it is also desirable that the same person or other object be tracked consistently as the person or other object moves about in the scene. An object, such as a person, however, may become momentarily obscured, or may momentarily leave the scene, or may otherwise not be distinctly trackable. In these and other situations, a video analytics system may need to re-identify the person or other object after the person/object has been lost and then is found. As with the initial training images for the person or other object, the testing samples for re-identifying the person/ object will also have to be taken from the video stream, and the samples may be far from ideal. While examples are provided herein using person re-identification for illustrative purposes, one of ordinary skill will appreciate that other objects can be re-identified using similar systems and processes.

In various implementations, object tracking in a video content analysis system can be augmented with an image-based person re-identification system to improve object tracking results for people moving in a scene. The person re-identification system can use image recognition principles, which can be enhanced by considering data provided by object trackers that can be output by an object traffic system. In a testing stage, the person re-identification system can selectively test object trackers (e.g., using a blob associated with an object tracker as a testing sample) against person models. For most input video frames, not all object trackers need be tested against all person models, which can both improve the testing results and the quality of the person model. Additionally, different types of object trackers can be tested differently, so that a context provided by each object tracker can be considered. In a training stage, person models can also be selectively updated. Not updating every model for every input video frame can reduce the computational load needed to maintain the person models. The quality of the person models can also be improved by updating the models with only blobs from certain object trackers.

Some situations can be particularly difficult for person re-identification. For example, when a person leaves the scene and then re-enters, an object tracker for the person can be assigned a recover status. The recover status can be based on, for example, the person becoming visible in the scene at about the same point at which the person was last seen. Recover trackers can fail to be re-identified (e.g., associated with an existing person model), however, due to only a small part of the person being visible. The part of the person that is visible may not be enough to match the person to a person model. In some cases, the recover tracker may be removed from further tracking when no matching person model can be found.

Another problematic situation can occur when a person is represented in one video frame as two blobs instead of one. The person may have been identified as one blob in prior video frames, but due to having moved behind an obstruction or because the person is wearing clothing that blends with the background, or for another reason, the person may be split into multiple blobs in the current video frame. In this situation, the person may not be re-identified, due to each blob having insufficient information to associate the blob with a person model. Alternatively, the blobs may each be tracked individually, leading to erroneous tracking results.

Person re-identification can be improved by applying different rejection thresholds to different person models, and/or considering an object tracker type when considering the rejection threshold. As noted above, not every person model need be considered for every input video frame. A simple rejection threshold, however, may lead to either too many matches being found between person models object trackers or too few.

In various implementations, person re-identification can be improved by including context information, where the context information can improve re-identification for some recover trackers, split trackers, and other trackers. Context information can be provided by object trackers, and can include historic information captured from prior video frames. Context information can include, for example, a spatial context, a temporal context, and/or a tracker status. Spatial context can include a size, location, and/or geometric relationship between bounding boxes that are associated with an object tracker. The spatial context can be used to modify re-identification for some types of trackers. Temporal context can include re-identification testing results from multiple input frames. The temporal context can be used to determine whether an object tracker should continue to be used for person re-identification when testing for the object tracker has failed to find a matching person model. The tracker status can include whether the tracker has been updated for the current video frame and/or the tracker's type (e.g., new, normal, split, merge, recover, etc.). The tracker status can be used to apply testing that is more specific to a tracker's type, and/or to apply different thresholds for different types of parameters.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding region can be associated with a blob. In some examples, a tracker can also be represented by a tracker bounding region. A bounding region of a blob or a tracker can include a bounding box, a bounding circle, a bounding ellipse, or any other suitably-shaped region representing a tracker or blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIG. 3 and FIG. 4.

Figure 2:
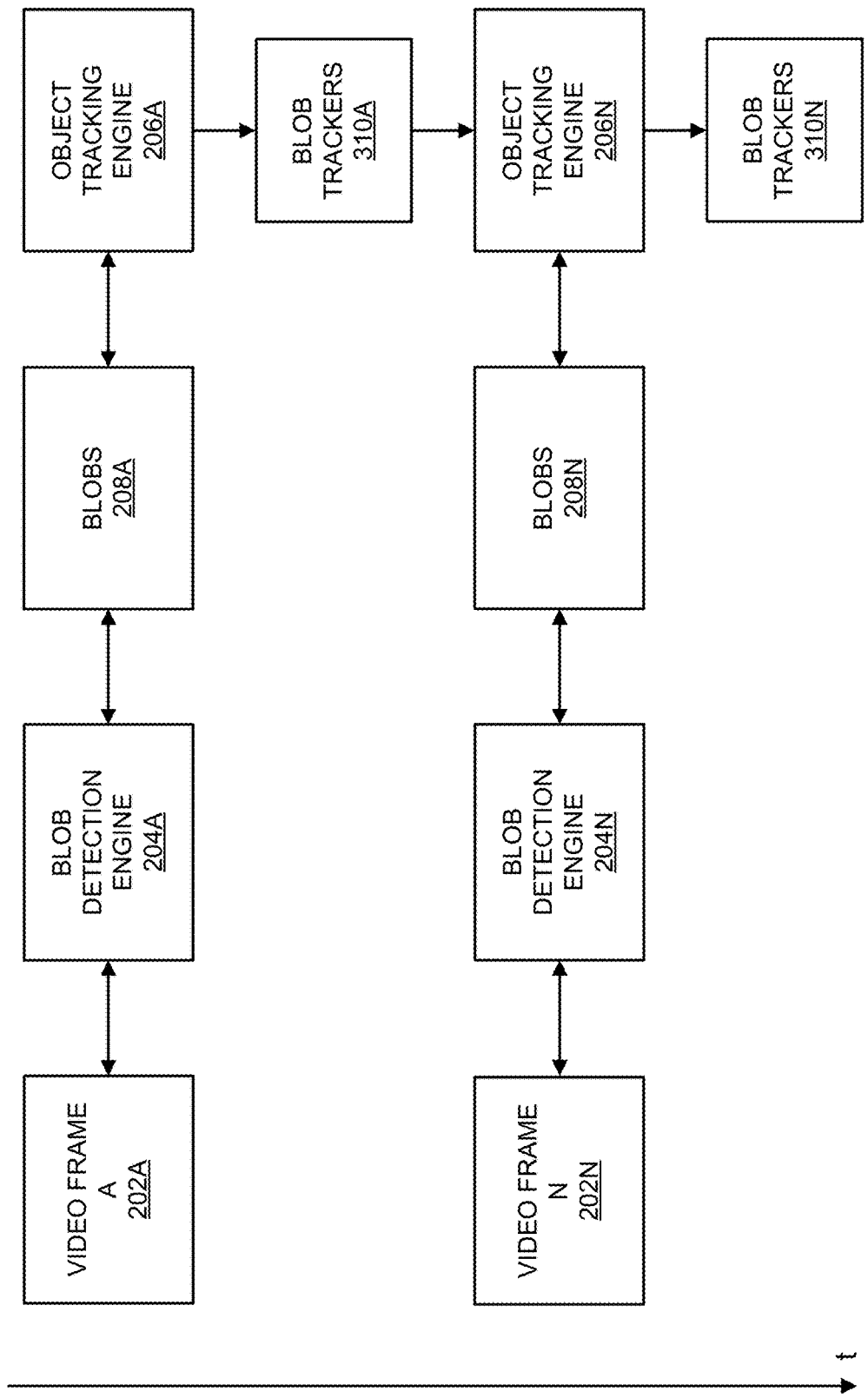
FIG. 2 is an example of a video analytics system processing video frames.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
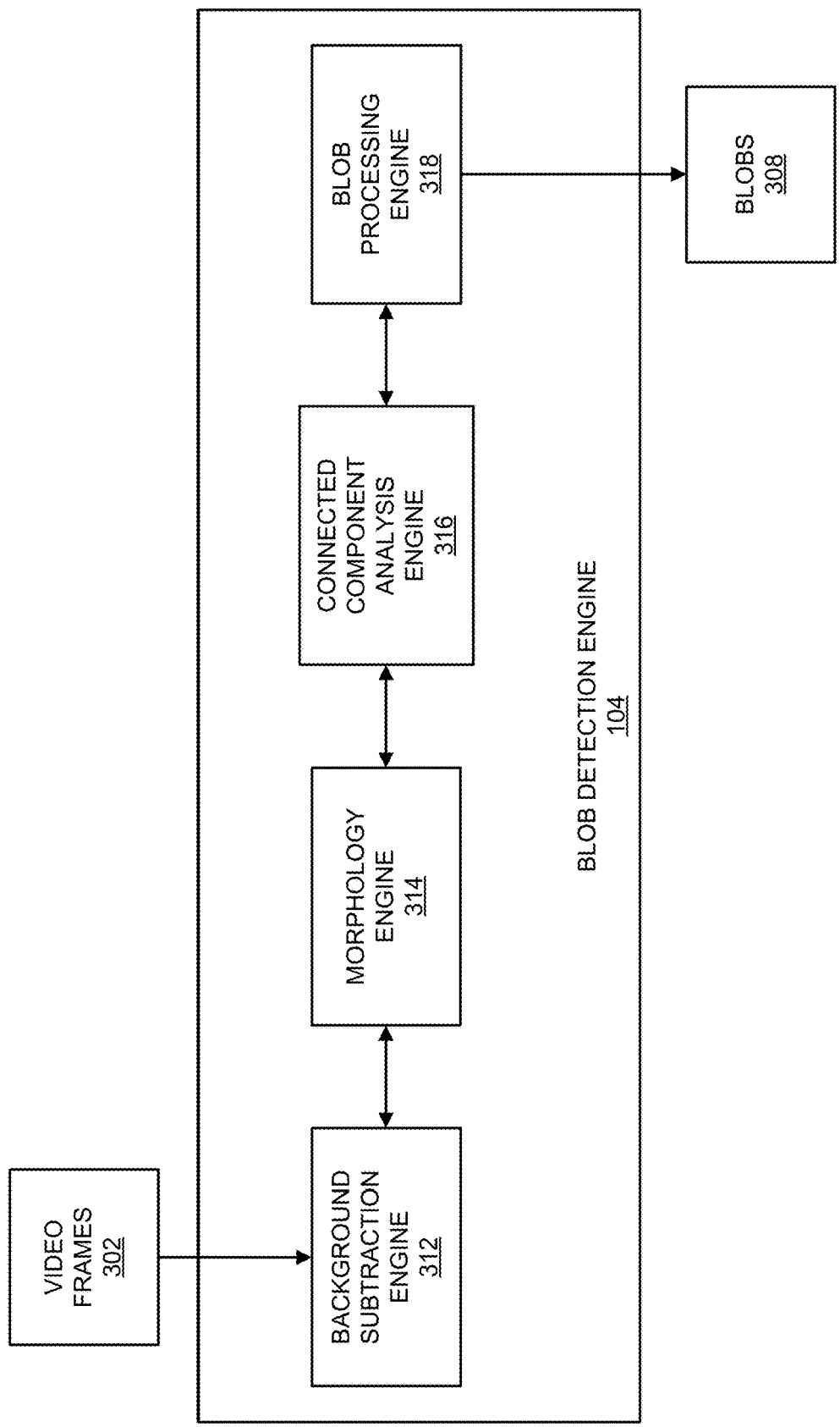
FIG. 3 is a block diagram illustrating an example of a blob detection engine.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t})$$ Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. In some implementations of connected component analysis, a set of bounding boxes are returned in a way that each bounding box contains one component of connected pixels. One example of the connected component analysis performed by the connected component analysis engine 316 is implemented as follows:

for each pixel of the foreground mask {
  if it is a foreground pixel and has not been processed, the
    following steps apply:
    Apply FloodFill function to connect this pixel to other
      foreground and generate a connected component
    Insert the connected component in a list of connected
      component.
    Mark the pixels in the connected component as being
      processed}

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some cases, the blob processing engine 318 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 318 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

In some implementations, density based blob area trimming may be performed by the blob processing engine 318. For example, when all blobs have been formulated after post-filtering and before the blobs are input into the tracking layer, the density based blob area trimming can be applied. A similar process is applied vertically and horizontally. For example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Figure 4:
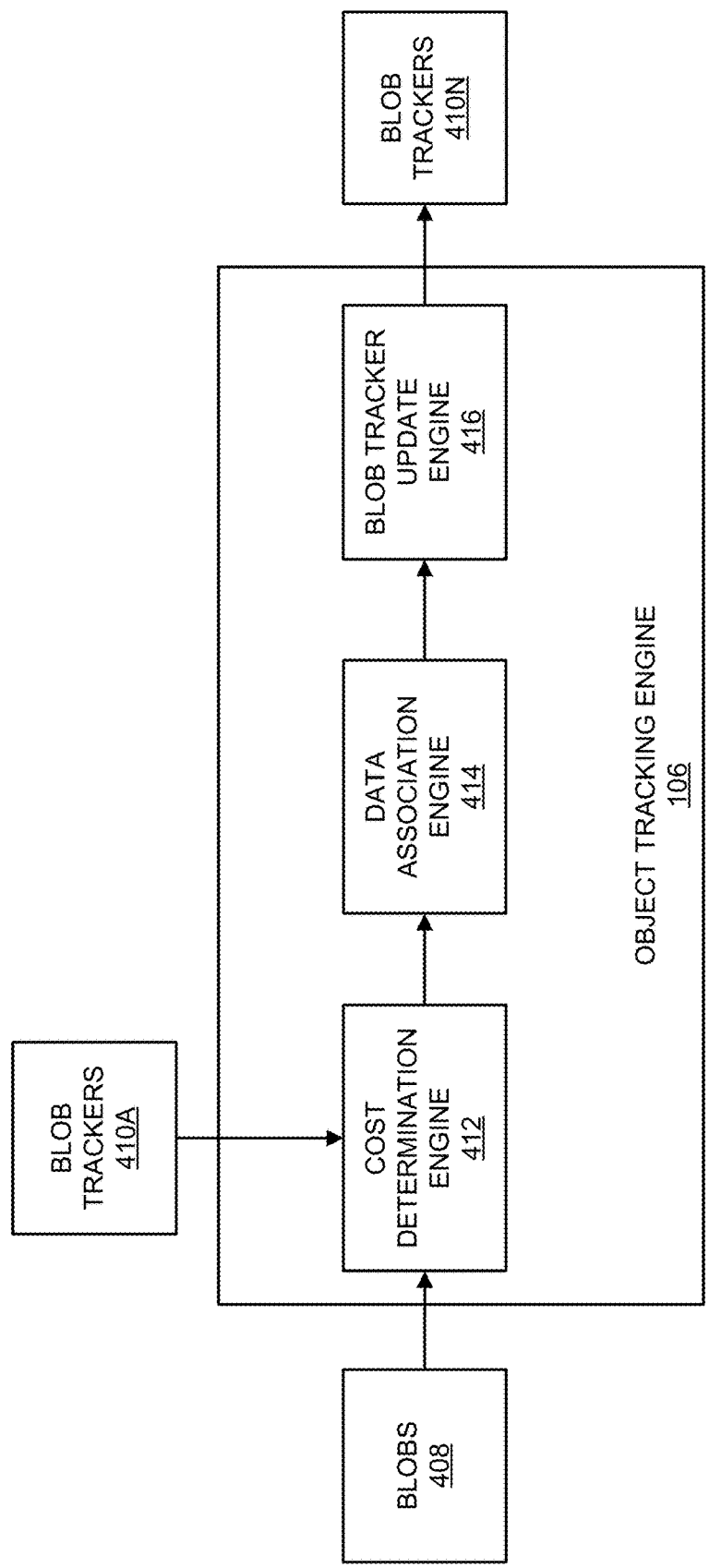
FIG. 4 is a block diagram illustrating an example of an object tracking engine.

Once the blobs are detected and processed, object tracking (also referred to as blob tracking) can be performed to track the detected blobs. FIG. 4 is a block diagram illustrating an example of an object tracking engine 106. The input to the blob/object tracking is a list of the blobs 408 (e.g., the bounding boxes of the blobs) generated by the blob detection system 104. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$\text{Cost}_{tb} = \sqrt{(t_x - b_x)^2 + (t_y - b_y)^2} \qquad \text{Equation (2)}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker (or tracker bounding box) with a corresponding blob (or blob bounding box) and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 414 can rely on the distance between the blobs and trackers.

Once the association between the blob trackers 410A and blobs 408 has been completed, the blob tracker update engine 416 can use the information of the associated blobs, as well as the trackers' temporal statuses, to update the status (or states) of the trackers 410A for the current frame. Upon updating the trackers 410A, the blob tracker update engine 416 can perform object tracking using the updated trackers 410N, and can also provide the updated trackers 410N for use in processing a next frame.

The status or state of a blob tracker can include the tracker's identified location (or actual location) in a current frame and its predicted location in the next frame. The location of the foreground blobs are identified by the blob detection system 104. However, as described in more detail below, the location of a blob tracker in a current frame may need to be predicted based on information from a previous frame (e.g., using a location of a blob associated with the blob tracker in the previous frame). After the data association is performed for the current frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame. One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., two or more), or other suitable tracker states.

There may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker. A normal tracker (with normal status) and its associated blob are output as an identified tracker-blob pair to the video analytics system. For example, a tracker-blob pair is output at the system level as an event (e.g., presented as a tracked object on a display, output as an alert, and/or other suitable event) when the tracker is promoted to be a normal tracker. A tracker that is not promoted as a normal tracker can be removed (or killed), after which the tracker can be considered as dead.

As described above, blobs can be used for object tracking using blob trackers. A new tracker starts to be associated with a blob in one frame, and may be connected with possibly moving blobs across one or more subsequent frames. The new tracker is hidden and not output for actual tracking of the blob or object until the new tracker is promoted to a normal status. For example, a hidden tracker is one that is not shown on a display as tracking a displayed object. When a new tracker has been continuously associated with blobs and a duration has passed, the tracker can be promoted or converted to be a normal tracker. When a blob tracker is converted or promoted to a normal tracker, the blob or object with which the blob tracker is associated is converted from a potential hidden blob or object to a normal blob or object. The normal tracker and blob are output as an identified tracker-blob pair to the video analytics system so that the system can begin tracking the blob or object, in addition to other system level events. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by a rule interpreter). For example, one example of a system level event is that, once tracking begins, the tracker is shown on a display as tracking the object for which it is associated.

Figure 5:
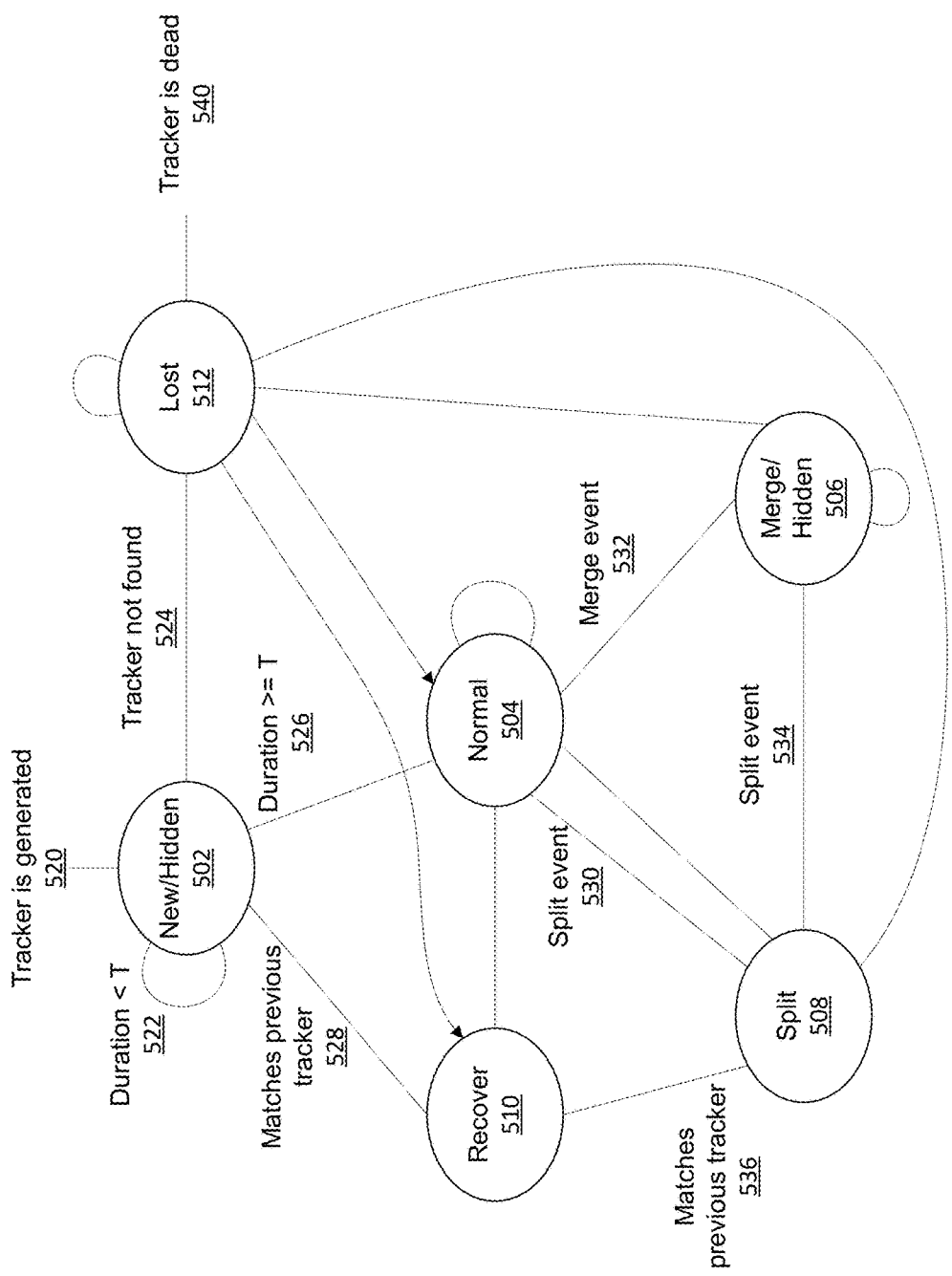
FIG. 5 illustrates an example of states that a tracker can undergo through the course of a tracker's existence.

FIG. 5 illustrates an example of states that a tracker can undergo through the course of a tracker's existence. In many cases, a tracker may experience fewer than all of the example states. In various implementations, a tracker may experience additional states that are not illustrated here. Each state transition, illustrated in this example with an arrow, can occur upon the receipt of data corresponding to a new input video frame.

At transition 520, a new tracker can be generated. The new tracker can have an initial state of New/Hidden 502. As discussed above, a tracker can be generated when, for a given video frame, a blob is detected for which no tracker can be found. As also discussed above, new trackers may be "hidden," meaning that the blob that corresponds to the tracker may not yet be tracked. Hidden new trackers may not be output from the system.

As illustrated by transition 522, a New/Hidden 502 tracker may remain New/Hidden 502 while a duration is less than a threshold, T. The duration may be counted as a number of frames, a number of milliseconds or seconds, or by some other measure of time. During the duration, the system may not yet have sufficient data to confirm that a blob that corresponds to the New/Hidden 502 tracker is an object moving within the scene. For example, the blob may be noise or tree leaves moving in the wind, or some other pixels that should be classified as background pixels. Alternatively or additionally, the blob may be within the scene for only fractions of a second, and thus not be present long enough to be tracked.

In this and other examples, while the duration is less than T, the tracker may undergo transition 524, in which, for a current video frame, the tracker can no longer be matched to a blob. The tracker may then be considered Lost 512. Lost trackers are discussed further below.

Alternatively, when the duration is greater than or equal to T, the tracker may undergo transition 526, and become a Normal 504 tracker. In subsequent frames, the tracker may remain Normal 504, unless an event, such as a split event 530 or a merge event 532 occurs, or the tracker becomes Lost 512. As noted above, a tracker can become Lost 512 when the blob that corresponds to the tracker cannot be found in the current video frame.

Alternatively, a New/Hidden 502 tracker can become a Recover 510 tracker through transition 528, when the system determines that the tracker matches a previous tracker. This can occur, for example, when an object is stationary within the scene for long enough to be classified as background pixels, and thus becomes Lost 512, and then the object starts moving again. As another example, an object may move out of view (possibly becoming Lost 512) and then come back into view. In some implementations, the Recover 510 tracker inherits the data of the tracker that matched the Recover 510 tracker. In some implementations, and not illustrated here, the Recover 510 tracker may be deleted, and a Lost 512 tracker that matched the Recover 510 track may be transitioned to the Recover 510 state. A Recover 510 tracker can transition to Normal 504 in a subsequent video frame, or can transition to Lost 512.

As noted above, a merge event 532 can occur when to blobs are within a certain distance of each other within the scene, and thus are recognized by the system as one object. For example, two people may enter the scene from opposite directions, and walk together for a while. When a merge event 532 occurs, a normal 504 tracker may become a Merge/Hidden 506 tracker. A merge tracker can inherit the data from the trackers that have been merged together. In some implementations, one of the trackers may be considered a "parent" or "root" tracker, and all other trackers in the merge group can be considered "children" or "leaves." In some implementations, the parent tracker continues to be tracked in subsequent frames, while the child trackers are hidden, meaning the child trackers may be updated along with the parent tracker, but the child trackers are not output by the system. In various implementations, a Merge/Hidden 506 tracker remains in this state unless a split event 534 occurs, or the Merge/Hidden 506 tracker becomes Lost 512.

When a split event 534 occurs, a blob that is associated with the tracker splits into two or more blobs, each of which can be assigned a different tracker by the system. A Normal 504 tracker can also undergo a split event 530, such as for example when two people walk together into the scene and are identified as one blob, and then later walk in two different directions and are identified as two different blobs. A Split 508 tracker can inherit the tracking data of the Normal 504 tracker, such that each tracker that is split from the Normal 504 tracker retains the tracking history of the Normal 504 tracker. In a subsequent frame, the Split 508 tracker may transition to Normal 504. This transition may occur, for example, after a duration has passed. A group of Split 508 trackers that resulted from one blob splitting into multiple blobs can be referred to as a split group.

When a Split 508 tracker splits from a Merge/Hidden 506 tracker, in some cases the Split 508 tracker may inherit the data from the Merge/Hidden 506 tracker, including the data from the parent tracker and any child trackers. Alternatively, in some implementations, the Split 508 tracker may be matched to the parent tracker or one of the child trackers, meaning that the system determines that the Split 508 tracker is for a blob that previously merged with another blob. When this occurs, the Split 508 tracker may undergo transition 536, and become a Recover 510 tracker.

As illustrated in the example of FIG. 5, a New/Hidden 502 tracker, a Recover 510 tracker, a Normal 504 tracker, a Merge/Hidden 506 tracker, or a Split 508 tracker can become Lost 512 before undergoing any other state transition. A tracker can become Lost 512 when, from a first video frame to a second video frame, a blob that was associated with the tracker in the first video frame cannot be found in the second video frame. The object represented by the blob may have moved out of view or may have become stationary, and have been included among background pixels. In some implementations, the system may maintain a tracker as Lost 512 for a period of time. During this period of time, the system may identify a blob that can be associated with the Lost 512 tracker, in which case the tracker may be transitioned to the Recover 510 state. In some implementations, a Lost 512 tracker, once associated with a blob, may transition directly to the Normal 504 state.

When a Lost 512 tracker remains lost for more than a pre-determined amount of time (e.g., ten frames, 5 or 10 milliseconds, or some other measure of time), the system may determine that the object that was being tracked is no longer in the scene. In such a case, at transition 540, the tracker may be considered dead. A dead tracker may be deleted from the tracking system.

Figure 6:
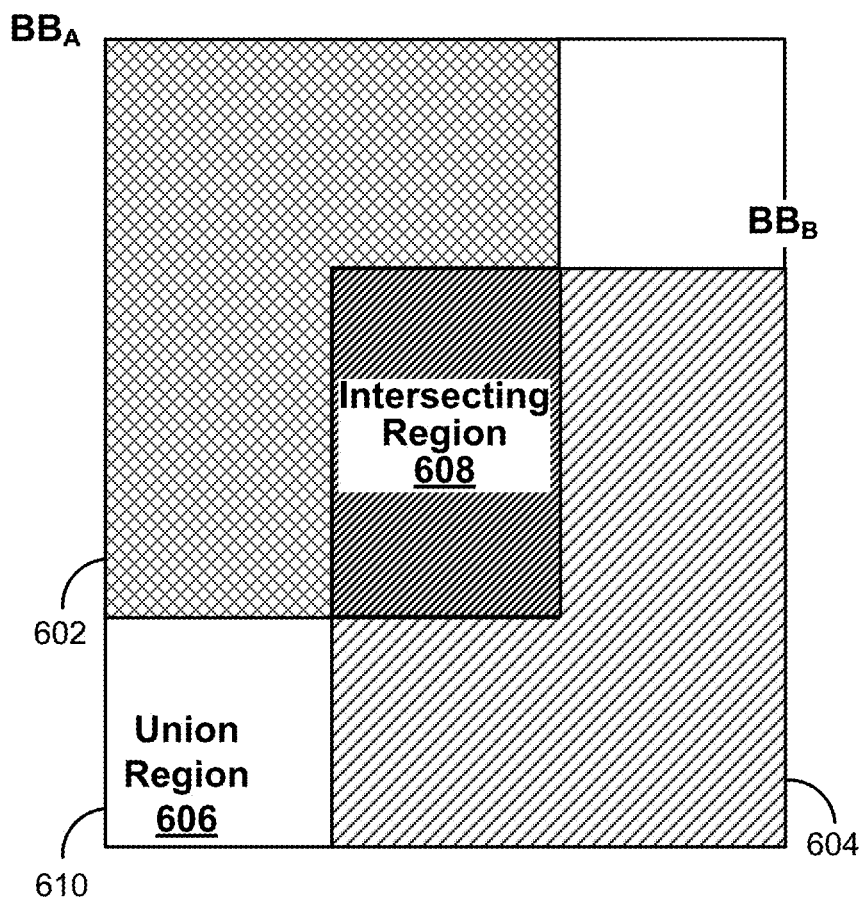
FIG. 6 illustrates an example of an intersection and union of two bounding boxes.

In various implementations, whether the bounding boxes for two blobs should be merged into a single bounding box can be determined by a degree of overlap between the bounding boxes, and/or other considerations. FIG. 6 illustrates an example of an intersection and union of two bounding boxes, bounding box $BB_A$ 602 and bounding box BBB 604, which may be considered in determining whether the blobs associated with the bounding boxes should be represented by a single, merged bounding box. The intersecting region 608 includes the region of bounding box $BB_A$ 602 that overlaps with bounding box $BB_B$ 604. The union region 606 includes the union of bounding box $BB_A$ 602 and bounding box $BB_B$ 604. The union of bounding box $BB_A$ 602 and bounding box $BB_B$ 604 can be defined as the far corners of the two bounding boxes, and can be used to create a new bounding box 610. More specifically, by representing each bounding box with vector (x, y, w, h), where (x, y) is the upper-left coordinate of a bounding box and w and h are the width and height of the bounding box, respectively, the union of the bounding boxes can be represented as follows:

$$\text{Union}(BB_1, BB_2) = (\min(x_1, x_2), \min(y_1, y_2), (\max(x_1 + w_1 - 1, x_2 + w_2 - 1) - \min(x_1, x_2)), (\max(y_1 + h_1 - 1, y_2 + h_2 - 1) - \min(y_1, y_2)))$$

In various implementations, the size of the union region 606, the size of the intersecting region 608, and/or other factors can be used to determine whether the bounding boxes should be merged, and be represented by the new bounding box 610. For example, in some implementations, a ratio between the size of the intersecting region 608 and the size of the union region 606 can be used to determine whether the bounding boxes should be merged. For example, when the ratio of size of the intersecting region 608 and the size of the union region 606 is less than a threshold, the system may determine that the bounding boxes should be merged. Other factors that the system can consider are, for example, the degree of vertical overlap between the bounding boxes, the degree of horizontal overlap, and/or the relative sizes of the bounding boxes (e.g., whether one is much smaller than the other), among other factors.

Person re-identification is one feature that can be provided by a video content analysis system. Person re-identification is a process of assigning a consistent identifier to all appearances of the same person in a video captured by a surveillance camera. Person re-identification can answer the question "where have I seen this person before?" or "is this the same person I have seen before?" Person re-identification can be useful for security analysis in both short-term and long-term tracking.

Re-identification techniques can use visual cues, such as color, texture, and the shape of an object that has been identified from a video as likely representing a person. These visual cues can be used as a "signature" that identifies the person. The signature should be as unique as possible, so that the signature is a good representation of a single person, while at the same time accommodating the available camera resolution, computational load needed to generate the signature, and other issues that may limit the accuracy of the signature. Color is frequently used as a key aspect of the signature. For example, histograms can describe a range of colors in an image, using different color spaces (e.g., Red-Green-Blue (RGB), Hue-Saturation-Value (HSV), etc.). Shape features, such as the width of the object that represents a person, the height, the width-to-height ratio, a vertical axis, moment invariants, and contours can also be used in a signature. A position in the image or on the ground plane can also be used in a signature when multiple, overlapping cameras are used. For texture, covariance matrices, Scale-Invariant Feature Transform (SIFT), Speeded-Up Robust Features (SURF), Histogram of Oriented Gradients (HOGs), Local Binary Patterns (LBP) and others are examples of descriptors for texture-based features. To optimize the information provided by color, shape, texture, and other features, features can be combined into a signature. For example, Gabor texture filters on different color spaces, a descriptor that integrates both color and edge contributions, and base SURF descriptors with HSV color information can be mixed to create an integrated color and feature set.

In addition to generating discriminative and efficient person signatures, machine learning techniques can be used to determine relationships, behaviors, and models from video data. In person re-identification, machine learning algorithms have been used for color correction dimensionality reduction and for distance measure learning, among other things. For color correction, several techniques can be used to apply color transformations among multiple cameras when settings between the cameras are different or when illumination is not uniform. Dimensionality reduction or feature selection can reduce the complexity in comparing signatures for verbose or long local feature descriptors. Distance measure learning is the process of learning distance metrics when different cameras are used or when there are the same person is seen from different viewpoints.

A component of person re-identification is image recognition. In an image recognition system, the system is given an image, or a patch of an image (which can be referred as an image patch or picture patch), and outputs a description of what the image contains. The system can be trained to recognize different things, such as cats or cars or some other item of interest, by training the system using many images that are known to contain the item, and many images that are known to not contain the item. Using these images, the system can develop a signature or model for the item. When used to recognize a specific person, the system can be trained with an image of the person that is to be recognized. Quite often, the system is trained with an "ideal" image of the person, which captures the entire person from head to foot and has a front view of the person to capture the person's face and other distinctive features. Additionally, the training image may have a high resolution and even lighting that is neither too bright nor too dim. Once the system is trained using the image of the person, the system can recognize the person when provided with other picture patches that contain the person.

Image identification systems that use picture patches to train a model and as inputs for identification may make certain assumptions about the contents of a picture patch. For example, these systems may assume that the picture patch is a high resolution image, has ideal illumination, and that no part of the person whose image is captured in the picture patch is obscured or occluded. These assumptions can simplify the image identification process, but these assumptions may not apply in video surveillance. For example, video data from a video surveillance camera may be blurred due to large movements of objects being tracked, or may have extremely bright or very dark illumination, and/or objects within the scene may be partially or fully obscured as the objects move within the scene.

Figure 7A:
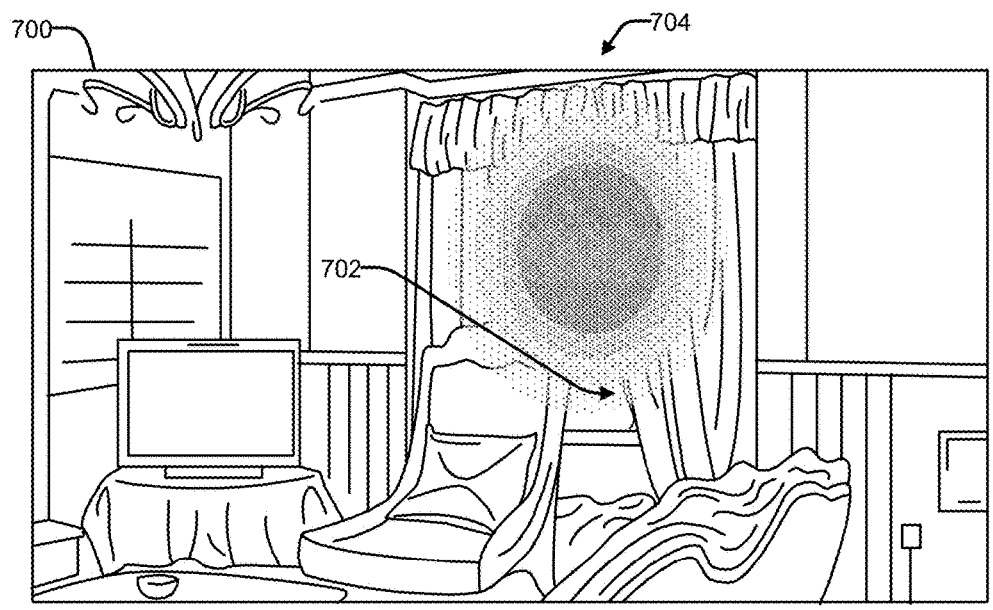
FIG. 7A and FIG. 7B illustrate examples situations that can occur in video surveillance, in which conditions for person or object re-identification are less than ideal.
Figure 7B:
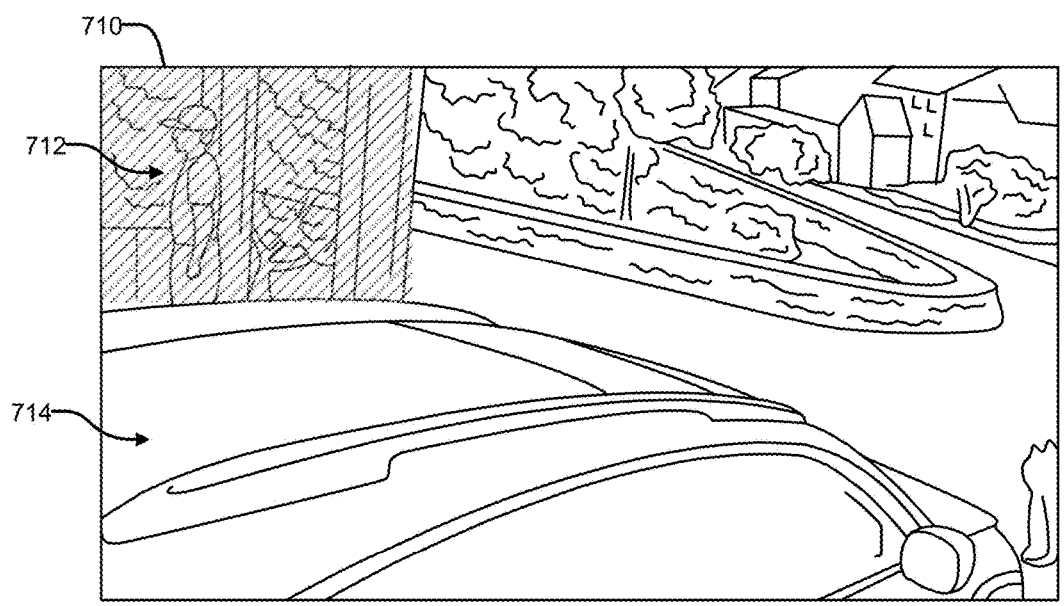

FIG. 7A and FIG. 7B illustrate examples situations that can occur in video surveillance, in which conditions for person re-identification are less than ideal. FIG. 7A illustrates a video frame 700, in which a thief 702 is escaping through an open window 704. Bright illumination coming through the open window 704 creates a large amount of glare, rendering the thief 702 difficult to see. FIG. 7B illustrates a video frame 710 in which a pedestrian 712 is partially obscured by a car 714 in the foreground. Since the pedestrian 712 is partially obscured by the car 714, an image identification system that relies on being able to see a whole person may fail to identify the pedestrian 712.

As noted above, an image recognition system may be given a picture patch as a training input, where the picture patch includes an image of the person for whom a model is to be generated. In some cases, the system may not subsequently adapt the model with new inputs, because the training picture patch may be ideal, and may be assumed to have all the necessary information. In a video surveillance situation, no training picture patches, ideal or otherwise, may be available in advance, because the people to be tracked are likely unknown. Only once a person has entered a scene being captured by a camera, and the person is identified as an object to be tracked, does the system have data to use to generate a model (e.g., the blob associated with the person). From that point forward, the system can use all object tracking data as training samples, but doing so can lead to unstable models or models of poor quality, which have limited usefulness in person re-identification. More sophisticated use of the tracking data can produce better quality and more useful models.

During training, an image recognition system may receive as input an image sample that has a corresponding label. Because image recognition systems may be trained with ideal picture patches, the system can assume that the correct label is input with the image sample. In a video surveillance implementation, however, an object tracking system, alone, may have insufficient information to assign labels to object trackers. As a result, from one frame to the next, an object tracker may be assigned an incorrect label. For example, a new tracker may be assigned the label of an existing tracker, or a normal tracker may be assigned the label that was previously assigned to a different tracker. Without a person re-identification system, object tracking data alone may not be accurate.

In a video surveillance system, image recognition, for person identification, may be required to occur in real time, so that people can be identified and re-identified as the video is captured. In some examples, the system can be configured to examine each captured video frame, and identify any people identified by blobs in the video frame. But examining each input video frame can require a large amount of computational resources, possibly too many to make person re-identification, in real time, practical. Even when the computation resources are available, examining each input video frame can lead to frequent mislabelling and incorrect identification, due to the varying quality (e.g., image quality, viewing angle, lighting, or other qualities) of the captured video. Person re-identification may be more accurate, and require fewer computational resources, when better quality image samples are used.

Figure 8A:
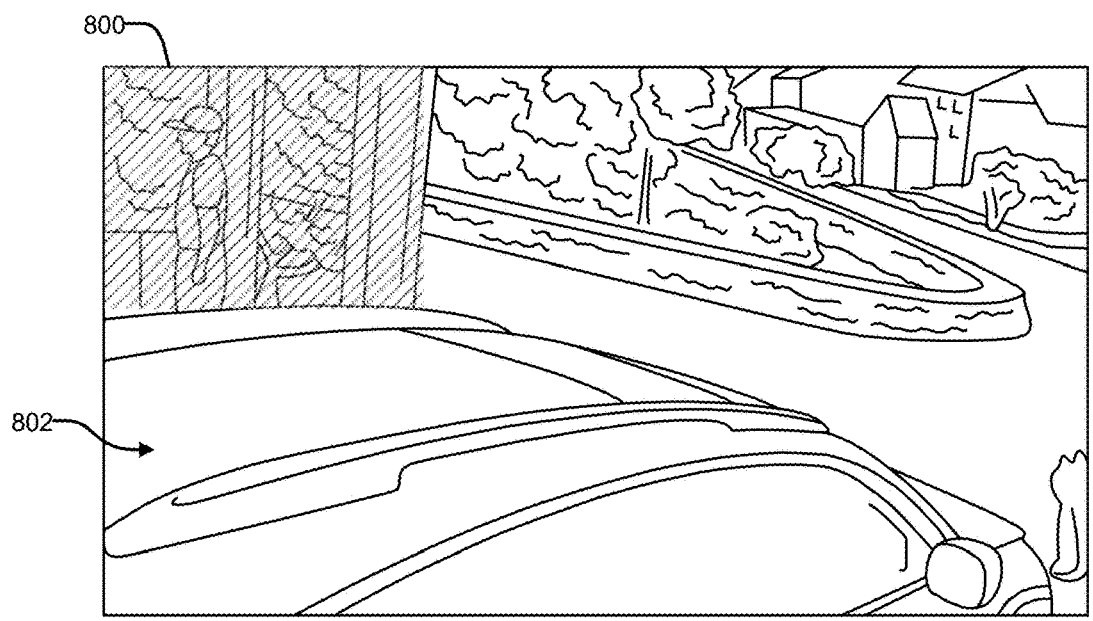
FIG. 8A and FIG. 8B illustrate examples of moving objects that may be identified by an object tracking system.
Figure 8B:
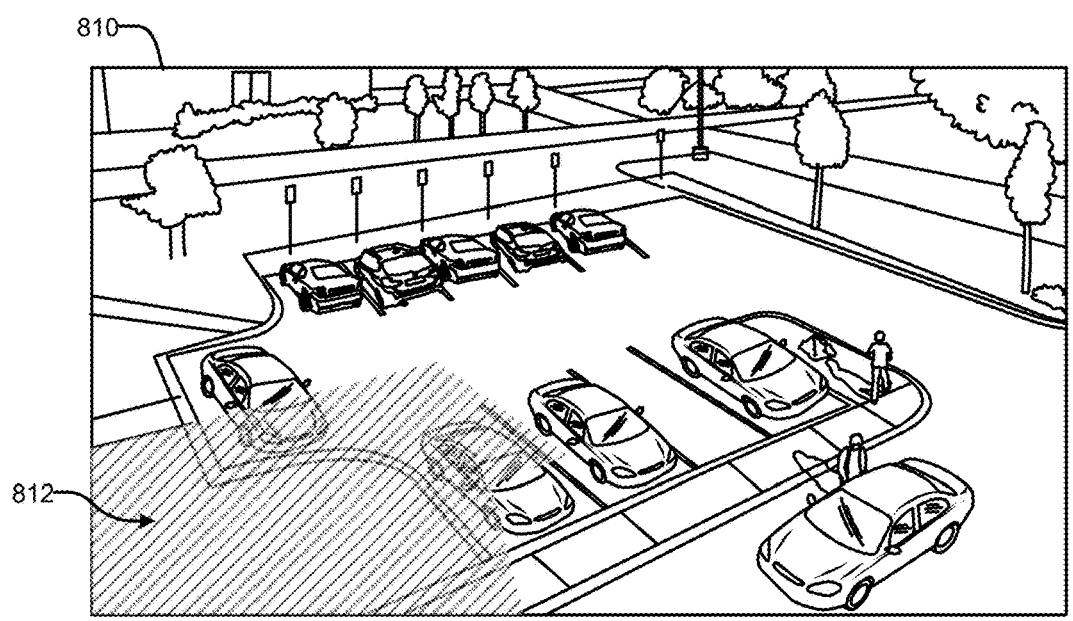

Person re-identification systems may be designed to assume that an input picture patch contains a person that is to be identified. Such systems may not be prepared to accept input that does not include a person. In video surveillance systems, the system may identify many moving objects within a video frame, not all of which may include a person. FIG. 8A and FIG. 8B illustrate examples of moving objects that may be identified by an object tracking system. FIG. 8A illustrates an example of a video frame 800 where a car 802 may be identified as a blob, and be tracked by a tracker. FIG. 8B illustrates an example of a video frame 810 where a shadow 812 may be identified as a blob and be tracked. In the examples of FIG. 8A and FIG. 8B, without a filtering mechanism, the car 802 and the shadow 812 may be provided as samples to a person re-identification system.

Even when an object tracking system is able to segregate blobs that represent people from blobs that represent something else, the blobs for the people may be less than ideal. For example, the blob may include less than the whole person, or may include a group of people. Alternatively or additionally, the person may be facing away from the camera or may be at an angle to the camera, or the person's body may be partially outside of the bounding box. Each of these situations may pose a challenge for identifying the person.

Variations in bounding boxes detected by an object tracking system can also be challenging for person re-identification. For example, bounding boxes may not have uniform aspect ratios, or may be skewed horizontally or vertically. As another example, bounding boxes may vary greatly in size, possibly being very tiny or possibly occupying most of a video frame. As another example, variations in the background portion of an input video can change the appearance of a person; for example, the person's clothing may blend with the background, causing part of the person perhaps to not be recognized as part of a blob.

Image recognition systems for identifying people may rely heavily on a person's appearance, including, for example, facial features, hair color, clothing, the presence of eye glasses, and so on. A person's appearance, however, may be dependent on the angle at which the person is presented to the camera. Image recognitions systems may not perform well when the person is captured in a picture patch at an angle. In video surveillance situations, people may not be directly facing the camera very often, thus a person re-identification system needs to be less reliant on a specific aspects of a person's appearance.

Figure 9:
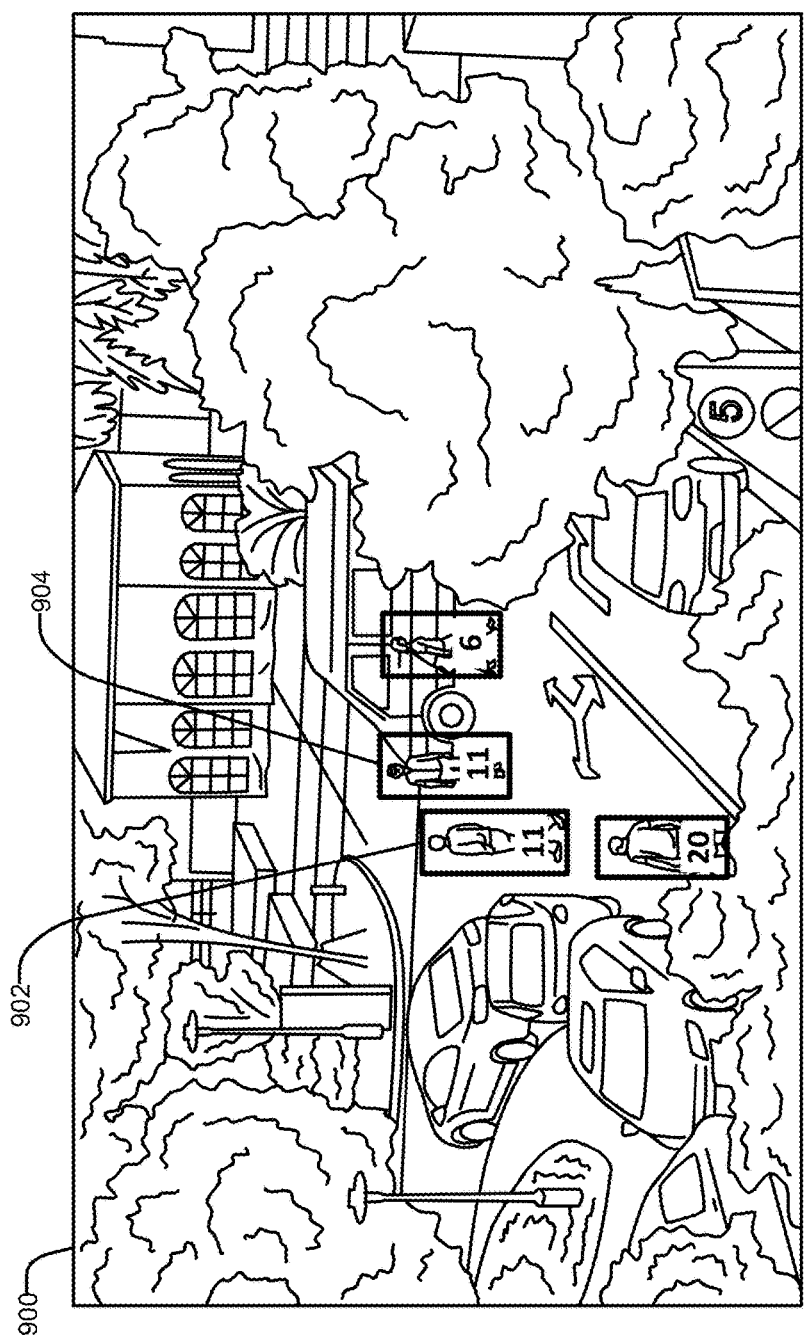
FIG. 9 illustrates an example of a video frame 900 where two bounding boxes have been assigned the same label.

A person re-identification system should also avoid applying the same label to two bounding boxes in the same video frame. FIG. 9 illustrates an example of a video frame 900 where two bounding boxes 902, 904 have been assigned the same label, "11." The system may have assigned the same label to these two bounding boxes 902, 904 because the system determined that both bounding boxes 902, 904 contain the same object. For example, the person in the first bounding box 902 is wearing clothing that is the same color as the clothing of the person in the second bounding box 904. Additionally, the two people have the same color hair. The system, however, should have recognized that the two people appear in the same video frame, and thus should be assigned different labels.

In various implementations, image recognitions systems such as are discussed above can be combined with object tracking data to provide an object re-identification system that can perform with greater accuracy in a video surveillance situation. While examples are provided herein describing person re-identification for illustrative purposes, one of ordinary skill will appreciate that other objects can be re-identified using similar systems and processes. For example, an object re-identification engine can utilize similar techniques as those described herein to re-identify various types of objects other than people.

Figure 10:
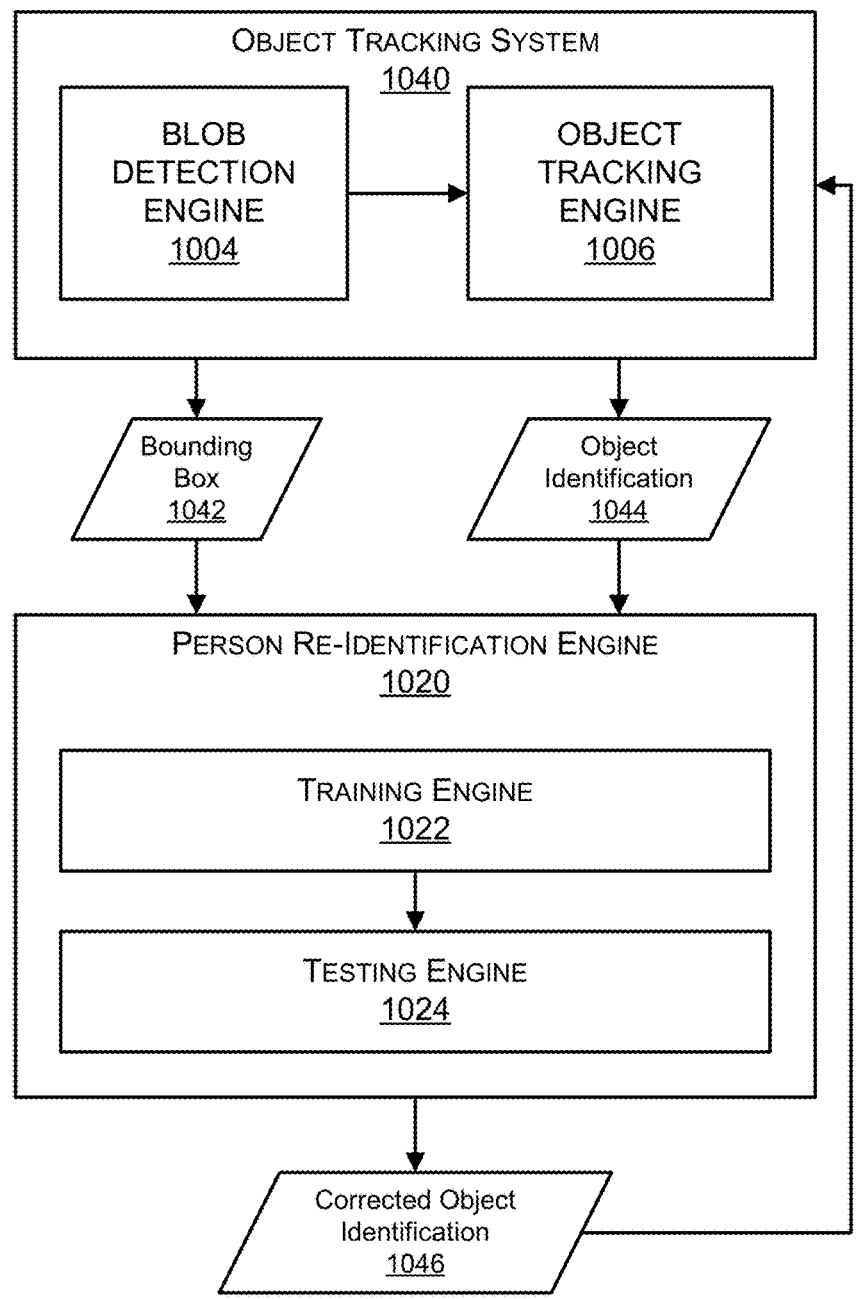
FIG. 10 illustrates an example of an object tracking system whose output is provided to a person (or other object) re-identification engine.

FIG. 10 illustrates an example of an object tracking system 1040, whose output is provided to a person re-identification engine 1020. As discussed above, the object tracking system 1040 can include a blob detection engine 1004 and an object tracking engine 1006. In various implementations, the blob detection engine 1004 can identify blobs in input video frames, and the object tracking engine 1006 can track objects associated with the identified blobs. The objects can be people, vehicles, animals and/or any object that may be in the scene.

In various implementations, the object tracking system 1040 can output a bounding box 1042 for each blob identified in a current input video frame, and an object identification 1044 (e.g., a label) for the bounding box 1042. In various implementations, the object tracking system 1040 can use factors such as the proximity of a bounding box to a previously known tracker to determine the object identification 1044. In some implementations, the object tracking system 1040 may consider the contents of the bounding box 1042, such as the color and/or shape of the object in the bounding box, in determining the object identification 1044. Considerations such as bounding box proximity to a tracker and the contents of a bounding box may, however, be insufficient to re-identify a person as the person moves around in a scene. In various implementations, the person re-identification engine 1020 can provide the intelligence to manage the particular problems that can arise in person re-identification.

In various implementations, the person re-identification engine 1020 can include a training engine 1022 and a testing engine 1024. As discussed further below, the training engine 1022 and testing engine 1024 can be used to generate new person models, update existing person models, and to test a bounding box 1042 (e.g., a blob associated with the bounding box 1042) against the person models. While all the outputs of the object tracking system 1040 are available to the person re-identification engine 1020, in various implementations, the person re-identification engine 1020 operates on a bounding box 1042 rather than on a blob, since the bounding box 1042 is a regular shape. The person re-identification engine 1020 can also have access to the information stored in with bounding box 1042 and/or an object tracker associated with the bounding box 1042, including the tracker's current status and tracking history. The person re-identification engine 1020 can output a corrected object identification 1046 (e.g., a corrected label), when necessary, which can be provided to the object tracking system 1040 to correct the identification of trackers associated with people. In various implementations, the person re-identification engine 1020 may have greater accuracy over short periods of time, during which it is unlikely that people being tracked can change their appearance, for example by changing their clothing.

In various implementations, the person re-identification engine 1020 can be configured to re-identify other moving objects, such as vehicles, animals, and other objects moving in the scene. In some implementations, the person re-identification engine 1020 can be configured to re-identify only one type of object, or to re-identify several types of objects at the same time.

In the following discussion, the following variables may be used, for the sake of simplicity and clarity. First, the current input video frame may be referred to as t. Second, a list of trackers for objects currently and/or previously being tracked may be referred to as $\{T_i | i=1, 2, \ldots n\}$. Third, for each tracker $T_i$, a corresponding bounding box may be referred to as $rect(T_i)$, a feature sample for the tracker may be referred to as $s(T_i)$ and a label may be referred to as $l(T_i)$. Additionally, a list of current and/or previous person models may be referred to as $\{M_i | i=1, 2, \ldots, n\}$. For each person model $M_i$, a person samples associated with the person model may be referred to as $\{s_j(M_i) | j=1, 2, \ldots n\}$. Additionally a label associated with a person model may be referred to as $l(M_i)$.

Figure 11:
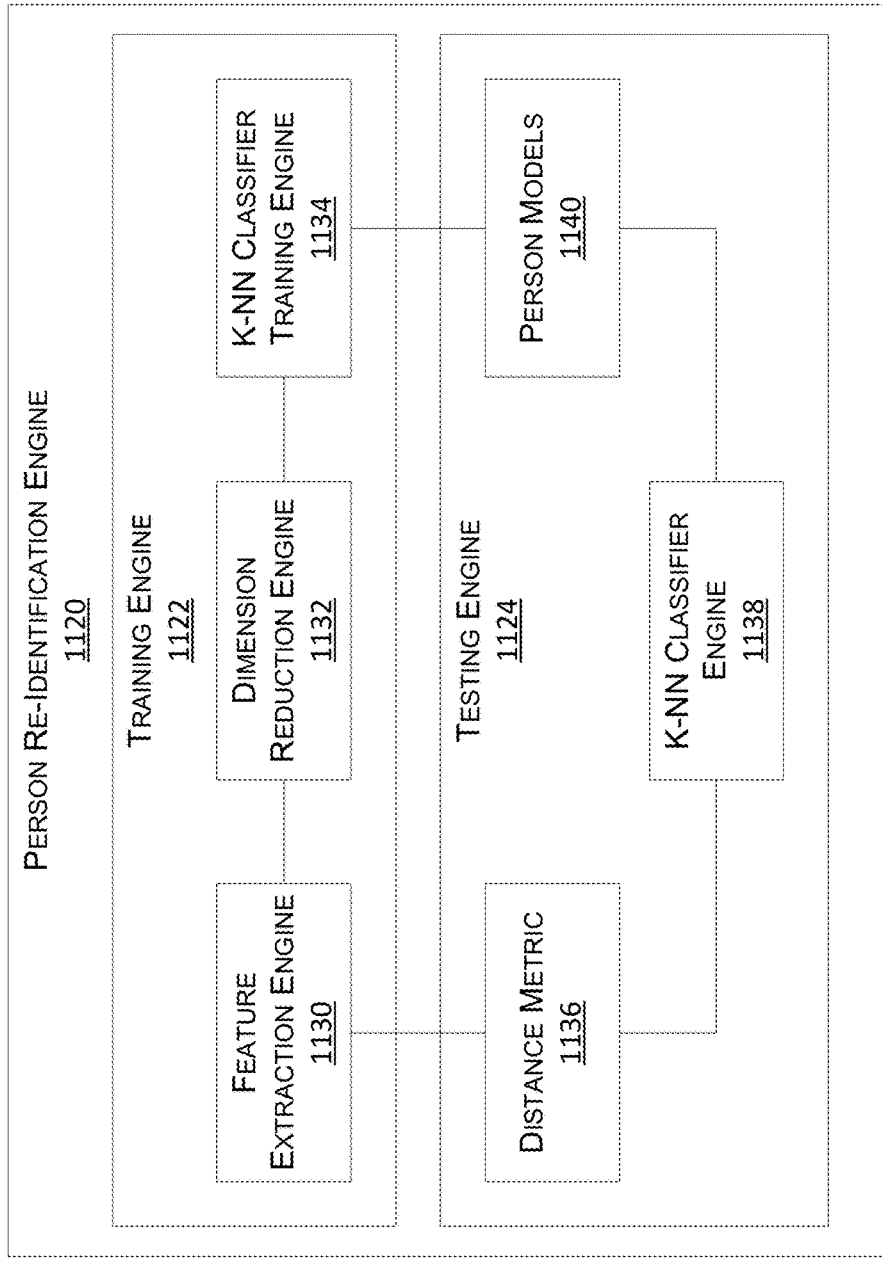
FIG. 11 illustrates an example of a person (or other object) re-identification engine.

FIG. 11 illustrates an example of a person re-identification engine 1120. FIG. 11 also illustrates an example of the interaction between the training engine 1122 and testing engine 1124 of the example person re-identification engine 1120.

In various implementations, the training engine 1122 can include a feature extraction engine 1130, a dimension reduction engine 1132, and a K-NN classifier training engine 1134. The K-NN classifier training engine 1134 is provided as one example of an engine for classifying features. In various implementations, techniques other than K-NN classification can be used.

In various implementations, the feature extraction engine 1130 can be used to extract color and texture features from a blob that represents a person. For example, a Retinex transform can be applied to each tracked blob to handle illumination variations. As a further example, an HSV color histogram can be extracted from the resulting Retinex image to produce color features. As another example, the feature extraction engine 1130 can also produce color descriptors and/or a Scale Invariant Local Ternary Pattern (SILTP) descriptor. As another example, the feature extraction engine 1130 can extract an improved operator over the Local Binary Pattern (LBP), as an illumination variant texture descriptor. In these and other examples, the color and texture descriptors can be stored together as a combined feature set. In these examples, the feature representation analyzes the horizontal occurrence of local features, and can maximize the occurrence to make a stable representation against viewpoint changes.

In various implementations, the feature extraction engine 1130 can also be used to learn a discriminant distance metric 1136, that is, a metric that can be used to discriminate among extracted features. To learn the discriminant distance metric 1136, a discriminant low dimensional subspace is found in the original feature space by cross-view quadratic discriminant analysis. The distance metric 1136 can be provided to the dimension reduction engine 1132 for reducing the dimensions of the features. The distance metric 1136 can also be used for distance computation when matching a testing sample to a person model 1140.

In various implementations, the testing engine 1124 can use various techniques to find a person model 1140 that is a near match for a set of extracted features. For example, the illustrated example person re-identification engine 1120 uses a K-nearest-neighbor (KNN) search method. In this example, the K-NN classifier training engine 1134 can store reduced feature vectors from the dimension reduction engine 1132, along with class labels. The K-NN classifier engine 1138 can take a distance metric 1136 and match extracted features to person models 1140. In other examples, other matching methods can be used.

Figure 12:
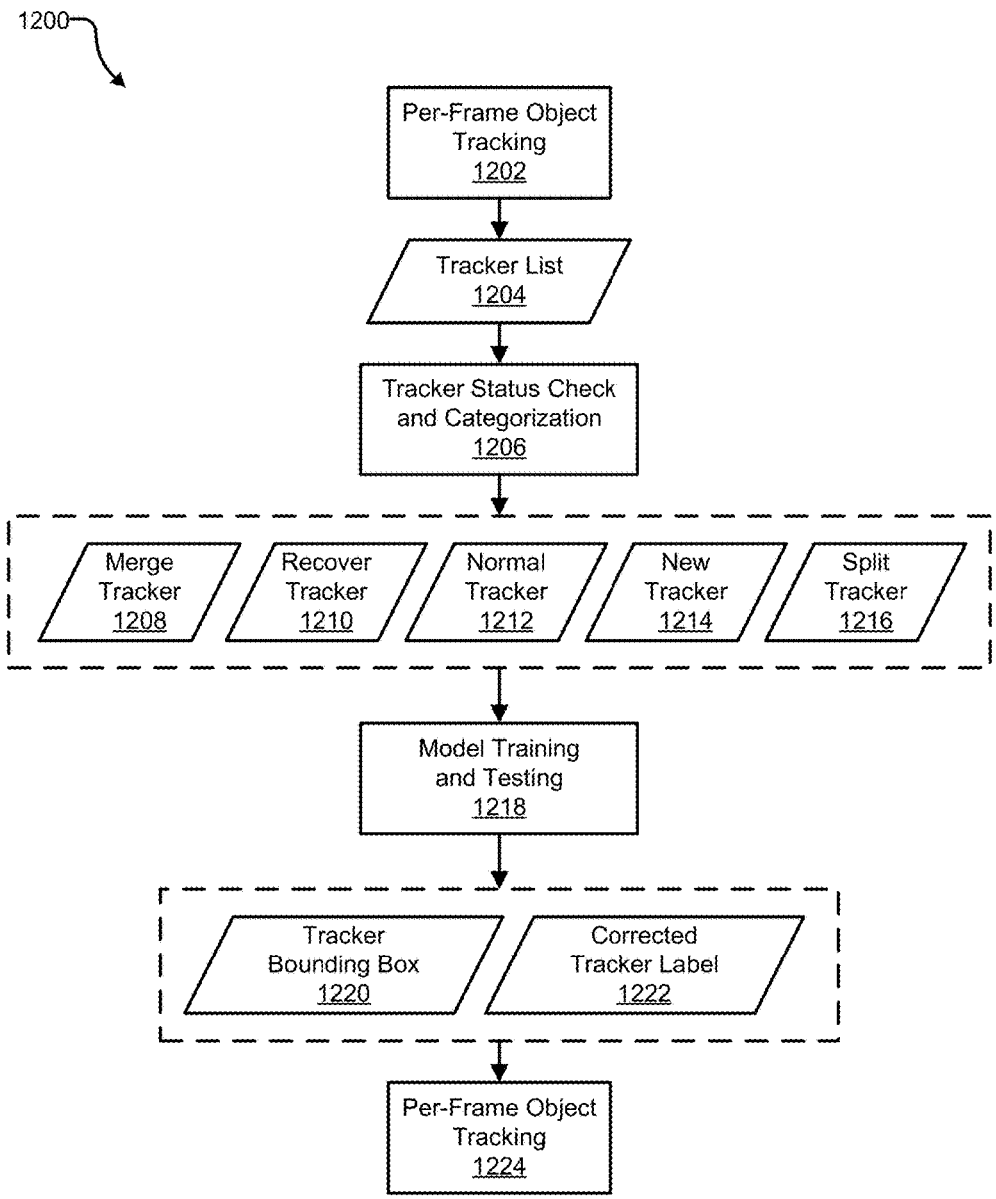
FIG. 12 illustrates an example of a process in which object tracking output is integrated into a person (or other object) re-identification workflow.

FIG. 12 illustrates an example of a process 1200 in which object tracking output is integrated into a person re-identification workflow. At step 1202, per-frame object tracking is conducted by the object tracking system. Per-frame object tracking can output a tracker list 1204, where the tracker list can include new trackers (e.g., trackers generated for the current input frame), previous trackers (e.g., existing trackers that were matched to objects in the current input video frame), and unmatched trackers (e.g., existing trackers that were not matched to objects in the current input video frame).

At step 1206, the process 1200 can include conducting a tracker status check and categorization. As discussed further below, this step can include filtering of the trackers in the tracker list 1204 to select trackers that will be used as input samples for the current input frame. Step 1206 can also include determining a type or status for each tracker in the tracker list 1204. A tracker can be, for example, a merge tracker 1208 when two or more trackers that were distinct in a previous input frame are treated as one tracker in the current input frame. As another example, a tracker can be a recover tracker 1210 when a previously lost tracker has been re-associated with a blob in the current input frame. As another example, a tracker can be normal tracker 1212 when the object associated with the tracker has been moving within the scene without interacting with other moving objects, becoming obscured, or otherwise experiencing a change that may cause the object tracking system to re-evaluate whether the blob and the tracker should be associated with each other. As another example, a tracker can be a new tracker 1214 when the tracker is generated for the first time for the current input frame. As another example, a tracker can be a split tracker 1216 when a single tracker in a previous frame splits into multiple trackers in the current input frame.

At step 1218, the process 1200 can include model training and testing. As discussed further below, model training and testing can include using the tracker status or type to determine whether the tracker should be used for training or testing, and/or which process should be used for training or testing. As also discussed below, during this step, the process 1200 may determine that a label associated with a tracker by the object tracking system was incorrect. The process may further determine a corrected label. For each tracker that is considered at step 1218, the process 1200 can produce a tracker bounding box 1220 (e.g., the bounding box associated with the tracker) and a corrected tracker label 1222 (or the original tracker label, when the original tracker label was found to be correct).

At step 1224, the process 1200 can provide the tracker bounding box 1220 and the corrected tracker label 1222 to the object tracking system, and per-frame object tracking can proceed with the corrected tracker label 1222.

Figure 13:
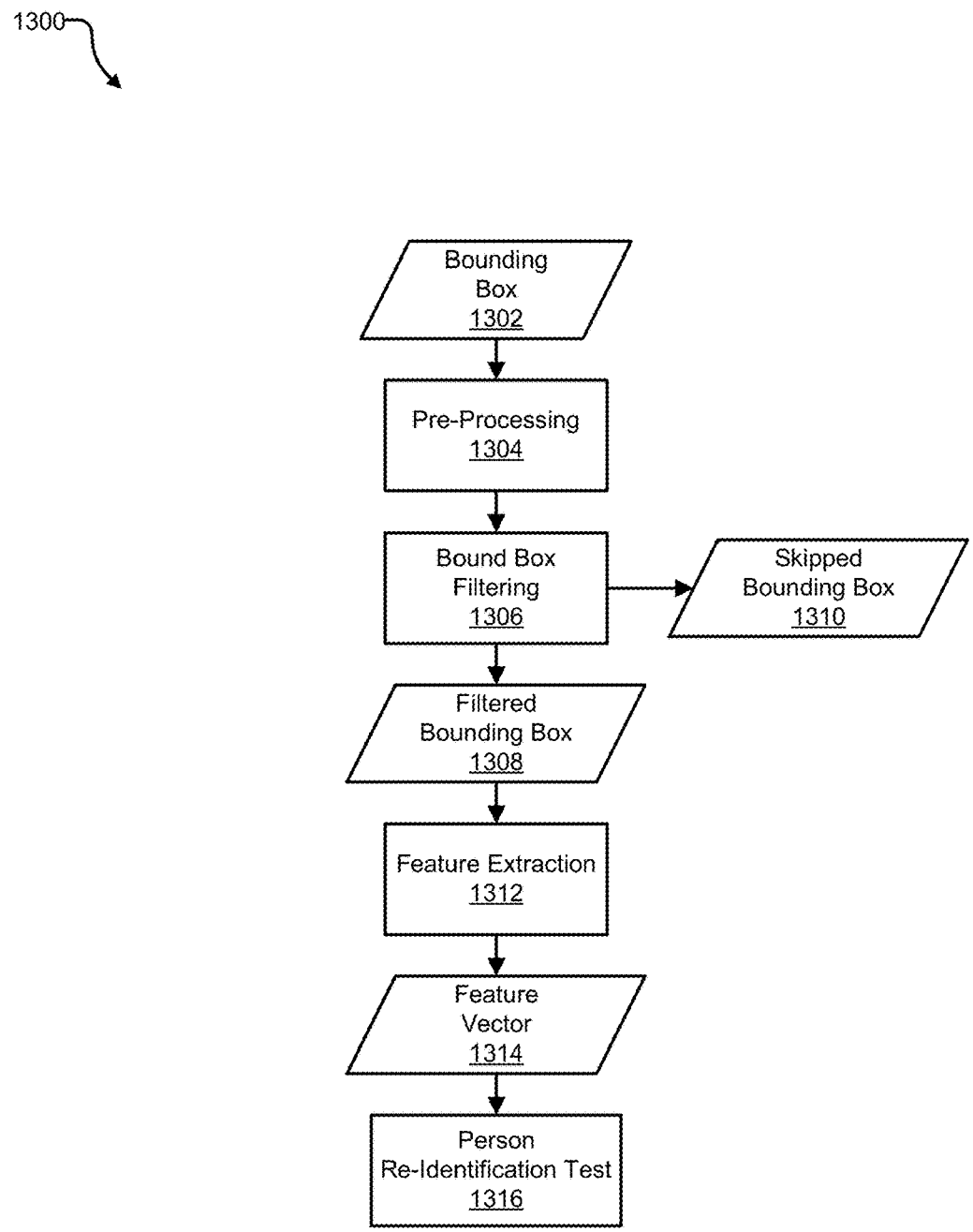
FIG. 13 illustrates an example of a process for processing a bounding box that may be input to a person (or other object) re-identification test.

FIG. 13 illustrates an example of a process 1300 for processing a bounding box 1302 that may be input to a person re-identification test 1316. An input bounding box 1302 can be generated for a current input video frame. In most cases, the bounding box 1302 has been associated with a tracker. The process 1300 can be executed by an input processing engine of a person re-identification engine, and/or by an object tracking system.

At step 1304, the bounding box 1302 may undergo pre-processing operations. Pre-processing operations can include, for example, normalizing the image data in the bounding box 1302. Normalization can include, for example, changing the format of the image data to YUV444 (or some other format) and/or scaling the bounding box size to, for example, 64 pixels by 128 pixels or some other size. In some examples, the aspect ratio of the bounding box 1302 is also normalized, meaning that the contents of the bounding box may be stretched and/or compressed to a common width and height.

At step 1306, the bounding box 1302 may undergo bounding box filtering. In this step, the tracker associated with the bounding box 1302 may be selectively filtered to determine whether the tracker and bounding box 1302 should be considered by the person re-identification test 1316. In various implementations, not every bounding box for every input frame is tested. Testing only some bounding boxes (or possibly no bounding boxes, for a given input frame) can reduce the computational load for the person re-identification testing, and can also improve the quality of the person models and the testing results. Some bounding boxes may qualify for testing, and are output at step 1306 as a filtered bounding box 1308. Bounding boxes that do not qualify for testing are output as a skipped bounding box 1310, which does not continue through the remainder of the process 1300.

In various implementations, the bounding box 1302 may be filtered to first determine whether the contents of the bounding box 1302 include a blob that represents person. To determine whether the bounding box 1302 includes a person, step 1306 can include, for example, aspect ratio filtering and/or size filtering. For example, a width-to-height aspect ratio of 0.95 (or between 0.85 and 0.95, or within a range of some other suitable value) can qualify the bounding box 1302 for person re-identification. The size that is tested can be the original dimensions of the bounding box 1302, that is, the size of the bounding box 1302 prior to normalization. In various implementations, the width, height, and/or area can be tested against minimum and/or maximum thresholds. The minimum and maximum thresholds can be automatically determined by the system, which can observe moving objects over multiple video frames to identify the types and sizes of objects within the scene.

In various implementations, the bounding box 1302 can further be filtered according to the status of the tracker that is associated with the bounding box 1302. For example, in some implementations, the input bounding box 1302 qualifies as a filtered bounding box 1308 when the tracker associated with the bounding box 1302 had a status change for the current input frame. That is, the tracker may have had a first status (e.g., normal status), and when the tracker was updated for the current video frame the status changed (e.g., to merge status, or some status other than normal). In various implementations, a status changes can include a change from lost status to recover status and a change to split status from another status. In various implementations, a new status for a newly generated tracker can also be considered a change in status for the tracker.

At step 1312, the filtered bounding box 1308 can undergo feature extraction. During feature extraction, the filtered bounding box 1308 can be treated as a picture patch or image patch, and various processes, such as those discussed above with respect to FIG. 11, can be conducted on the filtered bounding box 1308 of FIG. 13. For example, feature extraction can include extracting values for the colors, textures, gradients, illumination, and/or other characteristics of the contents of the filtered bounding box 1308. Step 1312 can also include dimensionality reduction, in which the complexity of the extracted features can be reduced.

The output of step 1312 is a feature vector 1314. The feature vector 1314, along with the filtered bounding box 1308 and a tracker associated with the filtered bounding box 1308, can be provided to the person re-identification test 1316.

Figure 14:
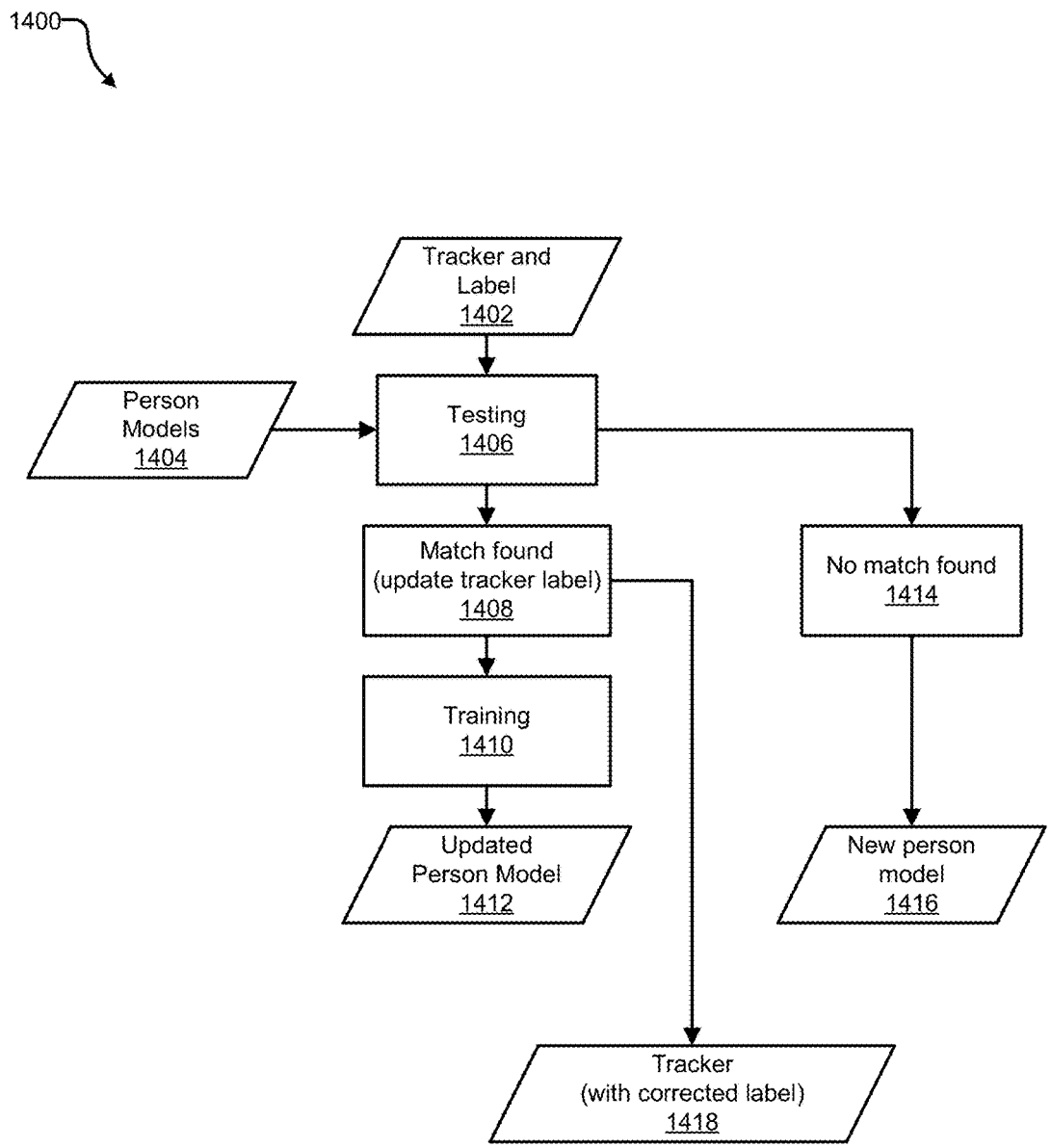
FIG. 14 illustrates an example of a process that can be implemented by a person (or other object) re-identification engine.

FIG. 14 illustrates an example of a process 1400 that can be implemented by a person re-identification engine. The input to the process 1400 is a tracker and label 1402, $T_i$ and $l(T_i)$, respectively. The label can have been assigned to the tracker by the object tracking system using only the blob extracted from the current input video frame and/or a bounding box associated with the blob, and previous trackers. Because the object tracking system may not be explicitly attempting to re-identify the same person, the label may be incorrect. The tracker and label 1402 may have been filtered from multiple trackers output for a given frame by the object tracking system, as discussed above. The tracker filtering procedure can have identified the tracker as eligible for testing by the person re-identification engine. Alternatively or additionally, in some implementations, the tracker is tested when the tracker label does not match the label of any person model 1404.

The process 1400 provides the tracker and label 1402 a testing step 1406. Also input into the testing step 1406 are one or more person models 1404, $M_i$, that have corresponding labels $l(M_i)$. The testing step 1406 can determine whether the tracker and label 1402 match any of the person models 1404. In various implementations, the testing step 1406 can test the tracker based on the status of the tracker, as discussed further below. In some implementations, the tracker may be tested against only some person models 1404, as discussed further below. In some implementations, the tracker may be tested against all the person models 1404. In some implementations, a matching person model is one that has features that are similar to features extracted from a blob (e.g., from the current input video frame) associated with the tracker. Similar can mean, for example, that a feature from the blob is within a threshold value of a feature from the person model. For example, the feature extracted from a blob can compared to a model $M_i$ to get the similarity value; that is a numerical value representing a distance between the feature extracted from the blob and the corresponding feature in the model. In this example, the person model with the smallest distance value (e.g, a distance that is less than a threshold) can be determined to be the matching person model. Also in this example, the feature in the model can represent features extracted from samples stored in the person model $M_i$.

When the testing step 1406 determines that none of the person models 1404 matches the tracker and label 1402, the process 1400 can proceed to step 1414. This can occur, for example, when a new person has been found in the scene in the current input video frame. The process 1400 can also proceed to step 1414 when the person re-identification system has no person models 1404, as would be the case when the person re-identification engine is first initialized. At step 1414, the person re-identification engine can generate a new person model 1416. The new person model 1416 can be initialized with the features extracted from the blob that is associated with the tracker, as well as the tracker label.

Returning to step 1406, when the person re-identification engine finds a person model 1404 that matches the tracker and label 1402, the process 1400 proceeds to step 1408. At step 1408, in some cases the person re-identification engine may update the tracker label. For example, when the tracker label is different from the model label of the matching model, the tracker label can be changed to the model label. From step 1408, the person re-identification engine can output the tracker 1418 with the corrected label. In various implementations, the tracker 1418 with the corrected label can be provided to the object tracking system, and the object tracking system can use the tracker 1418 with the correct label for further tracking of the object.

Returning to step 1408, the tracker and the person model that matches the tracker is provided to a training step 1410. In the training step 1410, the features from the tracker can added to the person model. For example, the blob associated with the tracker can be treated as an image sample, and features extracted from the blob can be stored in the person model. In some examples, a person model $M_i$, can contain one or more person samples, which can be referred to as $\{s_j(M_i)|j=1, 2, \ldots n\}$. In these examples, a sample can include the features or a feature vector extracted from a blob from a previous input video frame. In these examples, the person model can accumulate samples (and corresponding feature vectors) that have a certain proximity to each other. In some examples, the person model $M_i$ can combine the samples, for example by computing an average over time. In some examples, the person model can accumulate samples and can combine the samples (for example by computing a mean, median, or some other combined value) during the testing step 1406. In some examples, the person model $M_i$ can use the samples to determine a range, such as a minimum acceptable value for a feature (or for the feature vector) and a maximum acceptable value for the feature (or feature vector). In these examples, the minimum and maximum values can be adjusted during the training step 1410. The output of the training step 1410 is an updated person model 1412. The updated person model 1412 can be used in subsequent iterations of the process 1400.

In some implementations, the training step can occur before the testing step. When training occurs first, the training step can locate a person model 1404 that has a model label $l(M_i)$ that is the same as the tracker label $l(T_i)$. The features from the tracker can be added to this person model. When no person model a can be found that has a model label that is the same as the tracker label (e.g., because the tracker was mislabeled or because the tracker is for a new person), the person re-identification engine can enter the testing step. In the testing step, the person re-identification engine can use the features from the tracker to find a person model that has similar features. When a person model is found, the person re-identification engine can update the tracker's label to the label of the person model. In some implementations, the person re-identification engine can also update the person model with the features from the tracker.

Figure 15:
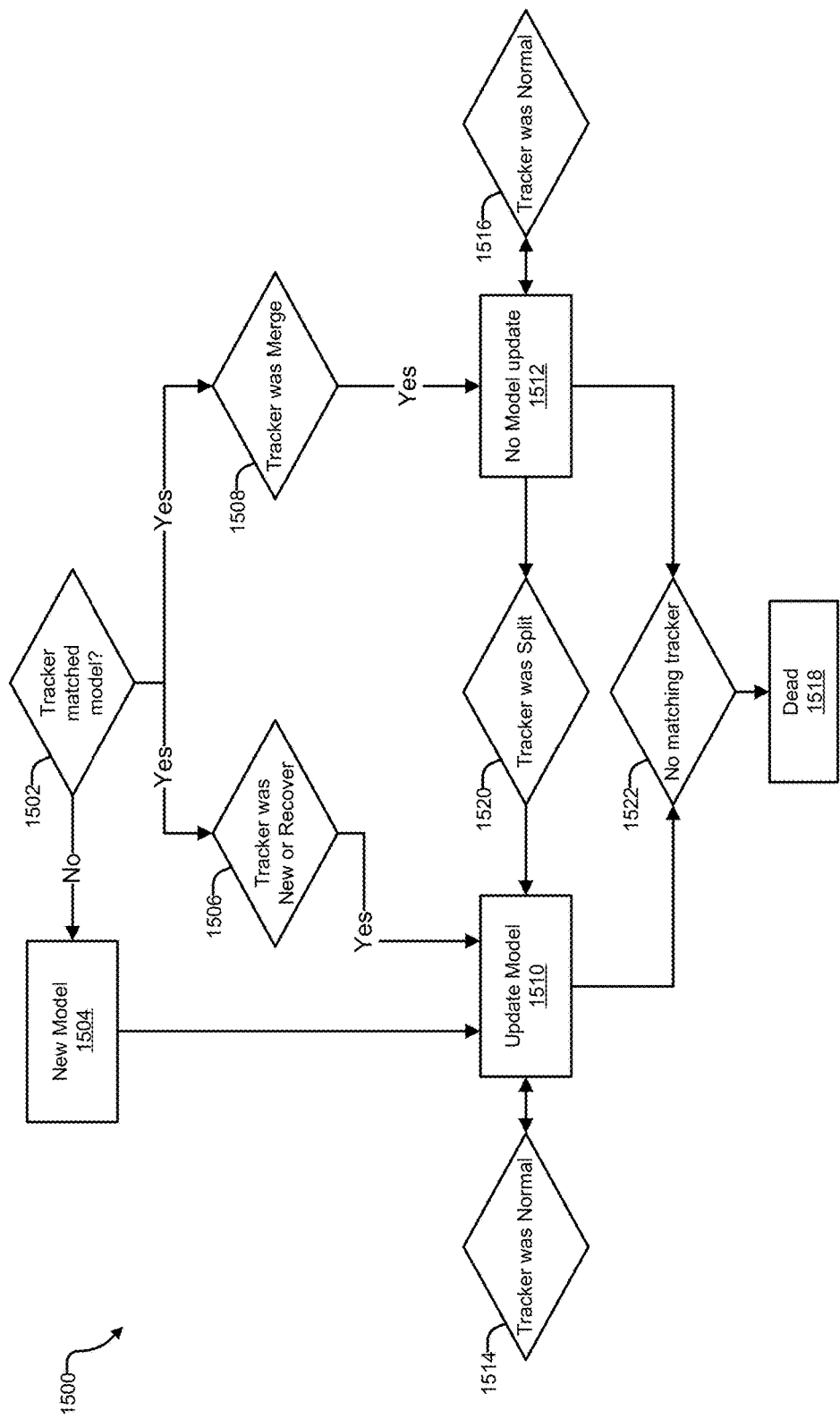
FIG. 15 illustrates an example of the life cycle of a person model.

To improve the quality of the person models, a person model may not be updated for every input video frame. Instead, the person model can include a current state, and the person model may be updated when the person model is in a particular state. FIG. 15 illustrates an example of the life cycle 1500 of a person model. The life cycle 1500 can be maintained by the training module of a person re-identification engine. In the illustrated example, the person model can have four states: new model 1504, update model 1510, no model update 1512, and dead 1518. Each transition illustrated in the example of FIG. 15 can occur when a new input frame is received, and a tracker is updated for any blobs found in the input frame. The updated tracker can be input to the training module.

As illustrated by step 1502, when an input tracker does not match any existing person model, a new model can be generated, where the new model is put into the new model 1504 state. The new person model can be initialized with data from the input tracker. In various implementations, from the new model 1504 state the person model transitions to the update model 1510 state, which is discussed further below.

At step 1502, when the input tracker matches an existing person model, at step 1506 the module can determine whether the input tracker was a new or recover tracker. Simultaneously or sequentially, at step 1508 the module can determine whether the input tracker was a merge tracker. At step 1506, when the tracker was a new or recover tracker, the person model can transition to the update model 1510 state. In some cases, the person model transitions to the update model 1510 state from the new model 1504 state or from the no model update 1512 state. In some cases, the person model can transition to the update model 1510 state from the dead 1518 state.

In the update model 1510 state, the person model can be updated with the data from the input tracker. For subsequent input trackers, step 1514 illustrates that when the input tracker is a normal tracker, the current update model 1510 state can be maintained. The person model can also be updated with the data from current input tracker.

Returning to step 1508, when the input tracker is a merge tracker, the person model can transition to the no model update 1512 state. In the no model update 1512 state, the person model may not be updated for the current input tracker, and the current data in the person model may be maintained. For merge trackers, the blob associated with the tracker may represent one person or another person or no person. In each of these cases, updating the person model may result in the person model becoming less representative of a single person. Hence, when the input tracker is a merge tracker, the person model can transition to the no model update 1512 state. For subsequent input trackers that are normal trackers, as illustrated by step 1516, the person model remains in the no model update 1512 state.

When the input tracker is a split tracker, such as at step 1520, the person model can transition to the update model 1510 state. In some cases, the person model transitions to the update model state 1510 from the no model update 1512 state. In some cases, the person model may already be in the update model 1510 state.

When a duration $T_{lost}$ has passed, during which no tracker has matched the person model, the module may determine that the person associated with the person model has not been present in the scene during the duration, and may not be returning. At step 1522, when the duration $T_{lost}$ has passed, the person model may transition to the dead 1518 state. The duration $T_{lost}$ can be set to, for example 5 or 10 frames, or 10 or 30 seconds, 1800 frames or 1 minute, or some other interval of time. In some implementations, the person model can be removed or deleted when the person model enters the dead 1518 state. In some implementations, the person model may remain in the dead 1518 state for a few frames, in case the person associated with the model re-enters the scene.

In various implementations, persons models may be tested against only some trackers from all currently available trackers. By selectively testing person models, the quality of both the person models and the person re-identification can be improved. In various implementations, the testing module of a person re-identification engine can include two stages, where each stage can be configured to execute different testing operations. For example, in the first stage, a person model may be tested only against split trackers. Split trackers can be associated with blobs that were previously merged, and, as noted above, in some implementations, merge trackers are not tested for person re-identification. Hence, the person re-identification engine may prioritize identification of split trackers. In this example, when the person model does not match any available split trackers, then, in a second stage, the person model can be tested against other trackers.

Figure 16:
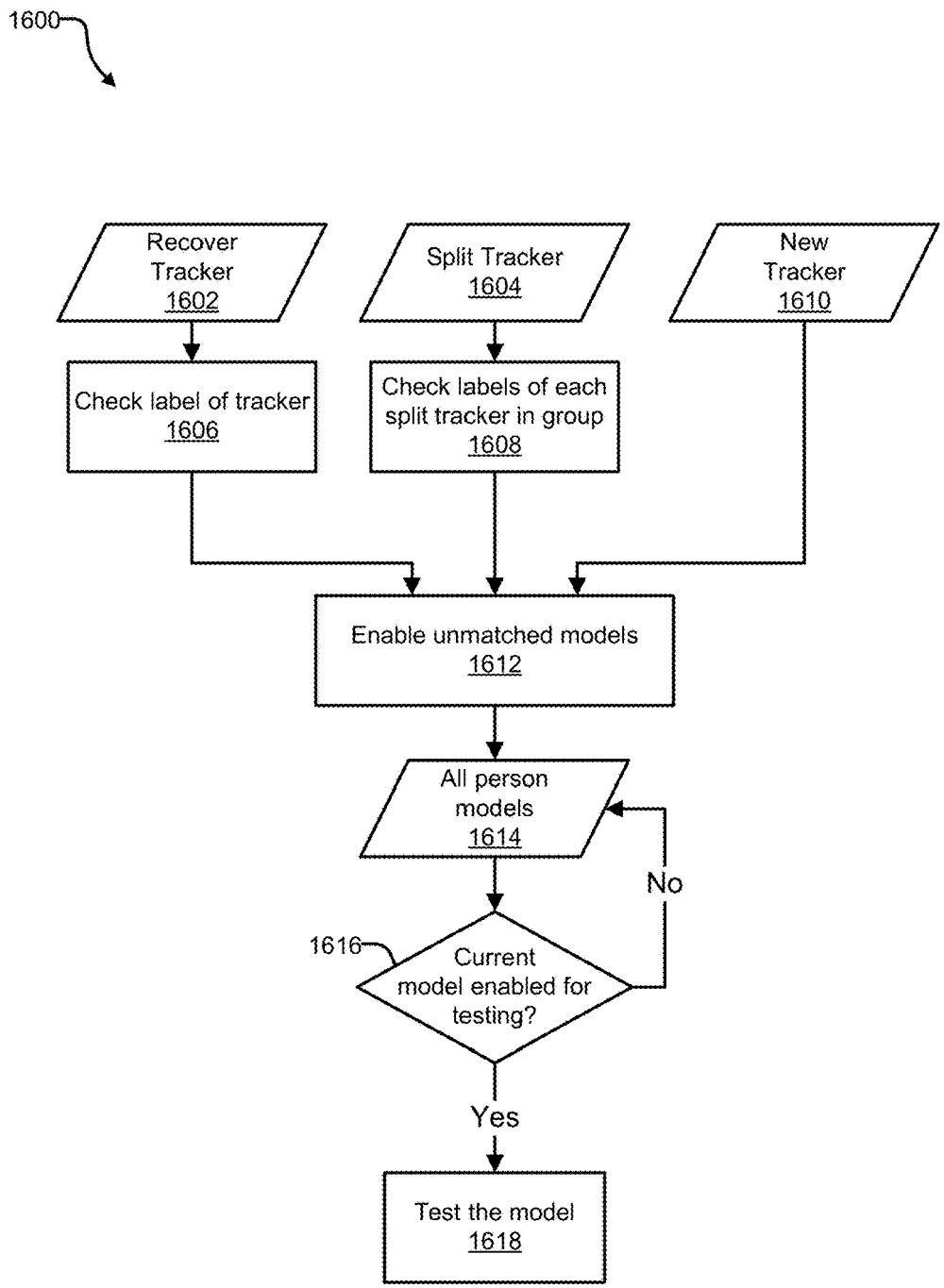
FIG. 16 illustrates an example of a process for filtering person models.

In some implementations, person models can be selectively tested, so that not every person model is tested for every input video frame or for every currently active tracker. FIG. 16 illustrates an example of a process 1600 for filtering person models. In various implementations, the testing module of the person re-identification engine can maintain a flag or a bit or a status that indicates whether, for the current input video frame and/or for a given tracker, a particular person model needs to be tested.

In various implementations, whether the particular person model will be tested can depend on a tracker's status. For example, for a recover tracker 1602, at step 1606, the process 1600 may check whether the tracker's label is the same as the label of the person model. When the labels are the same, then the status flag or bit for the person model can be set to enable the person model for testing. As another example, when the tracker is a split tracker 1604, at step 1608, the process 1600 can check the labels of each tracker in the split group to which the split tracker 1604 belongs. When the person model's label matches the label of any tracker in the split group, the status flag or bit for the person model can be set to enable the person model for testing.

At step 1612, the process 1600 can enable the status flag or bit for any remaining person models that have not yet been matched to a tracker from the current input video frame. That is, when a matching tracker has been found for a person model, the person model is not tested again for any other trackers from the current input video frame. Not allowing a person model to be tested again once a matching tracker is found can avoid the label of the person model being assigned to two or more trackers.

The output of step 1612 can be a list of all currently available person models 1614, regardless of whether the person model will be tested. At step 1616, the process 1600 can check whether a person model from all the person models 1614 has been enabled for testing. When the person model has not been enabled for testing, the process 1600 proceeds to the next person model. When the person model has been enabled for testing, the process proceeds to step 1618, and tests the person model against one or more input trackers. After step 1618, the testing status of the person model may change (e.g., a matching tracker may have been found), such that the person model will not be tested again for the current input video frame. When no matching tracker is found, however, the person model may remain enabled for testing.

In various implementations, the testing module of a person re-identification engine can execute different testing processes for different trackers. Tracker status (e.g., recover, new, normal, split, and others) can provide information about an object that can be used to improve identification of the object when the object is a person.

For example, a tracker can be a recover tracker when a person left the scene and then re-entered, upon which the tracker for the person is identified as a recover tracker. Similarly, a person may have become merged or hidden among other objects, and once the person has become unmerged or unhidden, the tracker associated with the person can be assigned the recover status. In various implementations, a recover tracker $T_i$ is tested only against a person model $M_i$ that has a same label $l(M_i)$ as the label $l(T_i)$ of the recover tracker. In these implementations, it can be assumed that the recover tracker is for the person for whom the person model $M_i$ was generated, and that the person model can be updated with the data from the tracker. When, however, the recover tracker does not match the person model, it may be that the recover tracker was incorrect; that is, the object tracking system may have determined that the person was found after having been lost when, in fact, the person is a new person, or is a person that should have been associated with a different tracker. In some implementations, when the person associated with the recover tracker does not match the person model, the recover tracker may be disabled or removed from further use.

Another example of a testing that may be particular to a tracker type can occur for new trackers. In various implementations, new tracker can be tested against all person models, and/or against all not-yet-matched person models. A new tracker may be associated with a person who has just entered the scene, or who has otherwise not been previously associated with a tracker. The new tracker may be tested against many person models to check against the possibility that the person was in the scene previously. When no matching person model is found, the person re-identification system can generate a new person model.

Normal trackers may be the most common trackers for any given input frame. In some examples, the person re-identification engine may use normal trackers only for updating person models, and not for testing. For example, when a person model is found that has a same label as the label of a normal tracker, and the person model is in the update state, the person model can be updated with the data from the normal tracker. When no person model is found that has a same label as the normal tracker, in some implementations, the person re-identification engine may not look for a matching person model.

As another example, a person re-identification engine can have testing processes that are particular to split trackers. Split trackers may be grouped, where a group of split trackers includes trackers that were spit from the same source. In some cases, since the object tracking system may not be sensitive to the contents of the blobs that resulted from a split event, the object tracking system may swap labels among split trackers in a split group. For example, for two trackers, $T_i$ and $T_j$, that existed before a merge event, tracker $T_i$ may be assigned label $l(T_j)$ for tracker $T_j$ after a split event. Similarly, in this example, tracker $T_j$ may be assigned label $(T_i)$. When these trackers are subsequently used for person re-identification testing, the person model $M_i$, which has label $l(M_i)$, may be incorrectly associated with tracker $T_j$, based on tracker $T_j$ having label $l(T_i)$ that matches label $l(M_i)$. Person model $M_i$ may then be updated with incorrect data from tracker $T_j$.

To avoid incorrectly associating person models with trackers in a split group, in some implementations, the person re-identification engine may swap labels between trackers in a split group. For example, when tracker $T_i$ matches person model $M_k$, but the label $l(M_k)$ matches the label $l(T_j)$ of another tracker in the split group, $T_j$, the person re-identification engine can swap the labels $l(T_i)$ and $l(T_j)$ before proceeding further with the testing phase.

Figure 17:
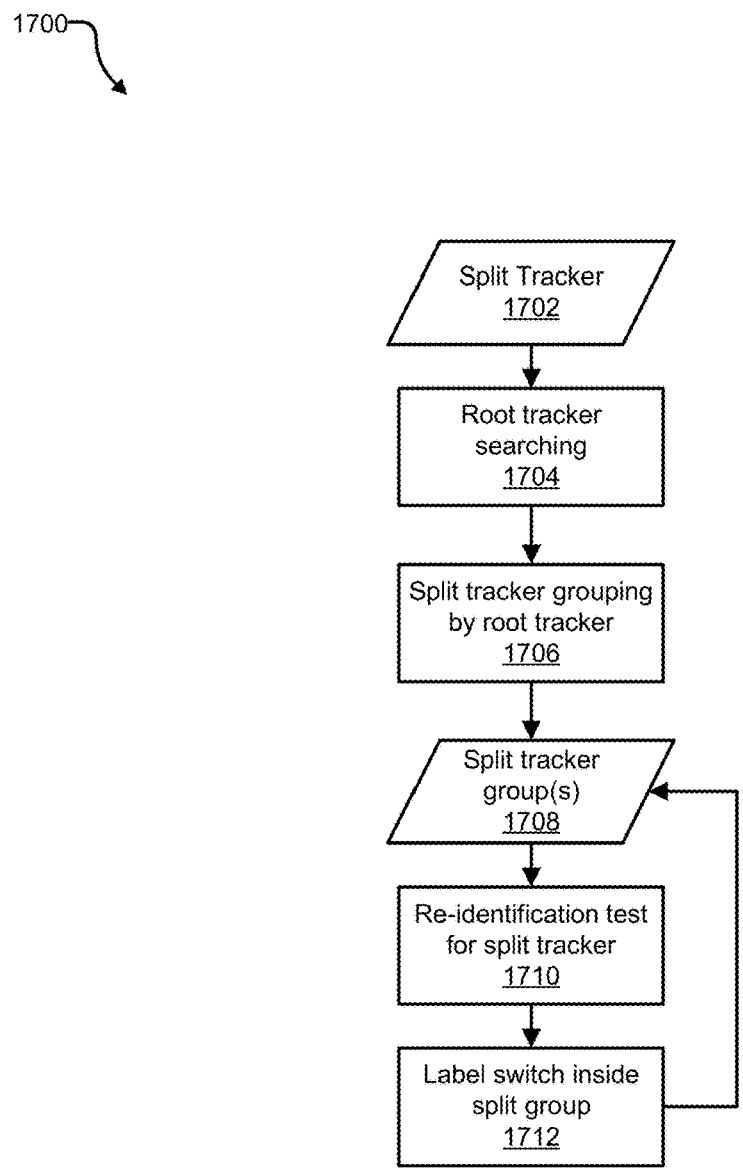
FIG. 17 illustrates an example of a process for testing split trackers.

FIG. 17 illustrates an example of a process 1700 for testing split trackers. For the split trackers 1702 from a current input video frame, the process 1700 can, at step 1704, conduct root tracker searching. Root tracker searching can include determining which split trackers are the parents of other split trackers. A split tracker can be a parent tracker by, for example, having been the parent in a merge group.

At step 1706, the process 1700 can include grouping split trackers. Split trackers can be grouped, for example, by identifying the root tracker for a given split tracker. Split trackers that have the same root tracker can be grouped into one split group. The output of step 1706 can be one or more split tracker groups 1708.

At step 1710, the process 1700 can include re-identification testing for split trackers, as discussed above. A split tracker may be tested only to person models that have labels that correspond to labels of trackers within the split group. At step 1712, the process 1700 may switch or swap labels within the split group, to correct for labels that were incorrectly assigned to trackers. The process 1700 can repeat the testing step 1710 and label switching step 1712 for each split tracker group 1708.

Figures 18A, 18B:
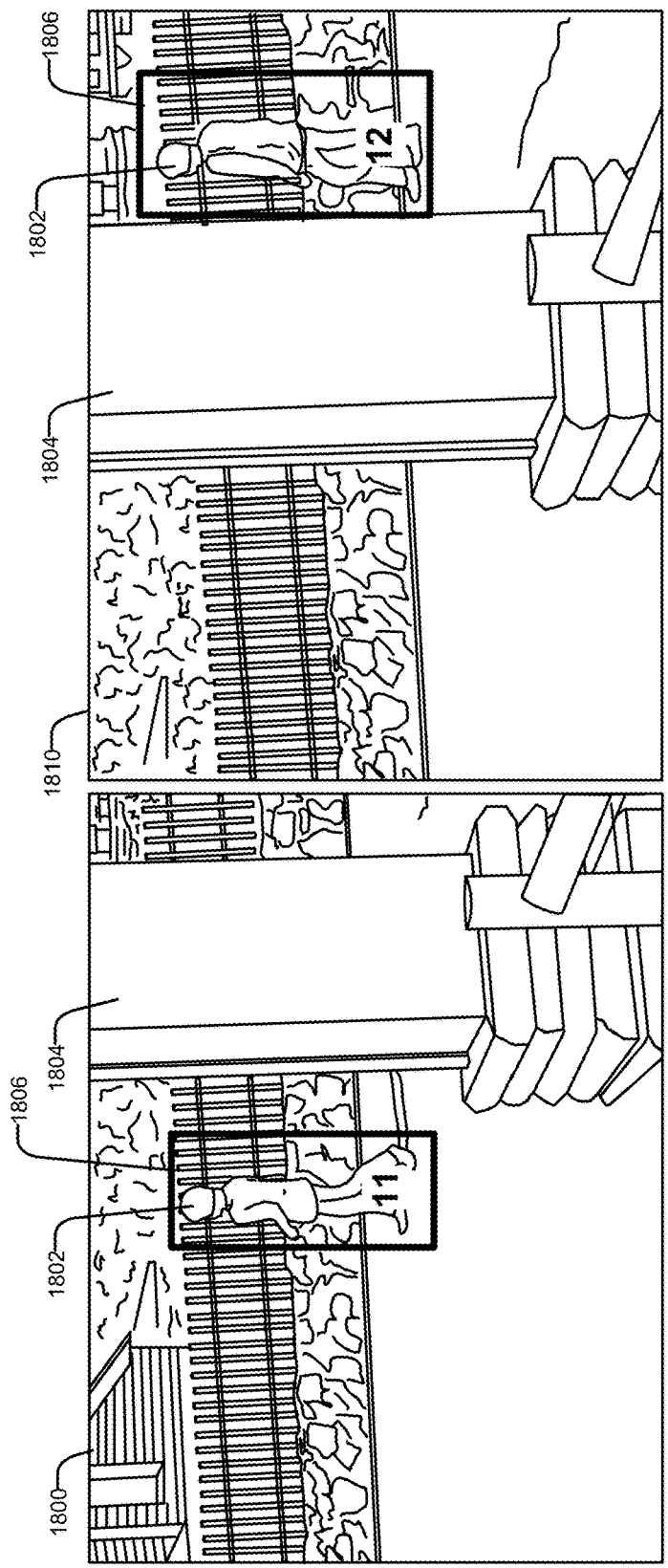
FIG. 18A and FIG. 18B illustrate an example of incorrect person re-identification.

FIG. 18A and FIG. 18B illustrate an example of incorrect person re-identification that occurred due to a person 1802 being tracked having momentarily passed behind a stationary object 1804. In the video frame 1800 in FIG. 18A, the bounding box 1806 for the person 1802 may have resulted in a tracker status of normal tracker. The tracker can be assigned label "11." The video frame 1810 of FIG. 18B may occur 1, 15, or 30 frames, or some other number of frames after the video frame 1800 of FIG. 18A. In the video frame 1810 of FIG. 18B, the person 1802 is now on the other side of the stationary object 1804 (a pillar). In this video frame 1810, the person may be identified as a new, not-seen-before blob. In this example, the bounding box 1806 may result in a new tracker being generated, with label "12."

FIG. 18C and FIG. 18D illustrate an example where the object tracking results illustrated in FIG. 18A and FIG. 18B are supplied to a person re-identification engine prior to being output. In the video frame 1820 in FIG. 18C, the bounding box 1806 for the person 1802 has been previously identified by the label "11" Additionally, the person re-identification engine may have generated a person model for the person 1802, where the person model captures distinctive features of the person (e.g., a white hat, a blue jacket, and black pants). The person model can also have been assigned the label "11."

For the video frame 1830 of FIG. 18D, the tracker associated with the bounding box 1806 for the person 1802 may be a new tracker. In this example, the person re-identification engine may have tested the new tracker against existing person models, and have found a match in the person model with label "11. " The person re-identification engine may subsequently change the label associated with the bounding box 1806 to "11," prior to the bounding box 1806 being output by the object tracking system.

Figure 19B:
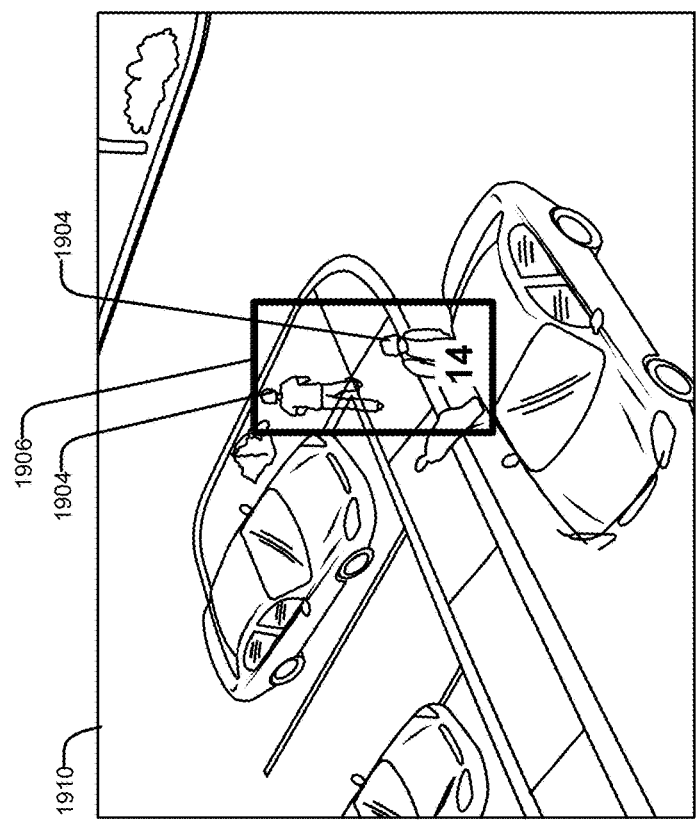
FIG. 19A and FIG. 19B illustrate an example of a merge event.
Figure 19A:
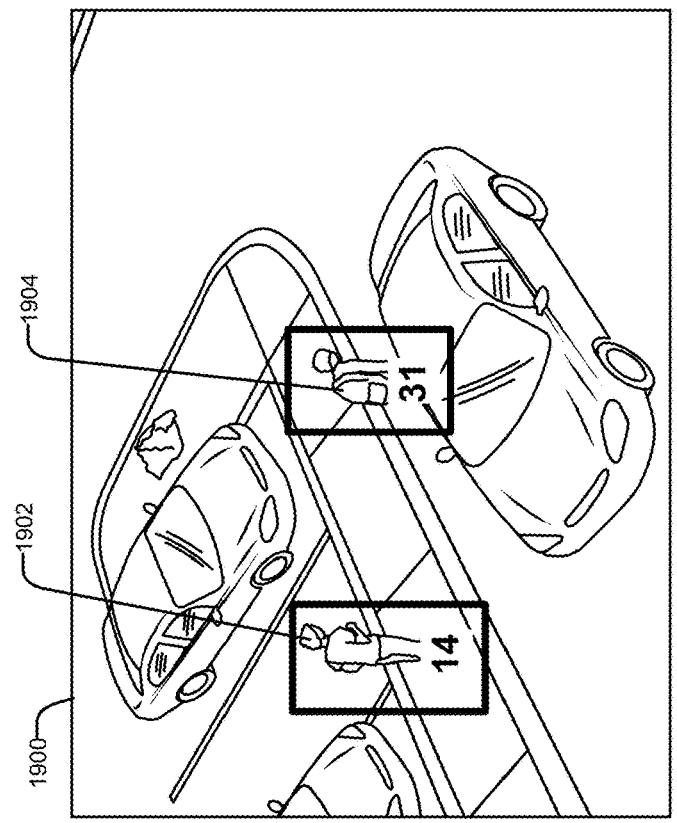

FIG. 19A and FIG. 19B illustrate an example of a merge event. In the video frame 1900 of FIG. 19A, a first person 1902 has been assigned label "14" while a second person 1904 has been assigned label "31." In the video frame 1910 of FIG. 19B, the first person 1902 has moved close enough to the second person 1904 that the object tracking system has associated both people 1902, 1904 with one bounding box 1906. In other words, the object tracking system has merged the two people 1902, 1904 into a single object. The object tracking system has assigned the merged bounding box the label "14" from the first person 1902. In other examples, the object tracking system may have assigned the label "31" from the second person 1904 to the bounding box 1906.

Figure 19D:
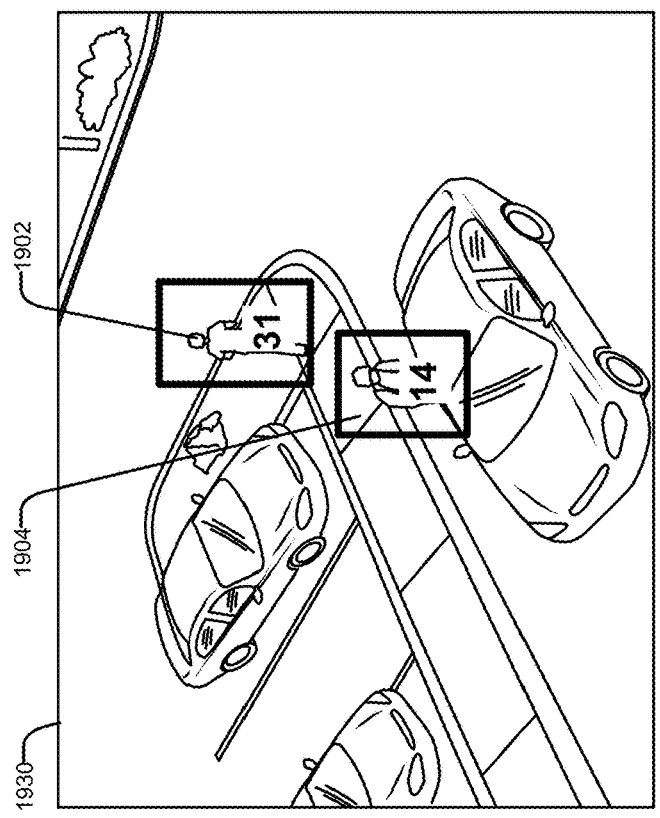
FIG. 19C and FIG. 19D illustrates examples of a split event that followed a merge event.
Figure 19C:
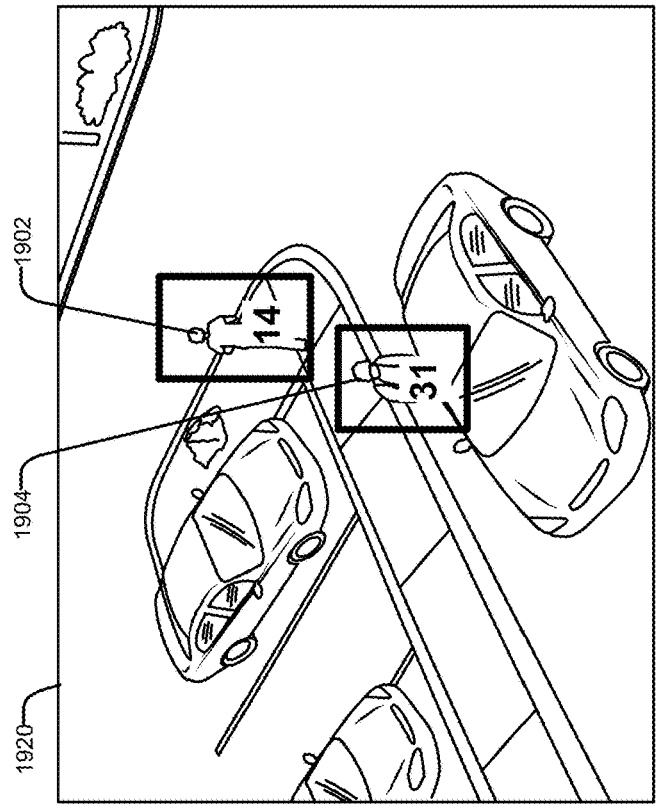

FIG. 19C illustrates an example of a split event that followed the merge event illustrated in FIG. 19B, where the resulting split trackers were tested by the person re-identification engine prior to being output. In the video frame 1920 of FIG. 19C, the first person 1902 has moved away from the second person 1904, such that the object tracking system has associated each person 1902, 1904 with a distinct bounding box. Additionally, the person re-identification engine, using for example processing specific to split trackers, has correctly associated the first person 1902 with the label "14" and the second person 1904 with the label "31."

FIG. 19D illustrates an example of the split event, where the system lacked a person re-identification engine. In the video frame 1930 of FIG. 19D, the object tracking system has incorrectly associated the second person 1904 with the label "14" and the first person with the label "14." The label assignment may have been based on proximity of the people 1902, 1904 to a previous location of each tracker, or may have been random. In any case, relying on the object tracking system, alone, can result in erroneous labeling of the bounding boxes.

Figure 20A:
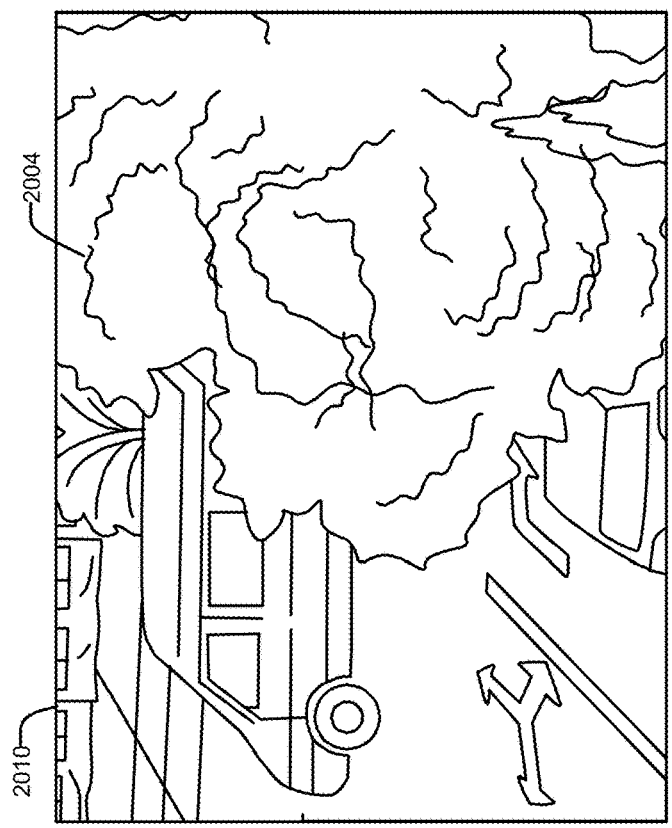
FIG. 20A and FIG. 20B illustrate an example of a person for whom an object tracker becomes lost when the person becomes obscured.
Figure 20B:
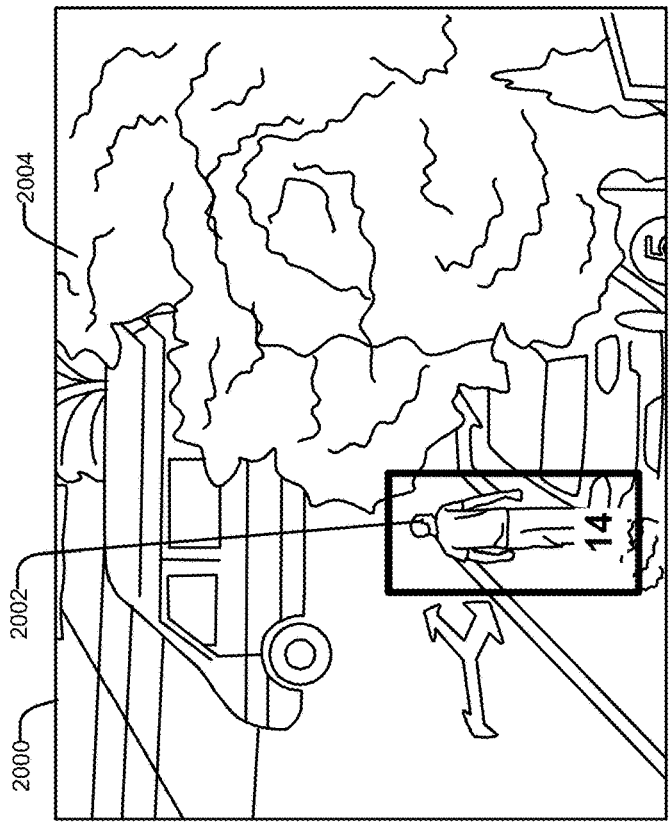

FIG. 20A and FIG. 20B illustrate an example of a person 2002 for whom an object tracker becomes lost when the person becomes obscured by the leaves of a tree 2004. In the video frame 2000 of FIG. 20A, the bounding box for the person 2002 has been associated with the label "14." The video frame 2010 in FIG. 20B can have been captured several seconds later. In the video frame 2010, the person 2002 has moved behind the leaves of a tree 2004, and has become completely obscured. For this video frame 2010, the tracker for the person 2002 may be transitioned to the lost state.

Figure 20D:
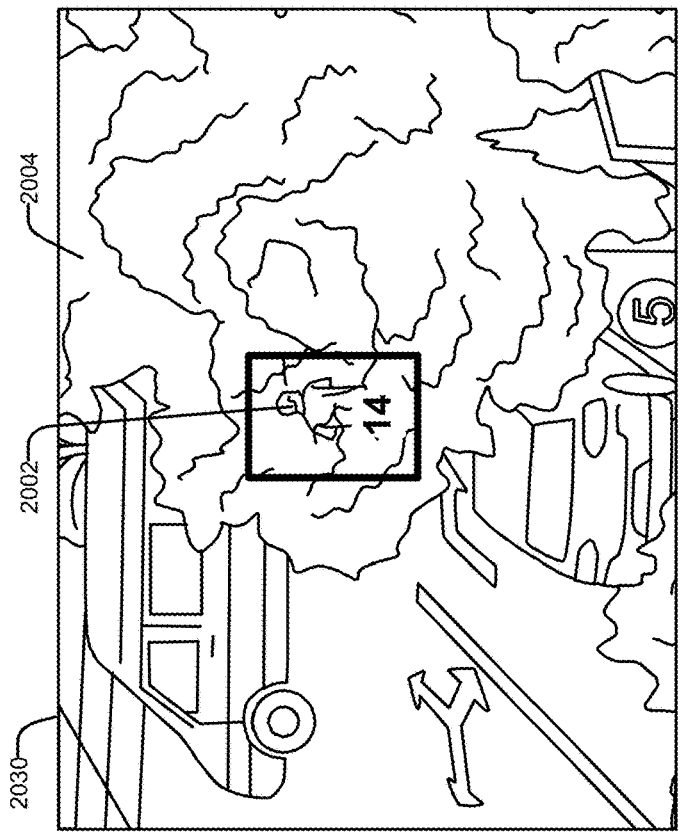
FIG. 20C and FIG. 20D illustrate examples where the person remains obscured.
Figure 20C:
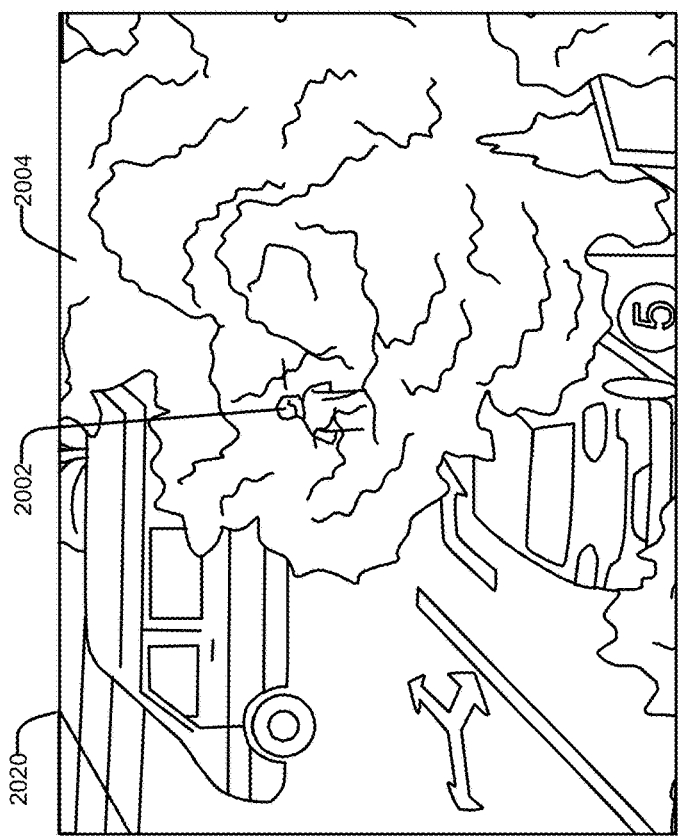

FIG. 20C and FIG. 20D illustrate examples where the person 2002 remains obscured, but the system outputs different results. In the video frame 2020 of FIG. 20C, the person 2002 may still be obscured by the tree 2004, but the motion of the leaves of the tree may have been captured by the object tracking system as a moving object. Because of, for example, the proximity of the moving leaves to the last known location of the person, the object tracking system may associate the tracker for the person with the moving leaves, and assign the tracker the recover status The person re-identification engine, however, upon examining the recover status and the blob, can determined that the moving leaves do not match the appearance of the person 2002. In this example, the recover tracker may be discarded.

In the example of FIG. 20D, person re-identification has not been applied. In the video frame 2030 of FIG. 20D, the recover tracker has not been discarded, and has been assigned the label "14." The person, however, may have left the scene or gone in a difference direction. The labeling of the bounding box may thus be giving a misleading result.

Figure 21B:
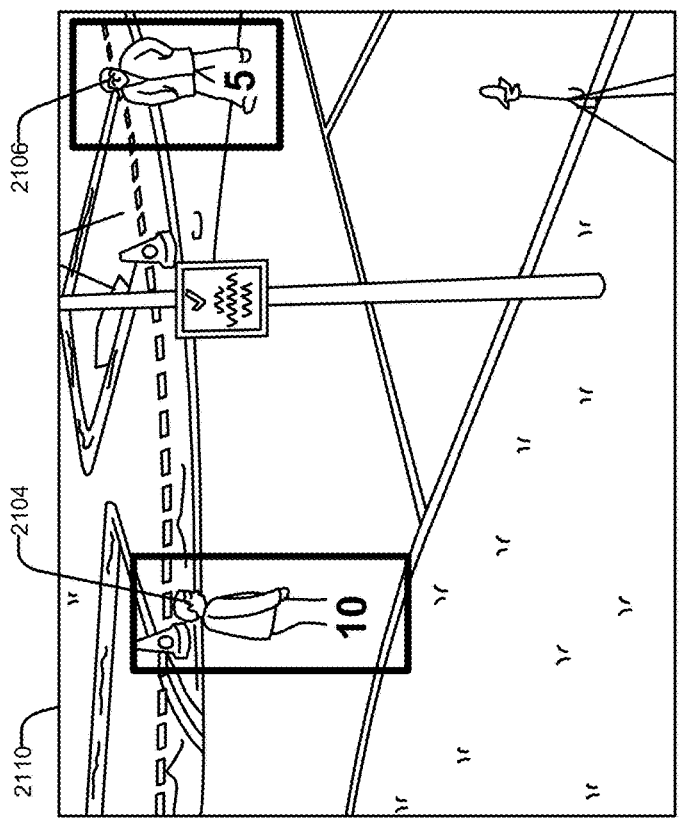
FIG. 21A and FIG. 21B illustrate an example where several people are wearing similar clothing.
Figure 21A:
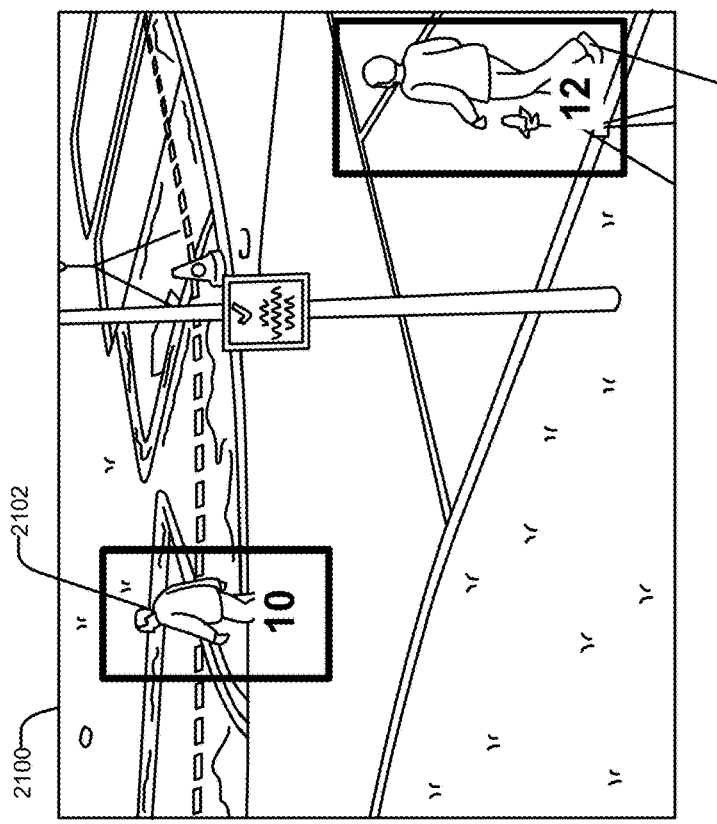

FIG. 21A and FIG. 21B illustrate an example where several people 2102, 2104, 2106 in a scene are wearing similar clothing. Person re-identification systems that rely largely on the appearance of people to identify them can erroneously label the people 2102, 2104, 2016 in this example. In the video frame 2100 of FIG. 21A, a first person 2102 has been assigned a label "10" and a second person has been assigned a label "12." Both people 2102, 2104 are wearing black jackets and jeans. Between the video frame 2100 of FIG. 21A and the video frame 2110 of FIG. 21B, the first person 2102 has left the scene, and the second person 2104 has moved into the position previously occupied by the first person 2102. Additionally, a third person 2106 has entered the scene, who is also wearing a black jacket.

In this video frame 2110, using only the location of the people 2102, 2104 can result in the second person being assigned the label "10" instead of the label "12." Applying person re-identification that uses only the appearance of the people may not improve the resulting labels, because the people are so similar in appearance. Person re-identification that incorporates the status of trackers, on the other hand, may improve the results. For example, the tracker that was originally associated with label "10" may become a lost tracker, which the tracker associated with the label "12" may remain a normal tracker between the first video frame 2100 and the second video frame 2110. In this example, the person re-identification system may correctly associate the normal tracker with the person's current location in the scene.

The person re-identification techniques discussed above can greatly improve person re-identification over using only image recognition methods. In some cases, however, person re-identification can be further improved. For example, a recover tracker may fail to be matched to a person model when only a part of the person is visible. The part of the person may be enough to associate the person with an existing object tracker, but may not be enough to associate the person with an existing person model. As another example, sometimes the blob for person can become split until multiple blobs from one frame to the next, due, for example, the person moving behind an object or the person wearing clothing that blends with the background, or for some other reason. In this example, it may be that not all the split trackers for the split blobs are tested, and the person may not be successfully re-identified. As another example, simple threshold schemes for determining whether a person model should be tested can result in incorrect matches between the person model and an object tracker. In this example, more sophisticated threshold parameters can provide improved results.

Figure 22:
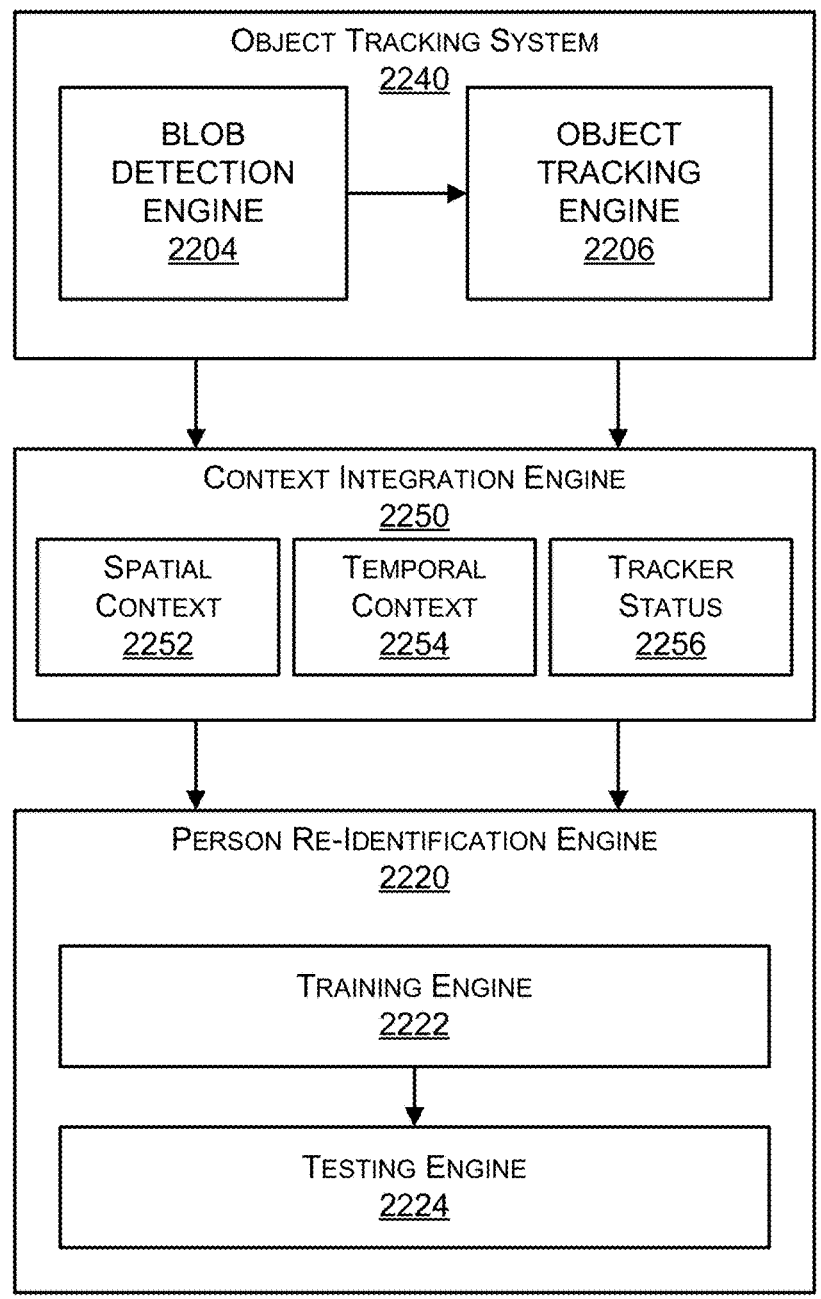
FIG. 22 illustrates an example of context data that can be provided by an object tracking system.

In various implementations, person re-identification when recover trackers and split trackers are involved can be improved by using context data that can be obtained from an object tracking system. FIG. 22 illustrates an example of context data 2250 that can be provided by an object tracking system 2240. The context data 2250 can be provided to a person re-identification engine 2220, where the context data 2250 can be used to improve person re-identification for certain situations.

As discussed above, the object tracking system 2240 can include a blob detection engine 2204 and an object tracking engine 2206. In various implementations, the blob detection engine 2204 can identify blobs in input video frames, and the object tracking engine 2206 can track objects associated with the identified blobs. The objects can be people, vehicles, animals and/or any object that may be in the scene.

In various implementations, the person re-identification engine 2220 can include a training engine 2222 and a testing engine 2224. The training engine 2222 and testing engine 2224 can be used to generate new person models, update existing person models, and to test an object tracker against a person model to determine whether the blob associated with the object tracker corresponds to the person represented by the person model. In various implementations, the person re-identification engine 2020 can be configured to re-identify other moving objects, such as vehicles, animals, and other objects moving in the scene. In some implementations, the person re-identification engine 2020 can be configured to re-identify only one type of object, or to re-identify several types of objects at the same time.

In various implementations, the context data can include a spatial context 2252, a temporal context 2254, and/or a tracker status 2256. Spatial context 2252 can include information such as the size of a bounding box associated with an object tracker, the location of the bounding box, and/or a geometric relationship between the bounding box and older bounding boxes that were previously stored in the object tracker. In various implementations, the spatial context can be used to adjust the testing engine 2224 for certain types of trackers.

The temporal context 2254 can include prior results from the testing engine 2224 for a given object tracker. That is, the temporal context 2254 can record whether an object tracker was matched to a person model in previous video frames, and/or which person model the object tracker was matched to, if any. In various implementations, the temporal context 2254 can be used to determine whether an object tracker should continue to be used for re-identification testing even when the object tracker was not matched to a person model for the current input video frame.

The tracker status 2256 can include a type of the tracker, including whether the tracker is a new tracker, a split tracker, a recover tracker, a merge tracker, or some other kind of tracker. In various implementations, the tracker status 2256 can be used customize the testing engine 2224 for different types of trackers. Alternatively or additionally, in some implementations, the tracker status 2256 can be used to apply threshold parameters for different types of trackers.

Figure 23:
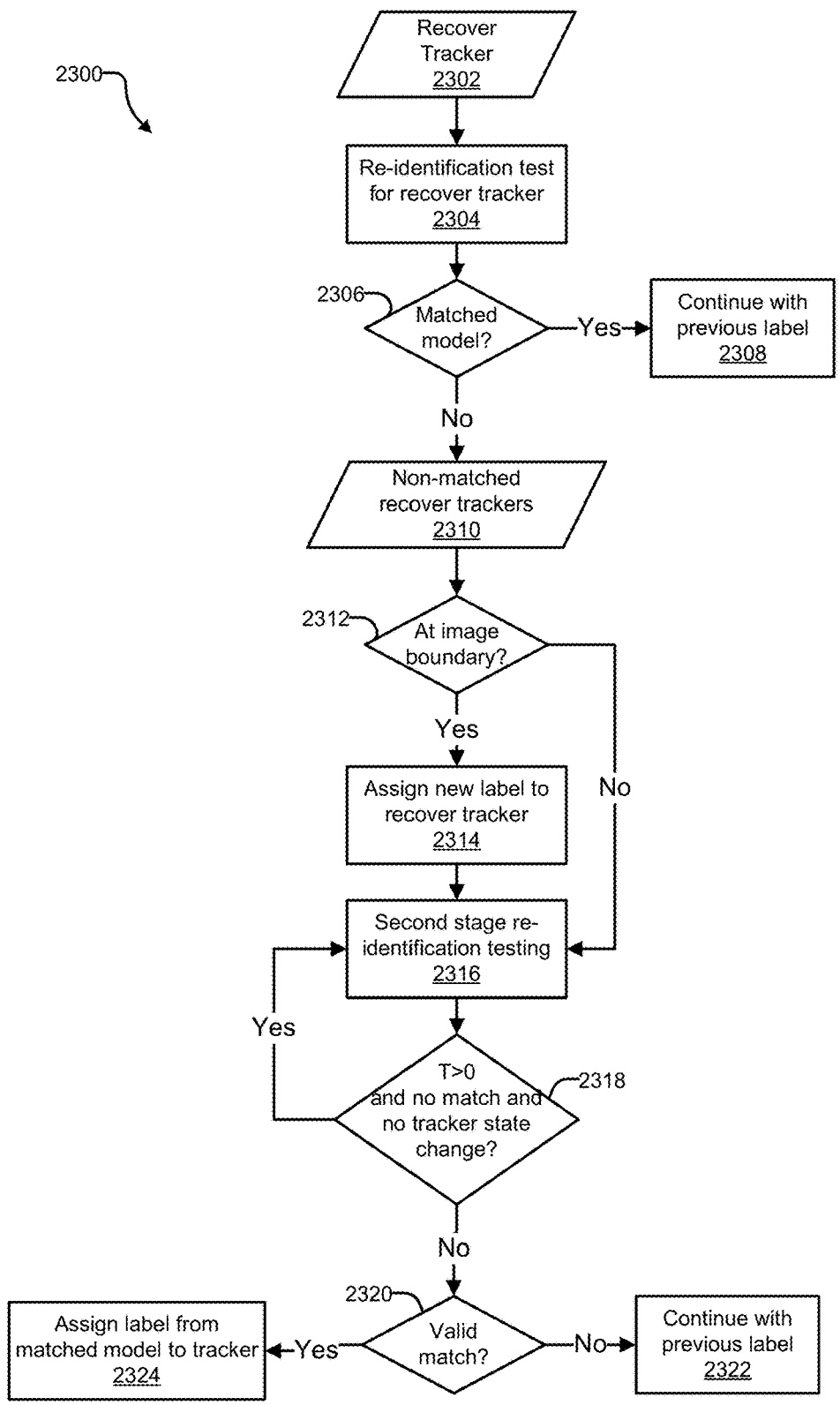
FIG. 23 illustrates an example of a process for testing a recover tracker.

Context data can be used to improve person re-identification results when the person re-identification engine is provided with a recover tracker. FIG. 23 illustrates an example of a process 2300 for testing a recover tracker 2302. The process 2300 can be implemented by the testing engine of a person re-identification engine. At step 2304, the recover tracker 2302 can undergo re-identification testing, as discussed above. The testing engine may search for a person model that corresponds to the recover tracker 2302, or more particularly to a blob associated with the recover tracker 2302. Step 2304 can occur for the input frame in which the recover tracker 2302 first transitions to the recover state.

At step 2306, when the recover tracker 2302 was found to match a person model, the testing is considered successful, and the process 2300 can proceed to step 2308. At step 2308, the recover tracker 2302 may continue to be tracked with the previous label of the recover tracker 2302, or with the label from the person model that matched the recover tracker 2302.

Returning to step 2306, when no person model was found that matched the recover tracker 2302, the recover tracker 2302 can be added to a list of unmatched recover trackers 2310. In contrast to the processes discussed above, the recover tracker 2302 is not discarded in this example because it is assumed that the recover tracker 2302 is not necessarily a mis-identified recover tracker. Instead, it can be assumed that the recover tracker 2302 does not yet have sufficient information to be associated with a person model.

In some implementations, the process 2300 can, at step 2312, test whether the recover tracker 2302 is at an image boundary (e.g., at the far left, far right, top, or bottom of the video frame). When the recover tracker 2302 is at an image boundary, the person re-identification engine can, at step 2314, assign a new label to the recover tracker 2302. The new label can distinguish the recover tracker 2302 from the object with which the recover tracker 2302 was previously associated, to avoid confusion. Additionally, the new label can temporarily indicate that the recover tracker 2302 is in the process of being re-identified. The process 2300 can then proceed to step 2316. Returning to step 2312, when the recover tracker 2302 is not at an image boundary, the process 2300 can also proceed to step 2316.

At step 2316, the unmatched recover trackers 2310 can undergo second stage re-identification testing. In second stage re-identification testing, the list of unmatched recover trackers 2310 can be re-tested for subsequent input video frames. For example, for the next 10, 30, or 60 frames, or for some other number of frames, an updated version of the recover tracker 2302 may be tested again, where the recover tracker 2302 has been updated with data from each new video frame. The assumption is that, if the recover tracker 2302 is a correctly identified recover tracker, more of the person associated with the recover tracker will become visible as time passes. In some implementations, only every $T_c$ frames are tested, to reduce the computational load. $T_c$ can be, for example, every other frame, every fifth frame, every tenth frame, or some other interval.

At step 2318, the process 2300 can test whether, for the current input fame, the interval T has expired, and no matching person model has been found, and the tracker has not transitioned to another state, such as new merge, or split. When no matching person model has been found and the interval T has not yet expired, the recover tracker 2302 can be tested again in a subsequent input video frame, and the process returns to step 2316. Alternatively or additionally, testing of the recover tracker 2302 can continue so long as the recover tracker has not transitioned to another state.

When the conditions in step 2318 are no longer true, the process 2300 can proceed to step 2320. At step 2320, the process 2300 can verify whether a matching person model has been found for the recover tracker 2302. When a matching person model has been found, then at step 2324, the label from the matching person model can be assigned to the recover tracker 2302. When no matching person model was found, then at step 2322, the recover tracker's label is left as before. At step 2322, it can be assumed that the recover tracker 2302 is a valid recover tracker, but that the blob associated with the recover tracker is either not a blob that represents a person and/or is an object for which no person model has been generated.

In some implementations, when the recover tracker 2302 is re-tested for subsequent input video frames, instead of comparing the recover tracker 2302 against a limited set of person models (e.g., a person model that has a same label as the recover tracker 2302), the recover tracker 2302 can instead be tested against other person models. For example, the recover tracker 2302 can be tested against other person models that were not matched to object trackers for a given video frame, and/or that were recently determined to be in close proximity to the recover tracker 2302. Allowing the recover tracker 2302 to be tested against other person models can increase the likelihood that a matching person model can be found.

In some implementations, for each input frame where the recover tracker 2302 is re-tested, the recover tracker 2302 may still be output by the object tracking system. The recover tracker 2302 may be output even though the recover tracker 2302 may fail to match a person model in re-testing, and even though the label for the recover tracker 2302 may at some point be changed.

In some implementations, for the input video frame where the recover tracker 2302 is first identified and fails to match a person model, and for the input video frames in which the recover tracker 2302 is re-tested, blobs associated with the recover tracker 2302 might not be used for training. The blobs may represent only a part of a person, and thus may not be good training samples. Thus the training engine may avoid updating any person models with the data from the blobs until the recover tracker 2302 has successfully matched a person model.

In some implementations, in certain situations a recover tracker may be treated as a split tracker when the recover tracker spatially intersects with other trackers. FIG. 24A illustrates an example where a recover tracker 2402 overlaps with a first normal tracker 2402 and a second normal tracker 2406. In this example, the intersection of the recover tracker 2402 and the two normal trackers 2404, 2406 is not enough for the object tracking system to have merged the bounding boxes for the trackers into a single bounding box.

In the example of FIG. 24A, the recover tracker 2402 may represent a person that was lost to the tracking system and has now been found, but it may be that the object tracking system incorrectly associated the person with the recover state. For example, the person may in fact be at the location of the first normal tracker 2404, or the person may be a new person in the scene.

Figure 24B:
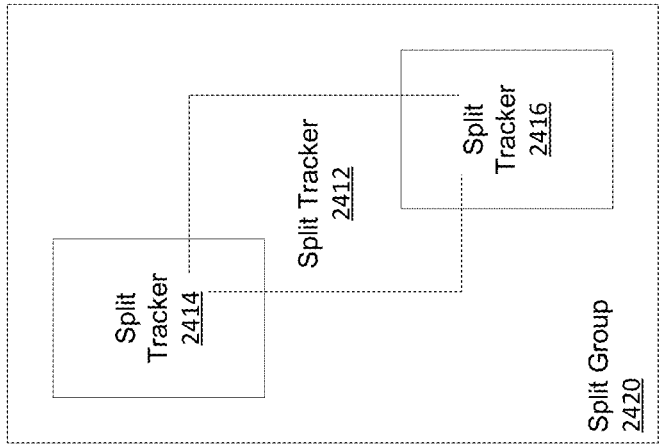
FIG. 24A and FIG. 24B illustrate an example where a recover tracker overlaps with a first normal tracker and a second normal tracker.
Figure 24A:
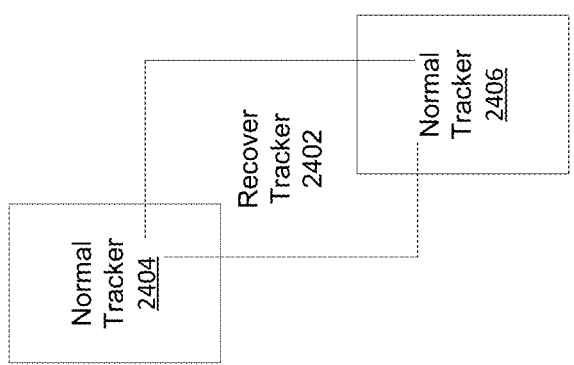

As illustrated in FIG. 24B, to handle these and other possibilities, the person re-identification engine can treat the recover tracker 2402 as a split tracker 2412 of a split group 2420. The split group 2420 can also include the first normal tracker 2404, which can also be treated as a split tracker 2414, and the second normal tracker 2406, which can also be treated as a split tracker 2416. Person re-identification can then be applied to the split group as discussed above, and/or as discussed further below.

Context data can also be used to improve person re-identification for split trackers. In various implementations, split trackers can be assigned a split-specific status, where the split status can be used to modify re-identification of the split trackers.

A first split status, referred to herein as "TCO_SPLIT," can be assigned to a split tracker in the input video frame where the split event occurred. That is, in the video frame where the split event is first detected, the split trackers that result from the split event can each be assigned the TCO_SPLIT status.

A second split status, referred to herein as "TCO_SPLIT_NEWN," can be assigned to a split tracker when the split tracker results from a split new event. A split new event occurs when an object splits into multiple objects in a current input video frame, and for at least one of the multiple objects a new tracker is generated. For example, a person can enter the scene carrying a ball and may then throw the ball. In this example, once the ball leaves the person's hands, the object tracking system may determine that a split event has occurred, and that a new object tracker should be generated for the ball or the person. The newly generated split tracker may also be referred to as a split new tracker. The TCO_SPLIT_NEW status can be assigned in the input video frame where the split new event occurred.

A third split status, referred to herein as "TCO_SPLIT_NEWP" can be assigned to a split new tracker when the split tracker transitions from split to normal. TCO_SPLIT_NEWP can also be assigned to a tracker that had transitioned from hidden to normal in a current input video frame.

In various implementations, different re-identification testing can be applied for each split status. For example, when an object tracker has the TCO_SPLIT status, the object tracker can be tested within a split group, as discussed above. As another example, when an object tracker has the TCO_SPLIT_NEWP status, the object tracker can be tested as a spit tracker even though the tracker may not be part of a split group. In this example, the object tracker may be tested in the same fashion as a new tracker.

Figure 25B:
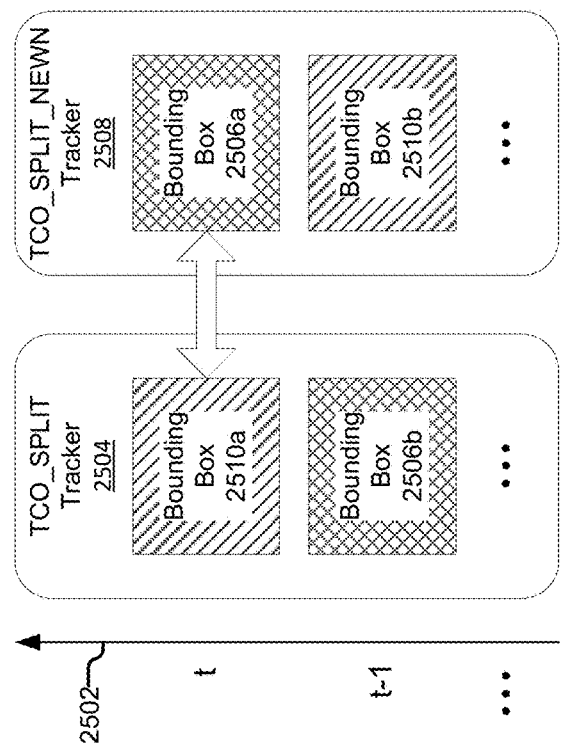
FIG. 25A and FIG. 25B illustrate an example of additional handling for certain types of split trackers.
Figure 25A:
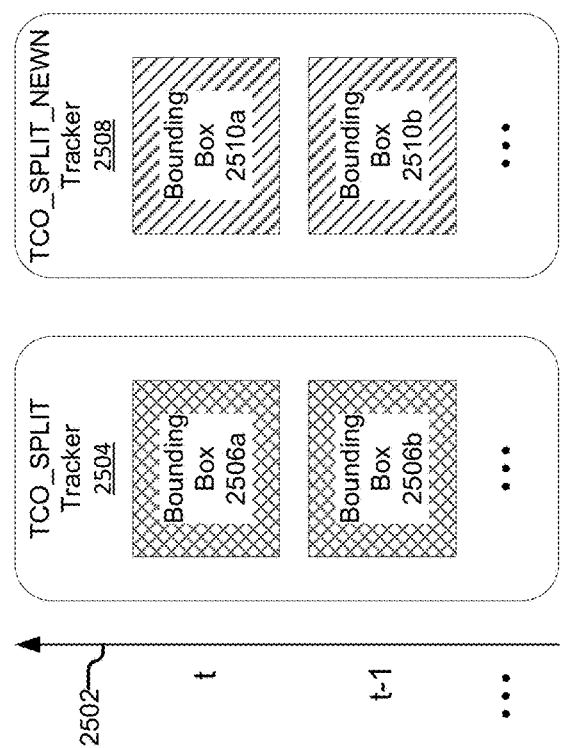

For object trackers having the TCO_SPLIT_NEWN status the object trackers can also be tested as part of a split group. When a matching person model is found, and the split group has only two split trackers, in some implementations, additional processing may occur. FIG. 25A and FIG. 25B illustrate an example of additional handling for TCO_SPLIT_NEWN trackers. In FIG. 25A illustrates two trackers 2504, 2508 that are part of a split group. The first tracker 2504 has been assigned the TCO_SPLIT status, while the second tracker 2508 has been assigned the TCO_SPLIT_NEWN status. Illustrated within each tracker 2504, 2508 are bounding boxes that have been added over time to each tracker 2504, 2508, where the newest bounding box is illustrated at the top. For example, at a time 2502 t-1, a bounding box 2506b was added to the first tracker 2504, and a bounding box 2510b was added to the second tracker 2506. As a further example, at a time 2502 t, a current bounding box 2506a was added to the first tracker 2504 and a current bounding box 2510a was added to the second tracker 2508.

In the example of FIG. 25A, a matching person model has been found for the second tracker 2508. As a result, the most recent bounding box 2510a of the second tracker 2508 is swapped with the most recent bounding box 2506a of the first tracker 2504. The result is illustrated in FIG. 25B. The tracking history of each tracker 2504, 2508 is otherwise not changed. Additionally, the output status of the second tracker 2508 is not changed.

As discussed above, during a testing stage, a person re-identification engine can test whether a blob associated with an object tracker corresponds to a person model. In various implementations, the comparison can be based on a rejection threshold, where, when the features extracted from the blob differ from the features of the person model by more than the rejection threshold value, the blob and the person model are considered not matching. In some implementations, the threshold can be based on a distance between the features of the blob and the features of the person model, where the distance is determine using, for example, a nearest neighbor search technique.

In various implementations, the person re-identification engine can also include an acceptance threshold, $d_n$. Adding an acceptance threshold can reduce the number of person models that are erroneously rejected as not matching In these implementations, the person re-identification engine can determine a distance $d_c$ between a person sample (e.g., a blob), and a person model. When the distance $d_c$ is less than $d_n$, the blob and the person are considered to be a match.

In various implementations, different threshold strategies can be applied for different tracker statuses. For example, threshold strategies can include a very strict threshold, $d_c$(very strict), a strict threshold, $d_c$(strict), and a normal threshold, $d_c$(normal). In this example, each threshold determines a threshold parameter, where the parameter for the very strict threshold is less that the parameters for the strict threshold, which are less than the parameters for the normal threshold (e.g., $d_c$(very strict)<$d_c$(strict)<$d_c$(normal)).

Figure 26:
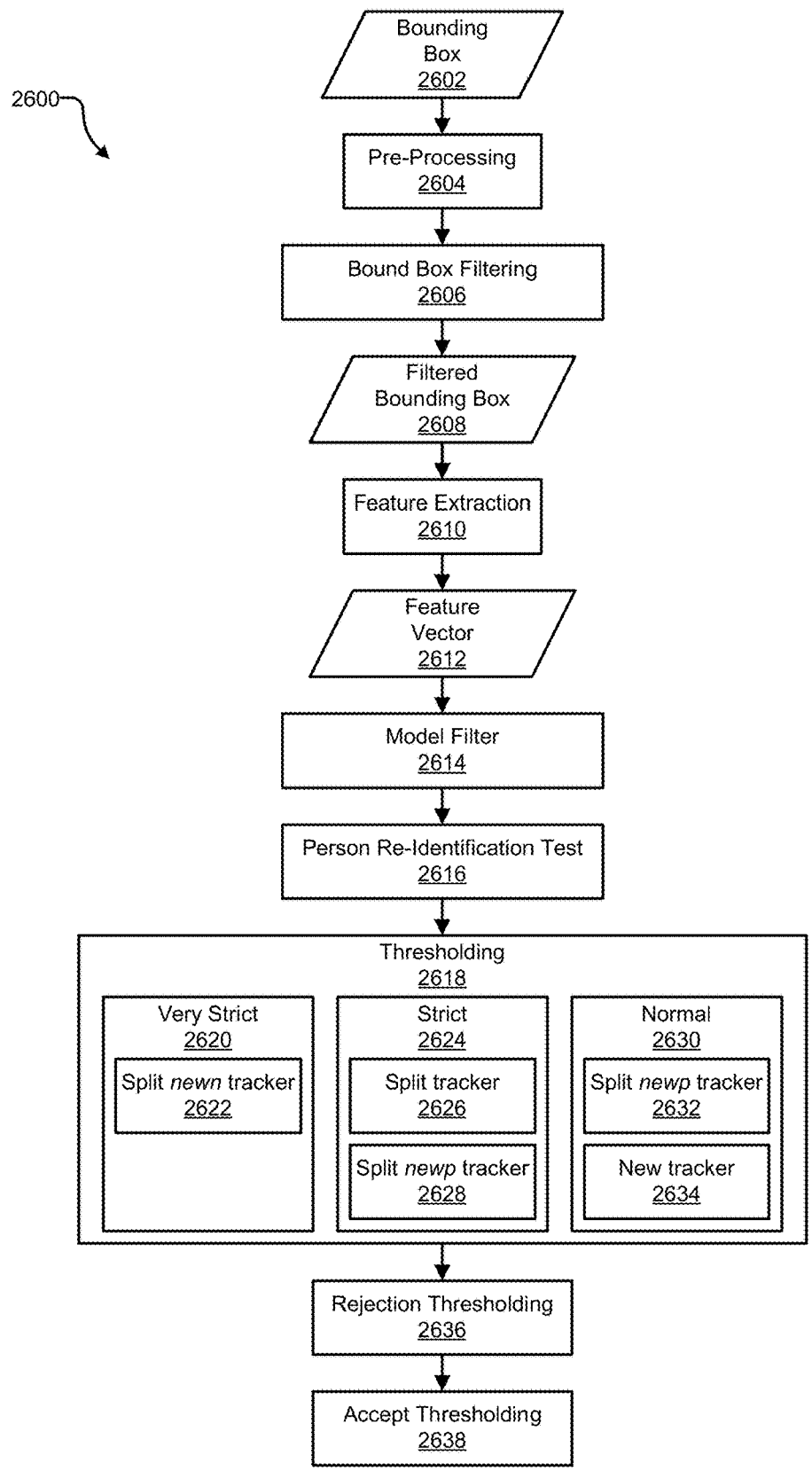
FIG. 26 illustrates application of different threshold strategies.

Application of the thresholds is illustrated in FIG. 26, which illustrates an example of a process 2600 for processing a bounding box 2602 that is input to a person re-identification test 2616. At step 2604, the bounding box 2602 may undergo pre-processing operations. Pre-processing operations can include, for example, normalizing the image data in the bounding box 2602.

At step 2606, the bounding box 2602 may undergo bounding box filtering. In this step, the tracker associated with the bounding box 2602 may be selectively filtered to determine whether the tracker and bounding box 2602 should be considered by the person re-identification test 2616. Some bounding boxes may qualify for testing, and are output at step 2606 as a filtered bounding box 2608. Bounding boxes that do not qualify for testing are output as a skipped bounding box 2610, which does not continue through the remainder of the process 2600.

At step 2612, the filtered bounding box 2608 can undergo feature extraction. During feature extraction, filtered bounding box 2608 (or, more specifically, a blob associated with the bounding box) can be treated as a picture patch or image patch for feature extraction. Step 2612 can also include dimensionality reduction, in which the complexity of the extracted features can be reduced.

The output of step 2612 is a feature vector 2614. The feature vector 2614, along with the filtered bounding box 2608 and a tracker associated with the filtered bounding box 2608, can be provided to the person re-identification test 2616.

In the re-identification testing, threshold application 2618 can occur. A threshold can be applied to determine whether a person model is similar to a bounding box (or, more specifically, a blob associated with the bounding box), and when there is sufficient similarity the bounding box and person model are considered matching. Different threshold can be applied based on the type of an object tracker associated with a bounding box. For example, in various implementations, when an object tracker for a bounding box is a split newn tracker 2622 (e.g., the tracker has been assigned the TCO_SPLIT_NEWN split status), a very strict 2620 threshold can be applied. In these implementations, the bounding box and the person model must be very similar to be considered matching (e.g., the rejection and/or acceptance thresholds are set to a very low value). As another example, in various implementations, when the object tracker is a split tracker 2626 or a recover tracker 2628, a strict threshold 2624 can be applied (e.g., the threshold(s) are set to a higher value than for very strict testing). As another example, when the object tracker is a split newp tracker 2632 (e.g., the tracker has been assigned the TCO_S-PLIT_NEWP status) or a new tracker 2634, a normal threshold 2630 can be applied (e.g., the threshold(s) are set to a higher value than for strict testing).

Once threshold parameters are selected, the process 2600 can proceed to step 2636. At step 2636, a rejection threshold can be applied. That is, the features from a the filtered bounding box 2608 can be tested against the features from one or more person models, where person models will be rejected as not matching if the distance between the features is greater than the rejection threshold.

In various implementations, person models that are rejected at step 2636 may be reconsidered at step 2638. At step 2638, person models found to not match at step 2636 may be re-tested, and if the distance between the features from the filtered bounding box 2608 and the features from a person model are within an acceptance threshold, the person model will be determined to be matching. Using an acceptance threshold can reduce the number of occurrences of an object tracker not being matched to a person model. Additionally, using different thresholds for different types of object trackers can improve the likelihood that the match is correct.

FIG. 27A and FIG. 27B illustrate an example where specific testing for recover trackers can improve person re-identification results. In the video frame 2700 of FIG. 27A, a person 2702 has been assigned label "1." Between the video frame 2700 and the video frame 2710 of FIG. 27B, the person 2702 has walked behind a pillar 2704. The object tracker system may be able to recover the person 2702 in the video frame 2710 of FIG. 27B, but the object tracking system may erroneously assign new label, "12," to the person 2702.

Figure 27D:
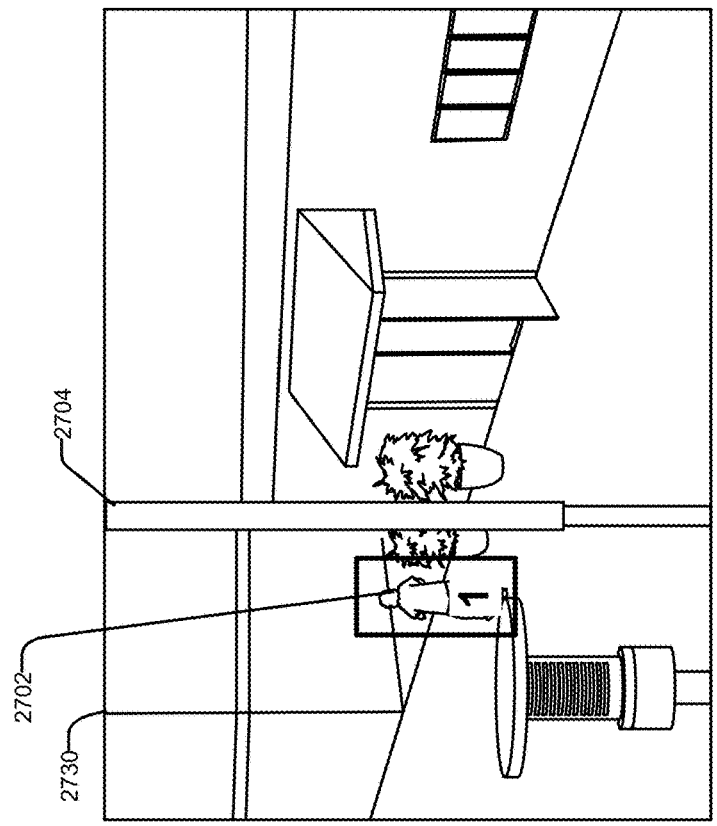
FIG. 27C and FIG. 27D illustrate an example of the object tracking results when person re-identification is applied to the object tracking illustrated in FIG. 27A and FIG. 27B.
Figure 27C:
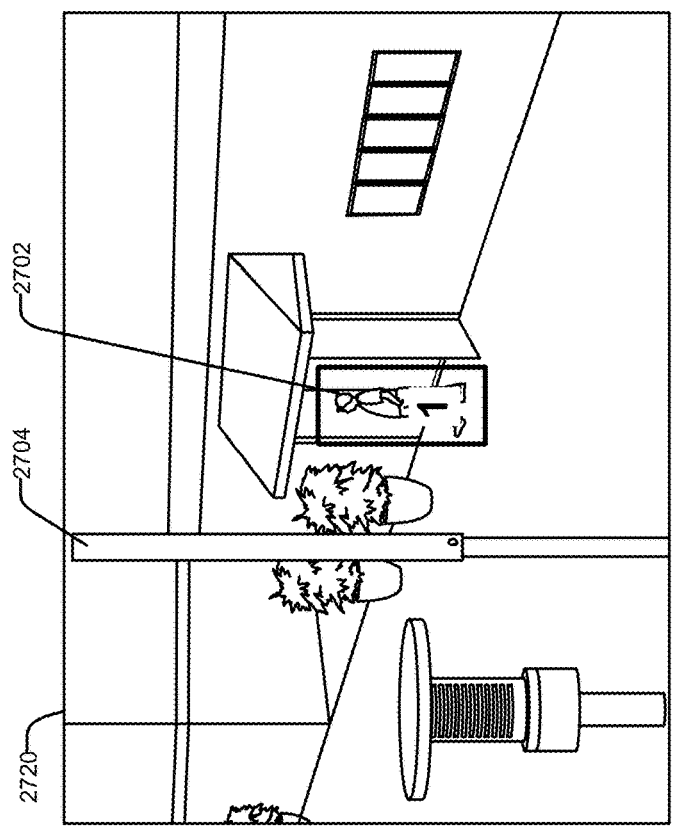

FIG. 27C and FIG. 27D illustrate an example of the object tracking results when person re-identification is applied to the object tracking illustrated in FIG. 27A and FIG. 27B. In the video frame 2720 of FIG. 27C, the person 2702 has been assigned the label "1. " Between the video frame 2720 and the video frame 2730 of FIG. 27D, the person 2702 passed behind a pillar 2704. Object tracking, alone, may mis-label the person 2702 once the person 2702 appears on the other side of the pillar 2704, person re-identification can correctly associate the person 2702 with the "1."

FIG. 28A and FIG. 28B illustrate an example of a merge scenario. In the video frame 2800 of FIG. 28A, a first person 2802 has been assigned a label "18" and a second person 2804 has been assigned a label "21." In the video frame 2810 of FIG. 28B, the two people 2802, 2804 have moved towards each other, such that the second person 2804 is behind the first person 2802. In this video frame 2810, the object tracking system may determine that the blobs for the two people 2802, 2804 should be treated as one blob. The object tracking system has also decided to assign the merged bounding box the label "18" from the first person 2802. Application of the label "18" may be arbitrary or may be based on a quality or age of the object tracker for the first person 2802. Additionally, application of the label "18" may indicate that the object tracker for the first person 2802 is being used to as the parent tracker for the merged trackers.

Figure 28C:
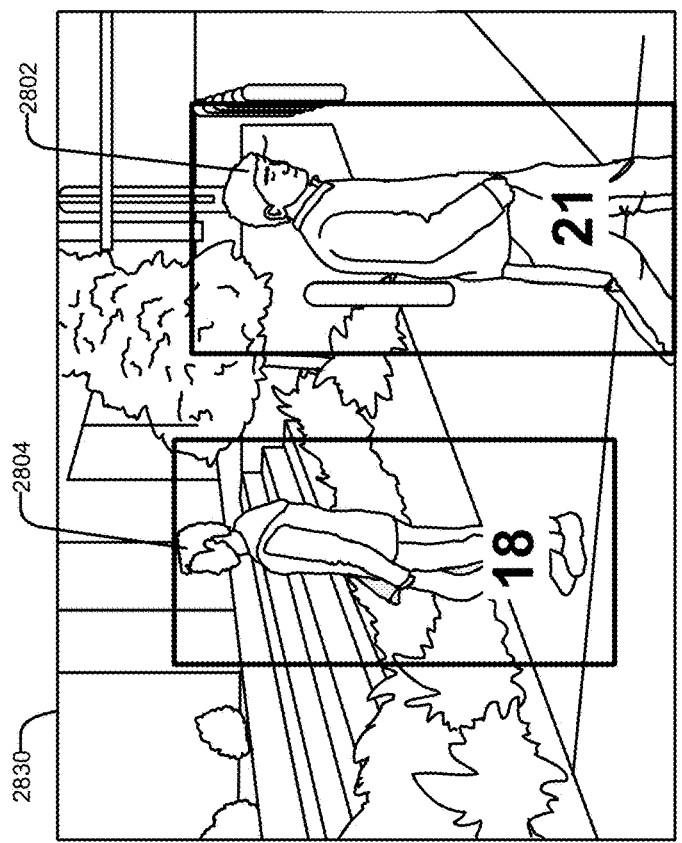
FIG. 28C and FIG. 28D illustrate examples of the object tracking results that can result when person re-identification is applied to a split event.

FIG. 28C illustrates an example of the object tracking results that can result when person re-identification is applied to a split event. In the video frame 2820 of FIG. 28C, the first person 2802 has continued moving to the right and the second person 2804 has continued moving to the left, such that each person can once again be separately identified. Person re-identification for split trackers has also been applied. For example the tracker labels may have been swapped prior to testing of the bounding boxes. As another example, the bounding boxes may have been swapped between the trackers that were associated with each person. As a result of these and other examples, the first person 2802 is correctly identified by the label "18" and the second person 2804 is correctly identified by the label "21."

Figure 28D:
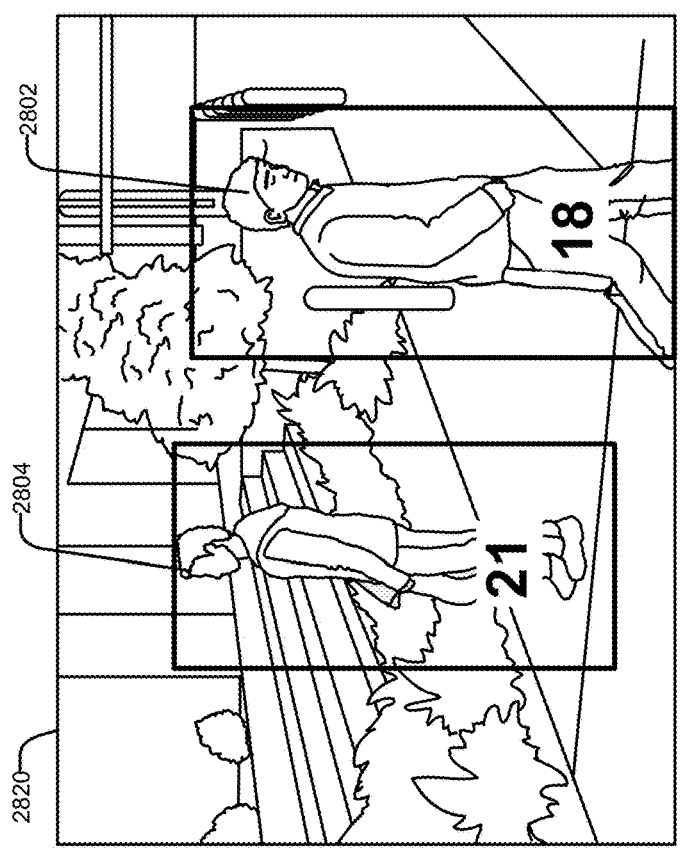

FIG. 28D illustrates an example where person re-identification has not been applied after a split event. In the video frame 2830, incorrect labels have been assigned to each person 2802, 2804. The object tracking system may have assigned the labels based on the position of the people 2802, 2804, without considering the appearance of the people or the context of the object trackers associated with the people. In some cases, the object tracking system may correctly apply the labels, but in this example, the object tracking system, lacking the assistance of the person re-identification system, has not done so.

Figure 29A:
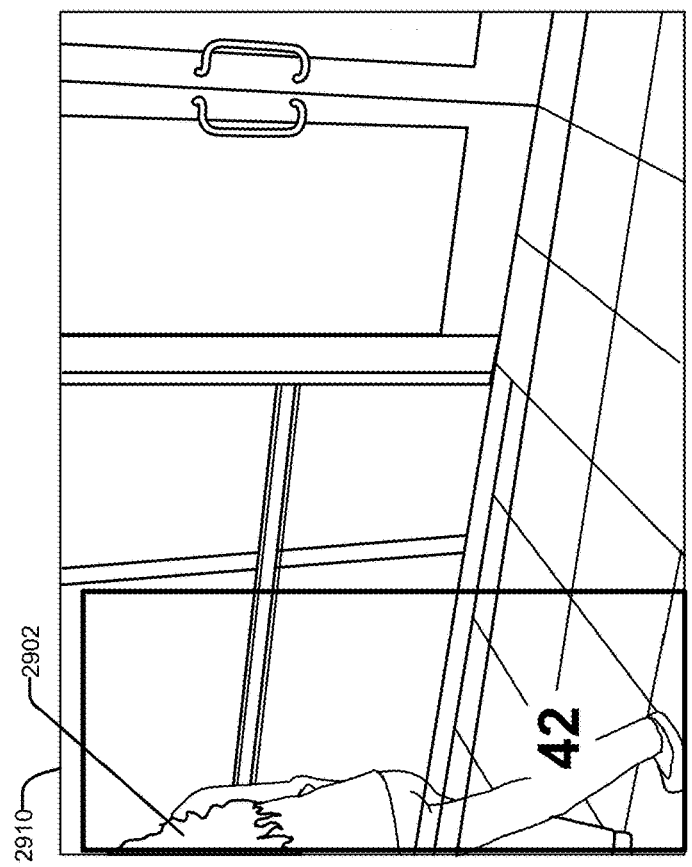
FIG. 29A and FIG. 29B illustrate an example of a scenario that can result in an object tracker being assigned a recover state.
Figure 29B:
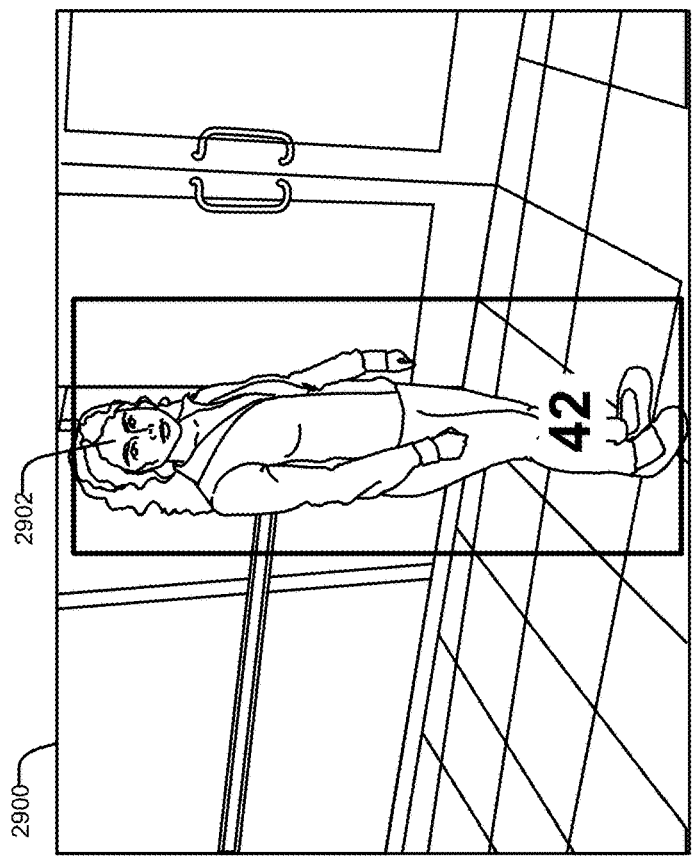

FIG. 29A and FIG. 29B illustrate an example of a scenario that can result an object tracker being assigned a recover state. In a video frame 2900 of FIG. 29A, a person 2902 has been assigned a label "42." Between the video frame 2900 and the video frame 2910 of FIG. 29B, the person 2902 has moved to the left edge of the scene. In subsequent frames, the person 2902 may entirely exit the scene. An object tracker for the person may, at that point, be assigned the lost status.

Figure 29D:
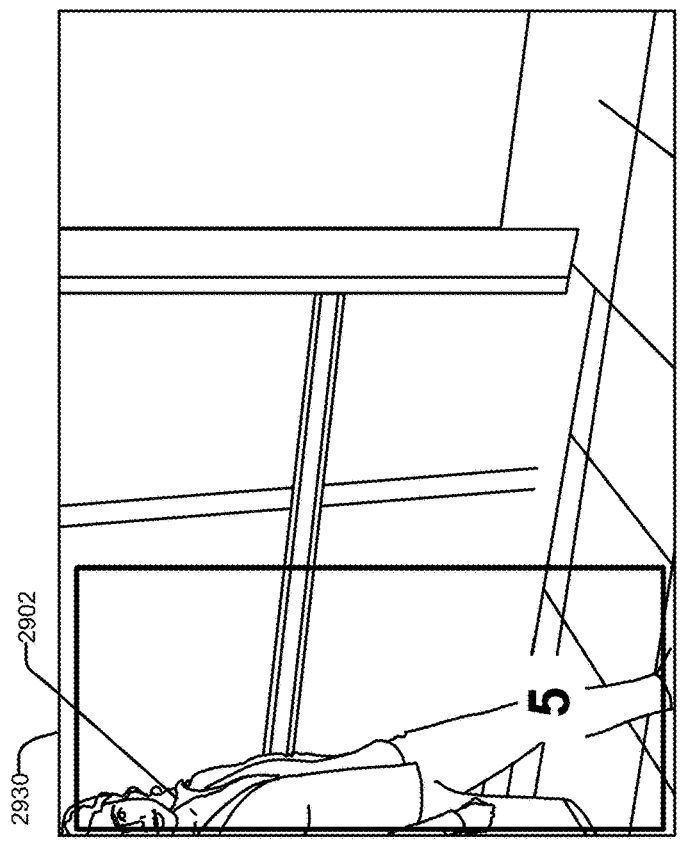
FIG. 29C and FIG. 29D illustrate an example where the person has re-entered the scene.
Figure 29C:
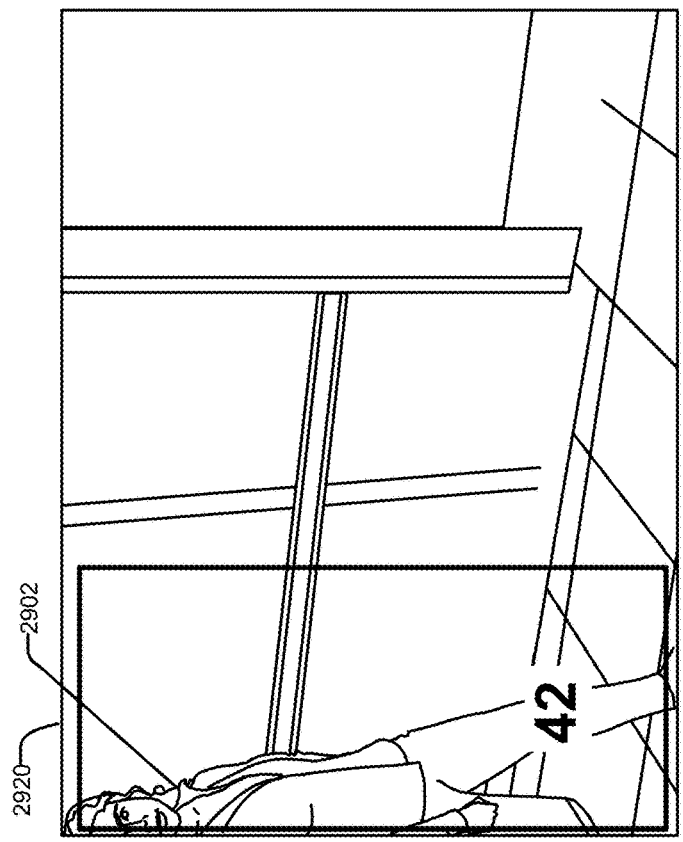

FIG. 29C illustrates an example where the person 2902 has re-entered the scene. For the video frame 2920 of FIG. 29C, the object tracking system may have associated the person 2902 with a recover tracker. Additionally, person re-identification can have processed the recover tracker to determine that the correct label for the recover tracker is the label "42." This determination may have occurred several frames after the person 2902 has entered the scene, after enough of the person is visible to associate the person 2902 with the previously generated person model for the person 2902.

FIG. 29D illustrates an example where person re-identification has not been applied. For the video frame 2930 of FIG. 29D, the object tracking system may not have associated the person 2902 with a recover tracker, or the recover tracker may have been rejected and the person 2902 may have been associated with a new object tracker. In any case, the person 2902 has been incorrectly assigned the label "5."

Figures 30A, 30B:
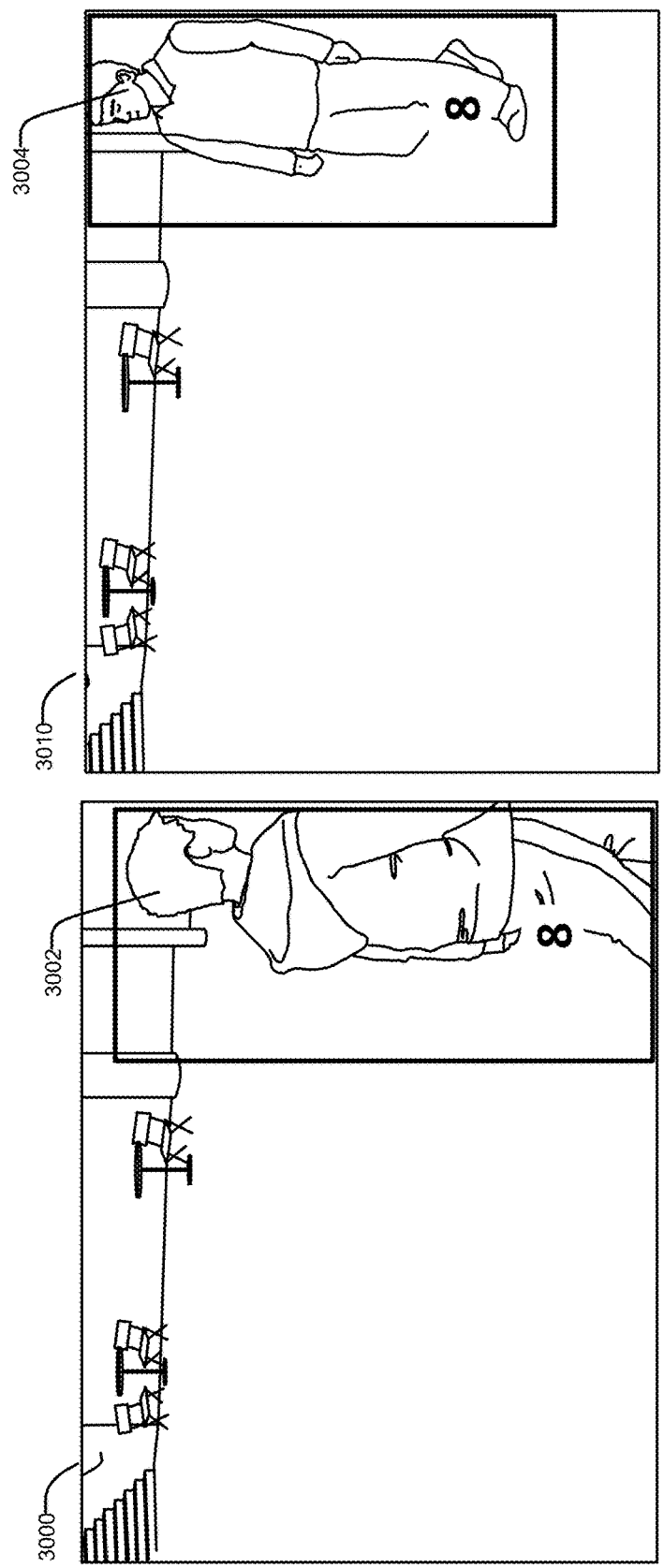
FIG. 30A and FIG. 30B illustrate an example where object tracking can result in a person being assigned an incorrect label.

FIG. 30A and FIG. 30B illustrate an example where object tracking can result in a person 3004 being assigned an incorrect label. In the video frame 3000 of FIG. 30A, a person 3002, who has been assigned the label "8" is in view and appears to be leaving the scene. In the video frame 3010 of FIG. 30B, a different person 3004 enters the scene at about the same time, and at about the same location where the first person 3002 leaves the scene. In this example, the second person 3004 may be associated with the object tracker for the first person 3002, based on the second person 3004 being present in the last know location for the first person 3002. Alternatively, the first person 3002 may be considered lost until the second person 3004 appears, in which case the object tracker for the first person 3002 may be associated with the second person 3004 and be assigned the recover status.

FIG. 30C and FIG. 30D illustrate an example where person re-identification has been applied to correctly identify the second person 3004 as a different person. In the video frame 3020 of FIG. 30C, the first person 3002 has been assigned the label "8." Between the video frame 3020 and the video frame 3030 of FIG. 30D, the first person 3002 has left the scene and a second person 3004 has entered. Though in other situations the second person 3004 and the first person 3002 can be the same person, in this example the first person 3002 is wearing a grey sweatshirt while the second person 3004 is wearing a black sweater. Because the person re-identification system considers the appearance of the people 3002, 3004, the person re-identification system is able to correctly determine that the second person 3004 is not the same person as the first person 3002.

Figure 31A:
FIG. 31A, FIG. 31B, and FIG. 31C illustrate an example where a person 3102 is momentarily tracked as two objects.
Figure 31B:
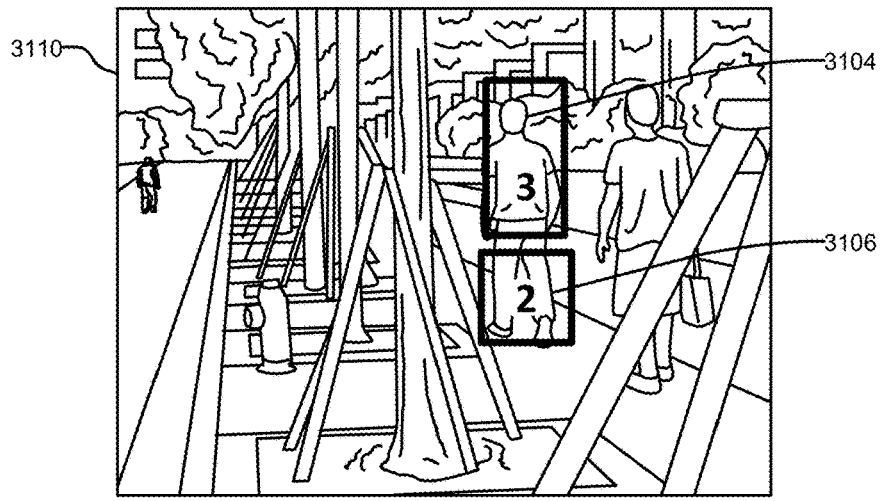

FIG. 31A and FIG. 31B illustrate an example where a person 3102 is momentarily tracked as two objects. In the video frame 3100 of FIG. 31A, the person 3102 has been identified as one blob and has one corresponding bounding box. The bounding box has further been assigned the label "2." In the video frame 3110 of FIG. 31B, the blob for the person 3102 has been identified as two different blobs 3104, 3106. This may have occurred, for example, because of noise in the scene or because background subtraction has assigned some pixels from the person as background pixels. In any case, the video frame 3110 appears to capture a split event, where the blob from the prior video frame 3100 is now represented by two blobs 3104, 3106.

In the example of FIG. 31B, the second blob 3106 has been associated with a split tracker while the first blob 3104 has been associated with a split newn tracker. In this example, the first blob 3104 may find a matching person model but the second blob 3106 may not find a match. In this example, the second blob 3106 should not be output. The second blob 3106, however, has been assigned the correct tracker label "2" while the first blob 3104 has been assigned an incorrect label "3."

Figure 31C:

As discussed above, the labeling of the blobs 3104, 3106 can be corrected by swapping the bounding boxes for the blobs 3104, 3106. Additionally, the output of the split newn tracker can be suppressed. The video frame 3120 of FIG. 31C illustrates the result. In the video frame 3120, the first blob 3104 has been correctly output with the label "2" while the second blob 3106 is not separately tracked.

Figures 32A, 32B:
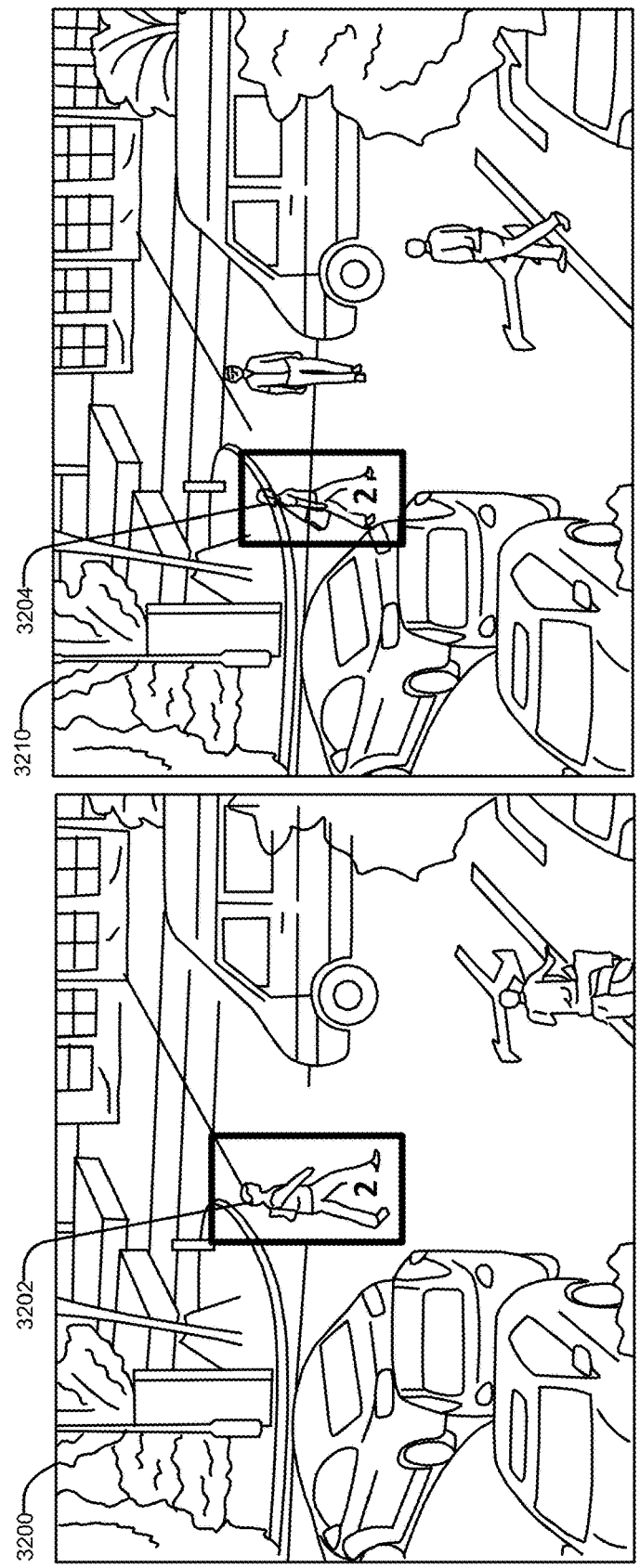
FIG. 32A and FIG. 32B illustrate an example where a person re-identification system that is based only on image recognition can fail.

FIG. 32A and FIG. 32B illustrate an example where a person re-identification system that is based only on image recognition can fail. In the video frame 3200 of FIG. 32A, a person 3202 has been identified and been assigned the label "2." Between this video frame 3200 and the later video frame 3210 of FIG. 32B, the person 3202 has left the scene, and a second person 3204 is present in the scene at about the same location as the first person 3202. Additionally, the second person is similar in appearance (e.g., is wearing clothing of a similar color), as the first person. By not considering the object tracking history that may be associated with each person 3202, 3204, the object tracking system incorrectly applies the label "2" to the second person 3104. Object tracking history and tracker status can have provided a more accurate tracking result.

FIG. 33 illustrates an example of a process 3300 for applying object re-identification to a video content analysis system. In various implementations, the object can be a person. In these implementations, the object model(s) discussed below can be person models. The process 3300 can be performed by a video content analysis system, such as the systems illustrated in FIG. 10 and FIG. 22.

At 3302, the process 3300 includes determining an object tracker for a current video frame, where the object tracker is associated with a blob. The blob can include pixels from at least a portion of a foreground object in the current video frame. The object tracker includes a tracker status and is associated with a tracker label. Examples of tracker statuses include new, normal, split, merge, recover, lost, and others. In various implementations, the tracker label can be assigned by an object tracking engine of the video content analysis system.

At 3304, the process includes determining to use the blob associated with the object tracker as an input sample for object re-identification, based on the tracker status. In some implementations, determining to use the blob is based on the tracker status having changed from a previous status (e.g., from new to normal, or from hidden to split, and so on). In some implementations, determining to use the blob is based on the object tracker being a new tracker; that is, the object tracker was first generated for the current input frame. In some implementations, determining to use the object tracker is based on a bounding box associated with the object tracker having a pre-determined size. For example, the bounding box may have a particular aspect ratio and/or height and width. In some implementations, the bounding box may be normalized to a pre-determined format before the bounding box is used for the remaining steps of the process 3300. Normalizing can include resizing the bounding box and the contents of the bounding box (e.g., the blob) to a pre-determined height, width, aspect ratio, resolution, color format, and so on.

At 3306, the process 3300 includes extracting one or more features from the blob associated with the object tracker. The features can include numeric values that represent the appearance of the blob, such as, for example, colors textures, gradients, edges, and/or other visual aspects of the blob.

At 3308, the process 3300 includes determining whether the object tracker corresponds to an object model from a plurality of object models by comparing the one or more features extracted from the blob to one or more features included in the object model. The object model can include a model label. The one or more features included in the object model are extracted from one or more previous blobs, where the pervious blobs were determined from previous video frames. For example, a first blob can have come from a first video frame, second blob can have come from a second video frame, a third blob can have come from a third video frame, and so on. The blobs are related because the object tracking system and/or the object re-identification system has determined that the blobs represent the same object.

In various implementations comparing the features can include using a threshold. That is, if a distance between a feature extracted from the blob and a corresponding feature from the object model is less than a threshold, then the features can be considered matching or corresponding. The threshold may be referred to as a rejection threshold. In some implementations, the features can also be compared using a second threshold, which may be referred as an acceptance threshold. In these implementations, if the distance is greater than the rejection threshold but less than the acceptance threshold, then the feature being compared is considered matching. In various implementations, the rejection threshold and/or the acceptance threshold can be adjusted based on the tracker status. For example, for some trackers, one or both thresholds can be set to a low value, while for other trackers the thresholds can be set to intermediate or high values. Adjusting the threshold values can determine whether the match between an object tracker and an object model should be more or less exact.

In some implementations, when the tracker status is a recover status, the object model against which the object tracker is compared is selected based on the tracker label matching the model label of the selected object model. In these implementations, the comparison may determine that the tracker label is incorrect, because the blob associated with the object tracker does not correspond with the data stored in the object model.

In some implementations, when the tracker status is a split status, the object tracker can be associated with a group of split trackers. In these implementations, the object model against which the object tracker is compared can be selected by matching the model label of the object model to any of the tracker labels from the group of split trackers. That is, the model label need not match the tracker label of the given object tracker, but rather can match the label of another tracker in the split group.

In some implementations, when the tracker status is a new status, one or more object models can be selected for comparing against the object tracker. In some implementations, an object model may be selected because the object model has not yet matched any object tracker from the current from the current video frame.

In some implementations, object models can include a model state. When the model state is a first state, the object model can be updated using the object tracker. The first state may be referred to as an update state. When the model state is a second state, the object model is not updated. The second state may be referred to as a no-update state.

At 3310, the process 3300 includes determining whether the tracker label matches the model label when the object tracker corresponds to the object model. The tracker label matches the model label when the tracker label is the same as the model label.

At 3312, the process 3300 includes modifying the object tracker when the object tracker label does not match the model label, wherein modifying includes changing the tracker label to the model label.

At 3314, the process 3300 includes outputting the modified object tracker, wherein the modified object tracker is used to track the blob in the current video frame.

In some implementations, the process 3300 can also include identifying a particular object model has not matched any previous object tracker for an interval of previous video frames. That is, for each of 1, 5, 10, or some other number of previous video frames, no object tracker was found whose features corresponded to the features of the object model. In some implementations, the process 3300 includes changing a model state for the particular object model to a dead state.

In some implementations, the process 3300 can also include updating the object model to include the features extracted from the blob that is associated with the object tracker. The object model can be updated with the features extracted from the blob correspond to the features included in the object model.

In some implementations, the process 3300 can also include determining, for a second object tracker in the current video frame, that the second object tracker does not correspond to any object model from the plurality of object models. In these implementations, the process 3300 can include generating a new object model. The new object model can include data from the second object tracker.

In some cases, the tracker status for the object tracker may have, for some previous video frame, been a recover status. That is, in a video frame that preceding the current video frame, it was determined that the tracker status should be the recover status. Additionally for that previous video frame (and possibly for subsequent video frames), no corresponding object model was identified. As discussed above, the corresponding object model has been found using the data from the current video frame.

In some cases, the object tracker may be a member of a split group. The split group can include a second object tracker, and when the first object tracker corresponds to the object model, a bounding box of the first object tracker can be exchanged with the bounding box of the second object tracker. The bounding boxes that are exchanged can be the most recent bounding boxes in a history of bounding boxes stored by each object tracker. The bounding boxes may be exchanged when the tracker label for the first object tracker does not match the model label of the object model, and the tracker label of the second object tracker does match the model label of the object model.

In some examples, the process 3300 may be performed by a computing device or an apparatus, such as the video analytics system 100 of FIG. 1. In some cases, the computing device or apparatus may include a processor, microprocessor, microcomputer, or other component of a device that is configured to carry out the steps of process 3300. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

The process 3300 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 3300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The content-adaptive blob tracking operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for object re-identification, comprising:
   determining an object tracker for a current video frame, wherein the object tracker is associated with a blob, the blob including pixels from at least a portion of a foreground object in the current video frame, and wherein the object tracker is associated with a tracker label identifying an object associated with the object tracker;
   determining a tracker status of the object tracker for the current video frame;
   determining, based on the determined tracker status, to use the blob associated with the object tracker as an input sample for object re-identification;
   extracting one or more features from the blob associated with the object tracker when it is determined to use the blob associated with the object tracker as the input sample for object re-identification;
   determining whether the blob corresponds to an object model from a plurality of object models by comparing the one or more features extracted from the blob to one or more features included in the object model, the object model including a model label identifying an object associated with the model, wherein the one or more features included in the object model are extracted from one or more previous blobs;
   determining whether the tracker label matches the model label when the object tracker corresponds to the object model;
   modifying the object tracker when the tracker label does not match the model label, wherein modifying includes changing the tracker label to the model label; and
   outputting the modified object tracker, wherein the modified object tracker is used to track the blob in the current video frame.

2. The method of claim 1, wherein determining to use the blob associated with the object tracker is based on the tracker status having changed from a previous tracker status.

3. The method of claim 1, wherein determining to use the blob associated with the object tracker is based on the object tracker being a new object tracker.

4. The method of claim 1, wherein determining to use the blob associated with the object tracker is based on a bounding box associated with the object tracker having a predetermined size.

5. The method of claim 1, further comprising:
   selecting the object model from the plurality of object models, wherein, when the tracker status is a recover status, the object model is selected based on the tracker label matching the model label.

6. The method of claim 1, further comprising:
   selecting the object model from the plurality of object models, wherein, when the tracker status is a split status, the object tracker is associated with a group of split trackers, wherein each split tracker from the group of split trackers is associated with a tracker label, and wherein the object model is selected based on the model label matching a tracker label from among the tracker labels associated with the group of split trackers.

7. The method of claim 1, further comprising:
   selecting the object model from the plurality of object models, wherein, when the tracker status is a new status, one or more object models from the plurality of object models are selected.

8. The method of claim 1, further comprising:
   selecting the object model from the plurality of object models, wherein the object model is selected from one or more object models from the plurality of object models that have not been matched to an object tracker from the current video frame.

9. The method of claim 1, further comprising:
   identifying a particular object model from the plurality of object models, wherein the particular object model has not matched any previous object tracker for an interval of previous video frames; and
   changing a model state for the particular object model to a dead state.

10. The method of claim 1, further comprising:
    updating the object model to include the one or more features extracted from the blob when the one or more features extracted from the blob correspond to the one or more features included in the object model.

11. The method of claim 1, further comprising:
    determining, for a second object tracker from the current video frame, that the second object tracker does not correspond to any object model from the plurality of object models; and
    generating a new object model, wherein the new object model includes data from the second object tracker.

12. The method of claim 1, wherein, for a previous video frame, the tracker status was a recover status, and wherein no corresponding object model was identified for the previous video frame.

13. The method of claim 1, wherein the tracker status is a recover status, wherein the object tracker overlaps with another tracker, and wherein the object tracker and the other tracker are assigned to a split group.

14. The method of claim 1, wherein the object tracker is a member of a split group, wherein the split group includes a second object tracker, and wherein, when the object tracker corresponds to the object model, a bounding box of the object tracker is exchanged with a bounding box of the second object tracker.

15. An apparatus, comprising:
a memory configured to store video data; and
a processor electrically coupled to the memory, the processor being configured to:
determine an object tracker for a current video frame, wherein the object tracker is associated with a blob, the blob including pixels from at least a portion of a foreground object in the current video frame, and wherein the object tracker includes a tracker status and is associated with a tracker label identifying an object associated with the object tracker;
determine a tracker status of the object tracker for the current video frame;
determine, based on the determined tracker status, to use the blob associated with the object tracker as an input sample for object re-identification;
extract one or more features from the blob associated with the object tracker when it is determined to use the blob associated with the object tracker as the input sample for object re-identification;
determine whether the blob corresponds to an object model from a plurality of object models by comparing the one or more features extracted from the blob to one or more features included in the object model, the object model including a model label identifying an object associated with the model, wherein the one or more features included in the object model are extracted from one or more previous blobs;
determine whether the tracker label matches the model label when the object tracker corresponds to the object model;
modify the object tracker when the tracker label does not match the model label, wherein modifying includes changing the tracker label to the model label; and
output the modified object tracker, wherein the modified object tracker is used to track the blob in the current video frame.

16. The apparatus of claim 15, wherein determining to use the blob associated with the object tracker is based on the tracker status having changed from a previous tracker status.

17. The apparatus of claim 15, wherein determining to use the blob associated with the object tracker is based on the object tracker being a new object tracker.

18. The apparatus of claim 15, wherein determining to use the blob associated with the object tracker is based on a bounding box associated with the object tracker having a pre-determined size.

19. The apparatus of claim 15, wherein the processor is further configured to:
select the object model from the plurality of object models, wherein, when the tracker status is a recover status, the object model is selected based on the tracker label matching the model label.

20. The apparatus of claim 15, wherein the processor is further configured to:
select the object model from the plurality of object models, wherein, when the tracker status is a split status, the object tracker is associated with a group of split trackers, wherein each split tracker from the group of split trackers is associated with a tracker label, and wherein the object model is selected based on the model label matching a tracker label from among the tracker labels associated with the group of split trackers.

21. The apparatus of claim 15, wherein the processor is further configured to:
select the object model from the plurality of object models, wherein, when the tracker status is a new status, one or more object models from the plurality of object models are selected.

22. The apparatus of claim 15, wherein the processor is further configured to:
select the object model from the plurality of object models, wherein the object model is selected from one or more object models from the plurality of object models that have not been matched to an object tracker from the current video frame.

23. The apparatus of claim 15, wherein the processor is further configured to:
identify a particular object model from the plurality of object models, wherein the particular object model has not matched any previous object tracker for an interval of previous video frames; and
change a model state for the particular object model to a dead state.

24. The apparatus of claim 15, wherein the processor is further configured to:
update the object model to include the one or more features extracted from the blob when the one or more features extracted from the blob correspond to the one or more features included in the object model.

25. The apparatus of claim 15, wherein the processor is further configured to:
determine, for a second object tracker from the current video frame, that the second object tracker does not correspond to any object model from the plurality of object models; and
generating a new object model, wherein the new object model includes data from the second object tracker.

26. The apparatus of claim 15, wherein, for a previous video frame, the tracker status was a recover status, and wherein no corresponding object model was identified for the previous video frame.

27. The apparatus of claim 15, wherein the tracker status is a recover status, wherein the object tracker overlaps with another tracker, and wherein the object tracker and the other tracker are assigned to a split group.

28. The apparatus of claim 15, wherein the object tracker is a member of a split group, wherein the split group includes a second object tracker, and wherein, when the object tracker corresponds to the object model, a bounding box of the object tracker is exchanged with a bounding box of the second object tracker.

29. A non-transitory computer-readable medium having stored thereon instructions that, when executed by one or more processors, cause the one or more processors to:
determine an object tracker for a current video frame, wherein the object tracker is associated with a blob, the blob including pixels from at least a portion of a foreground object in the current video frame, and wherein the object tracker includes a tracker status and is associated with a tracker label identifying an object associated with the object tracker;

determine a tracker status of the object tracker for the current video frame;

determine, based on the determined tracker status, to use the blob associated with the object tracker as an input sample for object re-identification;

extract one or more features from the blob associated with the object tracker when it is determined to use the blob associated with the object tracker as the input sample for object re-identification;

determine whether the blob corresponds to an object model from a plurality of object models by comparing the one or more features extracted from the blob to one or more features included in the object model, the object model including a model label identifying an object associated with the model, wherein the one or more features included in the object model are extracted from one or more previous blobs;

determine whether the tracker label matches the model label when the object tracker corresponds to the object model;

modify the object tracker when the tracker label does not match the model label, wherein modifying includes changing the tracker label to the model label; and output the modified object tracker, wherein the modified object tracker is used to track the blob in the current video frame.

30. An apparatus, comprising:

means for determining an object tracker for a current video frame, wherein the object tracker is associated with a blob, the blob including pixels from at least a portion of a foreground object in the current video frame, and wherein the object tracker includes a tracker status and is associated with a tracker label identifying an object associated with the object tracker;

means for determining a tracker status of the object tracker for the current video frame;

means for determining, based on the determined tracker status, to use the blob associated with the object tracker as an input sample for object re-identification;

means for extracting one or more features from the blob associated with the object tracker when it is determined to use the blob associated with the object tracker as the input sample for object re-identification;

means for determining whether the blob corresponds to an object model from a plurality of object models by comparing the one or more features extracted from the blob to one or more features included in the object model, the object model including a model label identifying an object associated with the model, wherein the one or more features included in the object model are extracted from one or more previous blobs;

means for determining whether the tracker label matches the model label when the object tracker corresponds to the object model;

means for modifying the object tracker when the tracker label does not match the model label, wherein modifying includes changing the tracker label to the model label; and means for outputting the modified object tracker, wherein the modified object tracker is used to track the blob in the current video frame.

* * * * *